US010819772B2

United States Patent
Kidambi et al.

(10) Patent No.: US 10,819,772 B2
(45) Date of Patent: *Oct. 27, 2020

(54) TRANSFORMATION OF A CONTENT FILE INTO A CONTENT-CENTRIC SOCIAL NETWORK

(71) Applicant: TNQ Books and Journals Private Limited, Chennai (IN)

(72) Inventors: Venkatesan Sumangali Kidambi, Chennai (IN); Bhaskar Mannargudi Venkatraman, Chennai (IN); Peroli Sivaprakasam, Chennai (IN); Ganesh Natarajan, Chennai (IN)

( * ) Notice: Subject to any disclaimer, the term of this patent is extended or adjusted under 35 U.S.C. 154(b) by 0 days.

This patent is subject to a terminal disclaimer.

(21) Appl. No.: 16/455,768

(22) Filed: Jun. 28, 2019

(65) Prior Publication Data

US 2019/0342368 A1    Nov. 7, 2019

Related U.S. Application Data

(63) Continuation of application No. 15/292,128, filed on Oct. 13, 2016, now Pat. No. 10,341,419.

(30) Foreign Application Priority Data

Aug. 8, 2016  (IN) ............................. 201641027001

(51) Int. Cl.
*H04L 29/08*    (2006.01)
*H04L 12/58*    (2006.01)

(52) U.S. Cl.
CPC ............ *H04L 67/06* (2013.01); *H04L 51/046* (2013.01); *H04L 51/32* (2013.01); *H04L 67/22* (2013.01);
(Continued)

(58) Field of Classification Search
CPC ...................................................... H04L 67/22
See application file for complete search history.

(56) References Cited

U.S. PATENT DOCUMENTS 9,621,472 B1 *  4/2017  Fichter .................... H04L 47/25
9,807,184 B1 * 10/2017  Slovak .................... H04L 67/22
(Continued)

*Primary Examiner* — Lashonda T Jacobs
(74) *Attorney, Agent, or Firm* — Rangarajan Sourirajan; Rajan Law Office, LL

(57) ABSTRACT

A method and a file networking system (FNS) transform a content file into a content-centric social network with managed connectivity and indexable touchpoints. The FNS injects a tracking code with widgets for user activities into each portable copy of the content file when user devices request access to the content file before distributing the portable copies to the user devices through a network. The FNS establishes a bidirectional communication with the distributed portable copies (DPCs) through the network to receive tracking information including user created touchpoints identified by the tracking code based on usage of the DPCs. The FNS indexes the touchpoints and creates a satellite internet of users of the DPCs based on invite information and usage of the DPCs. The FNS establishes communication between users of the DPCs in the satellite internet using the widgets through the tracking code and the indexed touchpoints, whereby grouping is automatically achieved.

24 Claims, 24 Drawing Sheets

(52) U.S. Cl.
CPC ........ *H04L 67/2857* (2013.01); *H04L 67/327* (2013.01); *H04L 67/1095* (2013.01)

(56) References Cited

U.S. PATENT DOCUMENTS

| | | | |
|---|---|---|---|
| 9,953,378 B2* | 4/2018 | Purves | G06Q 50/01 |
| 2011/0082719 A1* | 4/2011 | Dutta | G06Q 30/02 |
| | | | 705/7.29 |
| 2013/0073473 A1* | 3/2013 | Heath | G06Q 30/06 |
| | | | 705/319 |
| 2014/0040786 A1* | 2/2014 | Swanson | G06F 3/0484 |
| | | | 715/760 |
| 2014/0067702 A1* | 3/2014 | Rathod | G06Q 10/10 |
| | | | 705/319 |
| 2014/0129942 A1* | 5/2014 | Rathod | H04N 21/44222 |
| | | | 715/720 |
| 2015/0135161 A1* | 5/2015 | Orcutt | G06F 8/34 |
| | | | 717/109 |
| 2015/0245084 A1* | 8/2015 | Downing | H04N 21/44222 |
| | | | 725/12 |
| 2016/0344828 A1* | 11/2016 | Hausler | G06F 16/9535 |
| 2016/0350405 A1* | 12/2016 | Janakiraman | G06F 16/9574 |
| 2017/0116339 A1* | 4/2017 | Stein | G06F 16/9535 |
| 2017/0149721 A1* | 5/2017 | Brunn | H04L 51/16 |

\* cited by examiner

TRANSFORMATION OF A CONTENT FILE INTO A CONTENT-CENTRIC SOCIAL NETWORK

CROSS-REFERENCE TO RELATED APPLICATIONS

This application is a continuation application of non-provisional patent application Ser. No. 15/292,128 titled "Transformation Of A Content File Into A Content-centric Social Network", filed in the United States Patent and Trademark Office on Oct. 13, 2016, now U.S. Pat. No. 10,341,419 B2, which claims priority to and the benefit of the non-provisional patent application number 201641027001 titled "Transformation Of A Content File Into A Content-centric Social Network", filed in the Indian Patent Office on Aug. 8, 2016. The specifications of the above referenced patent applications are incorporated herein by reference in its entirety.

BACKGROUND

The state of the art for digital content inhibits content sharing. Content sharing is beset with convolutions. File transformations are imperative. Indirect link sharing via social networks and commenting on content thereof is a multi-billion dollar enterprise. Direct link sharing works well until a link rot takes over. To perpetuate connectivity with their customers, namely, users of user devices, businesses and institutions use a cloud computing environment for content delivery, which is not desired by some users. With no hypertext markup language (HTML) file available to readily download, users have to install other applications or plugins that are often proprietary for local storage of content. The users often buy devices to consume the content that they have paid for, which gives gatekeepers of content, for example, online stores selling the content, greater control over the content than producers of the content. Authors and publishers find it difficult to go independent of the gatekeepers of the content, because publishing requires professional assistance, and a lot of marketing is required to make a published product discoverable. Publishers have to publish in different formats, for example, a webpage format, an electronic book (eBook) format for multiple applications and devices, a print format, etc., and make all the formats and the related content discoverable. Even as overheads of publishing are increasing, profit margins are declining. Hence, authors and publishers have to conform to gatekeepers for delivery of the content.

The internet, the world wide web consortium (W3C), and the Unicode Consortium together allow an alternate business method for content delivery. Hypertext markup language (HTML) has been around for some time and is evolving. HTML, together with the Unicode® standard of Unicode Inc., and the W3C® standards of Massachusetts Institute of Technology, is an open content standard. HTML is a rich content container with cross-media support. Hypertext markup language 5 (HTML5) is the fifth revision of the HTML standard. HTML5 documents are typically served through a hypertext transfer protocol (http) address or a hypertext transfer protocol secure (https) address from a remote server with a persistent internet connection. Webpages are typically cached by a browser so that even if internet connectivity is lost, the webpages are not lost, as long as the browser remains open. Recent HTML5 initiatives have made it possible to store cached content in the browser, so that the content can be recovered if the same uniform resource locator (URL) is opened again in the browser after closing the browser even without any internet connectivity. Storage of the cached content in the browser also helps in the fast reloading of the HTML pages.

However, a continuing problem with webpages with the hypertext transfer protocol (http) addresses or the hypertext transfer protocol secure (https) addresses is that the user is dependent on a server implementation for reloading the content and it is possible that the same content is no longer available again in the same uniform resource locator (URL). The standard user behavior in this changing http or https landscape is to download the content in a format that the user can download, for example, in a portable document format (PDF), to a local hard disk on a user device for later use. An impediment to using the hypertext markup language (HTML) for portable files is that an HTML file or an HTML page cannot be downloaded to local storage in an HTML format. HTML content can only be shared as a link to allow persons with whom the HTML content is shared to access the HTML content from a cloud computing environment. Currently, browsers only support saving a webpage as a non-standard web archive. Some browsers allow webpage downloads through plugins. Although HTML5 as a document format has many capabilities, the lack of consistency in its implementation and the lack of portability make users tend to prefer the PDF.

Publishing is moving from circulation and readership metrics to engagement metrics, where engagement with readers of published content is considered. This is because engagement equates revenue, not only for publishers, but also for researchers and authors. To authors who are looking to find their next grant, engagement with their community and the extent of engagement means the next grant. Multi-channel content delivery covering the hypertext markup language (HTML) format, a portable document (PDF) format, an electronic publication (ePub) format, and applications, among others, has advanced in recent times as the primary mode of engagement, the rationale being that the readers are attracted one way or the other. There are inherent problems with this mode of multi-channel engagement. Firstly, multi-channel delivery places multiple production and distribution overheads on publishers and affects speed to market the content. Secondly, a file format like the PDF is more a means of disengagement than engagement. When a PDF file is available to download, readers download the PDF file to a user device and are disengaged thereafter. It is difficult or, in some cases, not possible for publishers to find out what the readers do with the PDF file and when. The scenario of engagement with the readers is the same with an ePub file, where the readers get disengaged after obtaining the ePub file, unless there is an application on the user device that opens this ePub file, which can then send information about engagement of the reader with the ePub file back to the publishers, which is circuitous. Therefore, there is a need for a method that collects information about engagement of the reader with a file in a portable format stored locally on a user device, such as read metrics, through engagement with a publisher every time the file is opened, and for as long as the file is in use. Moreover, should a user, for example, a reader, make and distribute copies of the file, such copies of the file cannot be tracked using conventional methods. Therefore, there is a need for delivering a file for download purposes with codesets embedded in the file for homing, where homing is the ability of the file to stay connected with a server from where the file is delivered, and transmit file-level activity, for example, making copies of the file, to the server. In the absence of homing, a file will have to be encrypted to prevent unintended use.

Continuing engagement requires that touchpoints, that is, information about engagement of users of the file, including authors and readers, in the local files on the user devices, be read continuously and indexed for establishing communication between the users, and compiling usage information associated with usage of the file for conveyance to publishers, the authors, and researchers. Indexing is typically based on keywords and/or metadata, which limits the discoverability of content, due to which search engines end up pulling a lot of irrelevant information. Content is often rendered with forms to fill, buttons to push, hyperlinks to click on, etc., to a machine on which users interact with a file with the content. The machine's understanding of user interaction is limited to the interactions of users with the forms, buttons, hyperlinks, etc. When users interact with the content in the file instead of interacting with the forms, the buttons, the hyperlinks, etc., in the file, there is a need for recording each content unit of interaction against a title and metadata of the file that is already available, thereby constantly raising levels of the machine's awareness and setting up search engines for more meaningful content discovery. Moreover, recording each content unit of interaction against the title and the metadata of the file facilitates search engines that are built around machine learning to learn better.

The information about the engagement of the users with the local files on the user devices needs to be conveyed to a server through a network, for example, the internet, to compile the usage information. Browsers used to access a file, for example, a hypertext markup language (HTML) file, on a network, for example, the internet, restrict communication between a local file on a user device and the server, for example, by restricting local files from cross-site scripting using asynchronous JavaScript and extensible markup language (XML) (AJAX) calls, to prevent security threats, where AJAX is a set of web development techniques. There is a need to circumvent such restrictions to send information about the engagement of the users with the local files on the user devices to the server for compiling the usage information. Moreover, there is a need for collecting information about the engagement of the users with the local files on the user devices even in instances of a loss of connectivity of the user devices with the network through which the collected information is sent to the server for establishing a communication between the users and compiling the usage information. Communication between the users of the file allows engagement of publishers and authors with readers of the file. There is a need for establishing communication between the users of the file to create a content-centric social network of the users of the file.

Current social media paradigms demand a great deal of effort on the part of users to form a group. On social platforms, users having common interests are not easily located, and locating them involves a lengthy process of discovery. The process of discovery entails random broadcasts to obtain the attention of potential group members. The random broadcast is susceptible to attacks, and may be viewed as boastful, narcissistic, impertinent, etc. There is a need for making the process of discovery of potential group members easy and automatic to avoid attacks from strangers in the network. Moreover, current social media engines impose restrictions on the extent of content that can be posted, tweeted, pinned, etc. There are word limits, image limits, media-size limits, etc., and therefore, electronic mail (email) and file sharing, which have less social involvement, continue to be primary vehicles for sharing unabridged content. Where there is no restriction on content type or length, for example, in blogs, websites, etc., the authoring environment often requires the user to have substantial skills in web technologies, for example, hypertext markup language (HTML), cascading style sheets (CSS), JavaScript®, etc., and server-side technologies, for example, hypertext preprocessor (PHP).

Hence, there is a long felt need for a computer implemented method and a computer implemented system that transform a content file into a content-centric social network with managed connectivity and indexable touchpoints. Moreover, there is a need for a computer implemented method and a computer implemented system that compile usage information associated with usage of one or more portable local copies of a content file on one or more user devices. Furthermore, there is a need for a computer implemented method and a computer implemented system that deliver a content file for download purposes with codesets embedded in the content file for homing. Furthermore, there is a need for a computer implemented method and a computer implemented system that circumvent restrictions placed by browsers on the user devices to send information about engagement of users of the content file with the portable local copies of the content file on the user devices to a server for compiling the usage information. Furthermore, there is a need for a computer implemented method and a computer implemented system that collect the information about the engagement of the users with the portable local copies of the content file on the user devices even when connectivity to the network is lost, and send the collected information to the server when connectivity to the network is reestablished. Furthermore, there is a need for a computer implemented method and a computer implemented system that group users based on common interests and context of the content files to form the content-centric social network automatically.

SUMMARY OF THE INVENTION

This summary is provided to introduce a selection of concepts in a simplified form that are further disclosed in the detailed description of the invention. This summary is not intended to determine the scope of the claimed subject matter.

The computer implemented method and the computer implemented system disclosed herein address the above mentioned need for transforming a content file into a content-centric social network, also referred to as an "extended document network (DNX)", with managed connectivity and indexable touchpoints, where managed connectivity involves managing to cover for loss of connectivity as though there is no loss, with opportunities to log activities over the content file. The computer implemented method and the computer implemented system disclosed herein transform a downloadable content file into a connecting web application upon a call to local storage, that is, on request, the connecting web application is downloaded to the local storage as a content file. The connecting web application allows direct engagement between a user, for example, a publisher of the content file and its readers and authors. Moreover, the computer implemented method and the computer implemented system disclosed herein compile usage information associated with usage of one or more portable local copies of a content file on one or more user devices. Furthermore, the computer implemented method and the computer implemented system disclosed herein deliver a content file for download purposes with codesets embedded in the content file for homing, where homing is the ability of the content file to stay connected with a server from where the content file is delivered, and transmit file-level activity, for example, making copies of the content file, to the server.

Furthermore, the computer implemented method and the computer implemented system disclosed herein circumvent restrictions placed by browsers on user devices to send information about engagement of users of the content file with the portable local copies of the content file on the user devices to a server for compiling the usage information. Furthermore, the computer implemented method and the computer implemented system disclosed herein collect the information about the engagement of the users of the content file with the portable local copies of the content file on the user devices even when connectivity to the network is lost, and send the collected information to the server when connectivity to the network is reestablished, thereby managing the loss of connectivity to achieve the managed connectivity, disclosed above. Furthermore, the computer implemented method and the computer implemented system disclosed herein group the users of the content file based on common interests and context of the content files to form the content-centric social network automatically.

The computer implemented method disclosed herein employs a file networking system implemented, for example, as a server, comprising at least one processor configured to execute computer program instructions for transforming a content file into a content-centric social network with managed connectivity and indexable touchpoints. The indexable touchpoints comprise information about engagement of users with the portable local copies of the content file on the user devices. The file networking system injects a tracking code with widgets for user activities into each of one or more portable copies of the content file based on preconfigured criteria in response to a request to access the content file from one or more first user devices. The widgets enable communication and engagement among users, for example, authors and readers of the content file, and the viewing and analysis of cumulative engagement metrics. The file networking system distributes the portable copies of the content file with the respective injected tracking codes to one or more second user devices through a network based on invite information received by the file networking system with the request to allow access to the content file. The second user devices comprise the first user devices and invitee user devices addressed in the invite information. The file networking system establishes a bidirectional communication between the file networking system and the distributed portable copies, hereinafter referred to as "portable local copies", of the content file on the second user devices through the network.

The file networking system receives tracking information comprising touchpoints created by users of the second user devices based on usage of the portable local copies of the content file via the established bidirectional communication while managing to cover for loss of connectivity over the network. The touchpoints are defined by user interactions with the portable local copies of the content file on the second user devices and are identified by the respective injected tracking codes in the portable local copies of the content file on the second user devices. The file networking system indexes the touchpoints in the received tracking information for tracking the usage of the portable local copies of the content file. The file networking system creates a satellite internet of users of the portable local copies of the content file on the second user devices based on the invite information and the tracked usage of the portable local copies of the content file. The file networking system establishes communication between the users of the portable local copies of the content file on the second user devices in the created satellite internet of users using one or more of the widgets for the user activities through the respective injected tracking codes in the portable local copies of the content file and the indexed touchpoints, thereby transforming the content file into the content-centric social network with the managed connectivity and the indexable touchpoints.

In one or more embodiments, related systems comprise circuitry and/or programming for effecting the methods disclosed herein; the circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
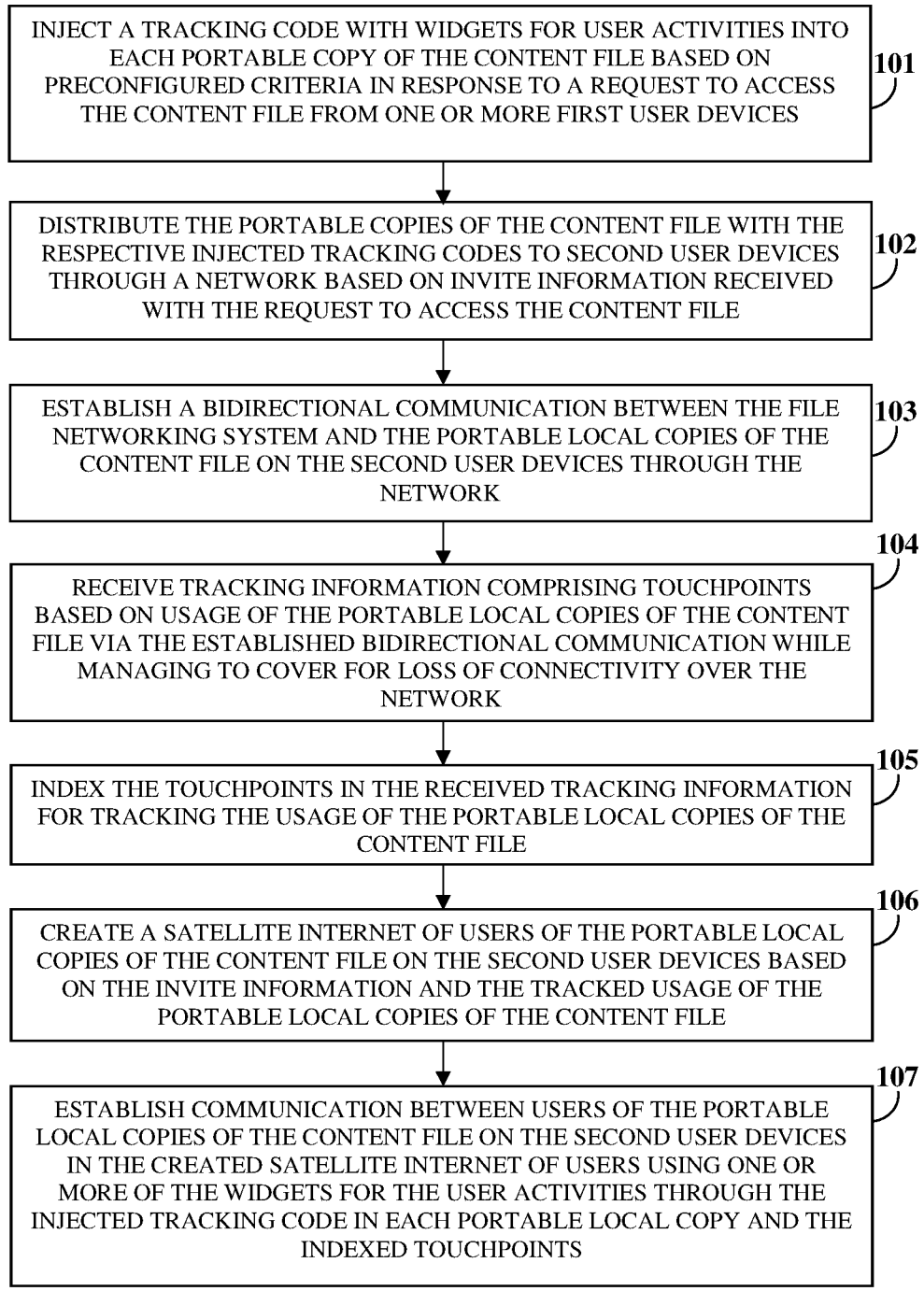
FIG. 1 illustrates a computer implemented method for transforming a content file into a content-centric social network with managed connectivity and indexable touchpoints.

FIG. 1 illustrates a computer implemented method for transforming a content file into a content-centric social network, also referred to as an "extended document network (DNX)", with managed connectivity and indexable touchpoints. As used herein, "content file" refers to a file that contains, for example, textual content, image content, audio content, video content, audiovisual content, multimedia content, etc., received in one of multiple formats from a user. Also, as used herein, "format" refers to a form of the content, for example, raw textual content formatted according to a file type such as a Microsoft® Word document format, a portable document format, etc., a link to textual content such as a uniform resource locator (URL), a uniform resource identifier (URI), etc. Also, as used herein, "content-centric social network" refers to a social network of users that have accessed, that is, downloaded or cached, the same unique URL or URI of a content file. The users are bound to the content-centric social network automatically by having accessed the same content file. The content-centric social network is characterized by an exchange of request messages and response messages, all threaded to specific locations in the content file with which users choose to start a thread and engage with other users through a connecting web application. The process of transforming a content file into the content-centric social network comprises packaging content as a flattened, portable file, for example, a flattened, portable hypertext markup (HTML) file. As used herein, "content" refers to creative material that is authored or referred to by users. Also, as used herein, "flattened HTML" refers to a format where media comprising, for example, image content, audio content, video content, audiovisual content, multimedia content, etc., is rendered in a Base64 format and localized in a file along with textual content as opposed to being separately provided in a folder, for example, a web archive, associated with the file.

The computer implemented method disclosed herein employs a file networking system comprising at least one processor configured to execute computer program instructions for transforming a content file into a content-centric social network with managed connectivity and indexable touchpoints. The file networking system generates portable copies of the content file when user devices request access to the content file. The file networking system injects 101 a tracking code with widgets for user activities into each portable copy of the content file based on preconfigured criteria in response to the request to access the content file from one or more first user devices. As used herein, "portable copy of the content file" refers to a copy of the content file on the file networking system that can be stored locally in a cache or a disk storage of a user device by downloading the copy of the content file from the file networking system to the user device over a network, for example, the internet, and that can be subsequently transmitted as desired by a user of the user device. Also, as used herein, "tracking code" refers to a code that uniquely identifies a portable copy of the content file into which the code is injected for tracking of the portable copy of the content file by the file networking system. The tracking code is, for example, a code of the JavaScript® programming language that collects and sends data on usage of the portable copy of the content file to the file networking system.

Also, as used herein, "widgets" refer to interactive virtual tools that provide single purpose services to a user. Also, as used herein, "user activities" refer to activities performed by users of portable local copies of the content file from within the portable local copies of the content file. Also, as used herein, "portable local copies of the content file" refer to copies of the content file that are stored locally in a cache or a disk storage of a user device by downloading the copies of the content file from the file networking system to the user device over a network. User activities comprise, for example, annotation on the portable local copies of the content file, communication with other users of the portable local copies of the content file whose user devices are simultaneously connected to the file networking system, invitation of users of other user devices to access the portable local copies of the content file, etc. The widgets for user activities comprise software tools, for example, highlighting tools for creating annotations on portable local copies of the content file and for concurrent user discovery where user devices that are simultaneously connected to the file networking system at a given point of time are visible to each other. The widgets for the user activities further comprise software tools, for example, interface elements, message windows, etc., for allowing instant messaging between the concurrent users, user group formation, etc.

As used herein, "first user devices" refer to user devices that request access to the content file on the file networking system. The file networking system allows the first user devices to invite other user devices, hereinafter referred to as "invitee user devices", for accessing the content file on the file networking system. Also, as used herein, "invitee user devices" refer to user devices invited by the first user devices at the time of initiation of download of the portable copies of the content file by the first user devices or during usage of the portable local copies of the content file by the first user devices by declaring new addressees in a widget for user activities, for example, an instant messaging window, in the portable local copies of the content file by the first user devices. The file networking system receives invite information comprising, for example, digital addresses of users of the invitee user devices. The digital addresses of the users of the invitee user devices comprise addresses where the users of the invitee user devices can be reached electronically, for example, electronic mail (email) addresses of the users of the invitee user devices.

The first user devices and the invitee user devices together are hereinafter referred to as "second user devices". For generation of the content file, the file networking system provides a graphical user interface (GUI), for example, a web interface of a web platform on the internet, through which users of the first user devices can subscribe to the file networking system. The file networking system receives content in one of multiple formats from the users through the GUI provided by the file networking system. For example, the file networking system receives content in the form of a link pointing to a location of the content on the internet or in the form of raw content entered into input fields on the web interface, for example, from a clipboard of a local machine. As used herein, "clipboard" refers to a software facility used for short term data storage and/or data transfer between documents or applications via copy and paste operations. Moreover, the file networking system receives content, for example, through application programming interfaces (APIs) of other applications, application files uploaded for conversion to and set up as a hypertext markup language (HTML) file, or as a data uniform resource identifier (URI) file. As used herein, "data URI" refers to a URI format that provides immediate inclusion of data inline in webpages, wherein media, for example, is encoded as Base64, and as if the data is being referenced as an external resource. An example of a code snippet executed by at least one processor of the file networking system for receiving a URI, for example, a uniform resource locator (URL) that comprises the content is provided below:

```
function grabHTML($url) {
    $snoopy = new Snoopy;
    $snoopy->fetch($url);
    $content = $snoopy->results;
    return $content;
}
```

An example of a code snippet executed by at least one processor of the file networking system for extracting the content from the received URI, for example, a uniform resource locator (URL) is provided below:

```
<xsl:stylesheet version="1.0"
    xmlns:xsl="http://www.w3.org/1999/XSL/Transform"
    xmlns:php="http://php.net/xsl"
    xmlns:h="http://www.w3.org/1999/xhtml"
    xmlns:m="http://www.w3.org/1998/Math/MathML"
    xmlns:s="http://www.w3.org/2000/svg"
    exclude-result-prefixes="h m s">
<xsl:output omit-xml-declaration="yes" method="html"/>
<xsl:param name="pub" />
<xsl:param name="url" />
<xsl:param name="burl" />
<xsl:param name="cdurl" />
<xsl:param name="data_uri" />
<xsl:template match="h:head|h:script" />
<xsl:template match="/">
    <div class."{$pub}">
        <xsl:choose>
            <xsl:when test="//h:*[@id='article']">
                <span class="hidden-id"><xsl:text>article</xsl:text></span>
                <div class="ph5-content-in">
                    <xsl:apply-templates select="//h:*[@id='article']"/>
                </div>
            </xsl:when>
            <xsl:when test="//h:*[@id='content']/h:*[@id='left-column']">
                <span class="hidden-id"><xsl:text>left-column</xsl:text></span>
                <div class="ph5-content-in">
                    <xsl:apply-templates select="//h:*[@id='content']/h:*[@id='left-column']"/>
                </div>
            </xsl:when>
            <xsl:when test="//h:*[@id='story']">
                <span class="hidden-id"><xsl:text>story</xsl:text></span>
                <div class="ph5-content-in">
                    <xsl:apply-templates select="//h:*[@id='story']"/>
                </div>
            </xsl:when>
            <xsl:when test="//h:*[@id='ph5-article-id']">
                <span class="hidden-id"><xsl:text>ph5-article</xsl:text></span>
                <div class="ph5-content-in">
                    <xsl:apply-templates select="//h:*[@id='ph5-article-id']"/>
                </div>
            </xsl:when>
            <xsl:when test="//h:*[@id='main-story']">
                <span class="hidden-id"><xsl:text>main-story</xsl:text></span>
                <div class="ph5-content-in">
                    <xsl:apply-templates select="//h:*[@id='main-story']"/>
                </div>
            </xsl:when>
            <xsl:when test="//h:*[@id='content_remainder']">
                <span class="hidden-id"><xsl:text>content_remainder</xsl:text></span>
                <div class="ph5-content-in">
                    <xsl:apply-templates select="//h:*[@id='content_remainder']"/>
                </div>
            </xsl:when>
            <xsl:when test="//h:*[@id='content-page']">
                <span class="hidden-id"><xsl:text>content_remainder</xsl:text></span>
                <div class="ph5-content-in">
```

```
            <xsl:apply-templates select="//h:*[@id='content-page']"/>
        </div>
    </xsl:when>
    <xsl:when test="//h:*[@class='main-content']">
        <span class="hidden-id"><xsl:text>main-content</xsl:text></span>
        <div class="ph5-content-in">
            <xsl:apply-templates select="//h:*[@class='main-content']"/>
        </div>
    </xsl:when>
    <xsl:otherwise>
        <span class="hidden-id"><xsl:text>body</xsl:text></span>
        <div class="ph5-content-in">
            <xsl:apply-templates select="//h:body"/>
        </div>
    </xsl:otherwise>
</xsl:choose>
    </div>
  </xsl:template>
</xsl:stylesheet>
```

After receiving the content from the users through the graphical user interface (GUI) provided by the file networking system, the file networking system generates a unique uniform resource identifier (uURI) with the received content. The file networking system redirects the users to the generated uURI. When the file networking system receives a request to access the content file from the first user devices used by the users, the file networking system caches the generated uURI in a browser used to access the uURI on the user devices. The file networking system removes extraneous information from the received content that is in one of the formats, for example, a link to textual content such as a uniform resource identifier (URI), a file type format such as a portable document format, etc., as disclosed above for use in a content-centric social network. As used herein, "extraneous information" refers to information that is unrelated to the content received from a user in one of multiple formats by the file networking system. The extraneous information in the received content comprises, for example, advertising content, widgets not related to the received content, etc. A first user may enter a link to a website via the GUI, where the website comprises extraneous information not related to the content along with the content. The extraneous information comprises, for example, any advertising content on a webpage of the website, comments sections, links to other articles, and other elements of the website that are not related to the content. If the received content is a URI, and if under that URI, there is extraneous information, the file networking system strips the extraneous information from the received content and sets up the uURI with the content alone. In an embodiment, the uURI presents the content in its native style, that is, as received from the users. In another embodiment, the uURI neutralizes the content to a universal style that is predefined. An example of a code snippet executed by at least one processor of the file networking system for removing the extraneous information from the received content is provided below:

```
function cleanUsingTidy($content) {
    //---Should use html5-tidy instead of this fix
    $content = preg_replace("/<article \s*id=\p{P}?[^\s\p{P}]+/","<div id='ph5-article-id' ", $content);
    $content = preg_replace("/<(V?)(article|header|footer)/","<$1div ", $content);
    //---Patch for PLOS proprietary tag
    $content = preg_replace("/<main>/","<div id='main-story'>", $content);
    $content = preg_replace("/<Vmain>/", "</div>", $content);
    //-----default namespace need to be scrapped out
    $content = preg_replace("/(<[^<>] )\s*xmlns=[^\s<>]+/i", "$2", $content);
    $tidy_config = array(
        'clean' => true,
        'output-xhtml' => true,
        'numeric-entities' => true,
        'output-encoding' => 'ascii',
        'drop-proprietary-attributes' => true
    );
    $tidy = tidy_parse_string($content, $tidy_config, "utf8");
    $tidy->cleanRepair( );
    return tidy_get_output($tidy);
}
```

The file networking system generates the content file in a flattened format using the received content free of the removed extraneous information for use in a content-centric social network. The file networking system grabs the extraneous information comprising external objects such as images, referred by the uniform resource identifier (URI), and embeds binary data inline in the file along with textual content for generating the content file in a flattened format. Using the above content file generation method, the file networking system increases unity of the hypertext markup language (HTML) format and hence the portability of the HTML format, making the HTML format better suited for local storage than other formats, for example, the portable document format (PDF) and electronic publication (ePub) formats. The file networking system implements the above content file generation method for resolving limitations in downloading content as a HTML. In an embodiment, the file networking system converts a given URI to a data URI, thereby creating a file in a reversible file format, for example, a single flattened hypertext markup language 5 (HTML5) format which has all the functionalities of a file in a portable document format (PDF) including, for example, printing using a simple red-green-blue (RGB) color model. As used herein, "reversible file format" refers to a file format that can be back transformed, for example, into an HTML format. The reversible file format is named, for example, as "PH5" that represents pagination with hypertext markup language 5 (HTML5) and comprises a set of properties including tags that are generated in accordance with structural semantics of documents in the HTML format and recognizes scripts that shape the PH5 output as disclosed in co-pending non-provisional patent application number 3348/CHE/2015 titled "Transformation Of Marked-up Content To A Reversible File Format For Automated Browser Based Pagination", filed in the Indian Patent Office on 1 Jul. 2015, which is incorporated herein by reference in its entirety and disclosed herein as an example of flattening the HTML file to make the flattened HTML file available for the transformation of a content file into a content-centric social network.

When the users subscribe to the web platform hosted by the file networking system, the file networking system receives a declaration of a user role and a usage agreement from each of the users via the graphical user interface (GUI) provided by the file networking system. The file networking system receives user roles and the usage agreement from users of the invitee user devices through their digital addresses obtained from the invite information received from the users of the first user devices. The file networking system queries a database to obtain a definition of the declared user role to configure the usage of the GUI based on the declared user role along with inputs from the user for a desired configuration. The usage agreement received from the users allows the file networking system to store and maintain the portable local copies of the content file that the file networking system subsequently provides to the users engaged with the file networking system through the respective injected tracking codes in the portable local copies of the content file. Definitions of the user roles and the usage agreement form the preconfigured criteria based on which the file networking system injects the tracking codes.

In an embodiment, the users are authors, publishers, and/or readers who access content on the graphical user interface (GUI) provided by the file networking system and who interact with the content and each other using user devices. The corresponding user roles of the users comprise, for example, a publisher of the content file, an author of the content file, a reader of the content file, and an editor of the content file. The user roles are predefined in the database of the file networking system. For example, the file networking system provides a publisher, in accordance with the corresponding user role, anonymity or visibility of engagement metrics of all authors and readers of the portable copies of the content file, where engagement metrics constitute part of usage information associated with usage of the portable local copies of the content file. As used herein, "engagement metrics" refer to measured and statistically calculated information derived from actions of the users while interacting with the content using their user devices. Engagement metrics comprise, for example, an average depth of a scroll performed by a reader of a file through content in the file, information on whether the reader is actively using the content file, ratio of daily active users to monthly active users engaging with the content file, etc. Other examples of engagement metrics comprise length of time a user is engaged with the content file, region of the content file being used, region of the content file being annotated, points in the content file from which a user initiates communication with other users, the extent of a conversation that arises at each of those points, etc.

In an embodiment, the file networking system forms groups when the users of the first user devices provide the addressees of the group to the file networking system at the time of initiating a download of the portable copies of the content file or later by declaring a new addressee in an instant messaging window in the portable local copies of the content file. The addressees of the group comprise, for example, the users of the invitee user devices, whose digital addresses are received by the file networking system from the invite information provided by the users of the first user devices. In an embodiment, the file networking system labels a user-initiated group with users of the first user devices who provide the invite information and the users of the invitee user devices as a primary group. In this embodiment, the file networking system creates a secondary group of users comprising, for example, users who are independent downloaders of the portable copies of the content file, that is, users who do not provide any invite information. Users in the secondary group of users are discoverable to each other. By invitation, a user in the secondary group of users can be made part of a primary group.

Upon a call to local storage, that is, upon request by the second user devices, the content in the uniform resource identifier (URI) is downloaded to local storage of the second user devices as portable local copies of the content file and the file networking system injects the tracking codes that radio collar the portable local copies of the content file for tracking of the portable local copies of the content file, based on the preconfigured criteria comprising, for example, the definitions of the user roles of the users of the second user devices and the usage agreement as disclosed above. As used herein, "radio collar" refers to an action of inserting code that identifies and tracks the content file. A generic computer using a generic program cannot inject a tracking code with widgets for user activities into each of the portable local copies of a content file based on preconfigured criteria in accordance with the method steps disclosed above.

The file networking system distributes 102 the portable copies of the content file with the respective injected tracking codes to the second user devices through a network based on the invite information received by the file networking system with the request to access the content file. By distributing the portable copies of the content file with the respective injected tracking codes to the second user devices, the file networking system delivers the portable copies of the content file for download purposes on the second user devices, with codesets embedded in the portable copies of the content file via the injected tracking codes for homing. As used herein, "homing" refers to maintenance of a connection of the distributed portable copies of the content file with a server from which the content file is distributed, and transmittal of file-level activity, for example, making copies of the content file, to the server.

The file networking system establishes 103 a bidirectional communication between the file networking system and the distributed portable copies, hereinafter referred to as "portable local copies", of the content file on the second user devices through the network. The file networking system sets up the portable local copies of the content file with the respective injected tracking codes for subsequent engagement with the file networking system. In an embodiment, the second user devices comprise computing devices and consuming devices. In an embodiment, unless deterred by permission, the file networking system serves a browser request originating from a computing device with an inline frame (iframe) and a codeset along with a portable local copy of the content file. The iframe and the codeset maintain connectivity between each downloaded portable local copy of the content file with the injected tracking code and the file networking system for tracking the portable local copy of the content file. For a browser request originating from a consuming device, the file networking system serves the browser request with a page cached in the browser, where the cached page comprises the content in the portable local copy of the content file and the injected tracking code that allows tracking through the file networking system.

The file networking system then receives 104 tracking information comprising touchpoints created by users of the second user devices based on usage of the portable local copies of the content file via the established bidirectional communication while managing to cover for loss of connectivity over the network. As used herein, "touchpoint" refers to an interface point defined by an interaction between a user of a second user device and a portable local copy of the content file on the second user device. Any interaction performed by a user with a portable local copy of the content file is herein referred to as a "user interaction". The touchpoints are defined by user interactions with the portable local copies of the content file on the second user devices and are identified by the injected tracking codes in the portable local copies of the content file on the second user devices. The touchpoints comprise, for example, information indicating that the portable local copy of the content file is open, information indicating that the portable local copy of the content file is in use, an annotation made on the portable local copy of the content file, indexing information of the portable local copy of the content file and the annotation therein, communication between the second user devices with the portable local copies of the content file, etc. Also, as used herein, "usage of the portable local copies" refers to access of the portable local copies of the content file on the second user devices, for example, by opening and subsequent closing of the portable local copies of the content file, and engagement of users of the portable local copies of the content file in user activities in the portable local copies of the content file. The usage of the portable local copies of the content file comprises, for example, opening the portable local copies of the content file, followed by scrolling through the portable local copies of the content file for reading, annotating portions of the portable local copies of the content file, communicating, for example, via instant messaging, with other users by either tethering the communication to an annotated portion of the portable local copies of the content file or without any tethering, etc.

An example of an annotation in a portable local copy of the content file is highlighting of a portion of the portable local copy of the content file. An example of a code snippet executed by at least one processor of the file networking system for highlighting a portion of the portable local copy of the content file is provided below:

```
var highlighter = rangy.createHighlighter( );
    highlighter.addClassApplier(rangy.createClassApplier("highlight", {
        ignoreWhiteSpace: true,
        tagNames: ["span", "a"]
}));
function highlightSelectedText( ) {
highlighter.highlightSelection("highlight");
}
function removeHighlightClass( ) {
    $(".highlight").removeClass("highlight");
};
function highlightTitle(el) {
    removeHighlightClass( );
    $(".ph5-content").highlight(el.getAttribute("title"));
};
```

The file networking system receives the tracking information even in the cases of intermittent network connectivity. For a loss of connectivity between the file networking system and the portable local copies of the content file on the second user devices over the network, the injected tracking code in each of the portable local copies of the content file stores the tracking information of the portable local copies of the content file locally on the second user devices. On reestablishment of the connectivity between the file networking system and the portable local copies of the content file on the second user devices over the network, the injected tracking code in each of the portable local copies of the content file transmits the stored tracking information from the portable local copies of the content file on the second user devices to the file networking system over the network, thereby managing the connectivity between the file networking system and the portable local copies of the content file on the second user devices. An example of a code snippet executed by at least one processor of the file networking system for storing the tracking information locally on a second user device of a user of the second user device with a user name "Alice" and a user role defined as a "reader" is provided below:

```
var userName = "Alice";
var userRole = "Reader";
    function loadScripts( ) {
        var date = new Date( );
        var t = date.getTime( );
        var time = localStorage.getItem("time");
            var title = document.getElementsByTagName('title')[0].textContent;
            var stl = title.replace(/[ a-z0-9]+/gi, "-").substring(0,40);
        if(stl == "") { stl = "Unknown-title"; }
        var internet = navigator.onLine;
        if(time) {
            localStorage.setItem("time", time + ", " + t);
        }
        else {
```

```
        localStorage.setItem("time", t);
      }
      loadIframe("http://localhost/ph5/users.php/" + userName + "/" + userRole +
"/1/" + stl);
      if(internet == true) {
        localStorage.setItem("time", t);
      }
    }
  };
  function loadIframe(url) {
      var iframe = "<iframe class=ph5-iframe src=" + url + " id=i_frame
frameBorder=0></iframe>";
      document.getElementById("idiv").innerHTML = iframe;
  };
```

Furthermore, browsers on the second user devices restrict communication between the portable local copies of the content file on the second user devices and the file networking system, for example, by restricting local files from cross-site scripting using asynchronous JavaScript and extensible markup language (XML) (AJAX) calls, to prevent security threats. In an embodiment, the file networking system circumvents such restrictions and receives tracking information from the portable local copies of the content file on the second user devices by using inline frames (iframes) on the portable local copies of the content file and RESTful services supported by modern browsers on the file networking system along with cookies and a flash memory. A generic computer using a generic program cannot receive tracking information comprising touchpoints over a network from the portable local copies of the content file on the second user devices while managing to cover for loss of connectivity over the network in accordance with the method steps disclosed above.

The file networking system indexes 105 the touchpoints in the received tracking information for tracking the usage of the portable local copies of the content file. Apart from titles of the portable local copies of the content file, user names of the users, electronic mail (email) addresses of the users, user roles, and group identities of the users, the file networking system indexes every touchpoint in the networked content file. Touchpoint indexing in the networked content file creates big data that is relevant for users who seek to mine the big data. Every interaction performed by a user, that is, every user interaction is a touchpoint and the file networking system indexes every touchpoint, for example, from a single portable and trackable data uniform resource identifier (URI) file. The file networking system performs touchpoint indexing that is triggered by user input and increases the scope of indexing beyond keywords, key phrases, sentences, and whole paragraphs. In the data URI file, a touchpoint has a tethered conversation and the depth of the conversation is known to the file networking system for relevance maximization. In an embodiment, the file networking system utilizes the indexed touchpoints of the portable local copy of the content file and the annotation therein, for example, for subsequent serving of targeted contextual advertisements through the portable local copies of the content file.

Consider an example where a portable local copy of the content file contains the play "Shakespeare's Hamlet". Users may identify discussion points such as the phrase "To be or not to be" in the portable local copy for indexing by highlighting and the file networking system thereafter indexes the touchpoint, that is, the highlighted phrase "To be or not to be". The file networking system indexes a title of the portable copy of the content file, that is, "Shakespeare's Hamlet", along with a name of the user, the user's electronic mail (email) address, a user role, and a user activity, for example, highlighting the phrase in the portable local copy of the content file on the user device through touchpoint indexing. Touchpoint indexing allows the user activity, that is, highlighting the phrase, performed on the portable local copy of the content file to be harvested, facilitated by the injected tracking code in the portable local copy of the content file. The file networking system creates and stores distinct records of the indexed touchpoints of the user in the portable local copy of the content file. The indexed touchpoints can then be used for understanding user behavior over the content file and over specific regions within the content file, thereby tracking the usage of the content file. Consider another example for non-literary human indexing, where the file networking system performs cross-indexing of the touchpoints, for example, the number of references in a conversation to a particular word such as "car", with the touchpoints, for example, number of times the users mention the word "car" by type, for example, multi utility vehicle (MUV), sports utility vehicle (SUV), sedan, etc., and by brand, and determines a predominant sentiment of the conversation. Based on the determination of the predominant sentiment of the conversation made by the file networking system, the users, for example, advertisers, can decide on a promotional spend for their line of products, for example, cars.

The file networking system indexes each touchpoint, for example, a highlight of content in the portable local copy of the content file. The touchpoint indexing performed by the file networking system collects data comprising, for example, duration of usage of the content file, density of usage within the content at a specific touchpoint, etc. The most highlighted content is not necessarily the most popular content. For example, every comment may be a criticism. The file networking system distinguishes the touchpoints created, for example, by highlighting the touchpoints into neutral, negative, positive, double positive, etc. Neutral touchpoints indicate only viewing of the content, negative touchpoints indicate disagreement or criticism of the content, positive touchpoints indicate agreement with the content, and double positive touchpoints indicate appreciation and adding to the content. The touchpoints comprise all user interactions with the portable local copies of the content file, for example, comments, highlights of content, conversations tethered to content, etc., beyond mere interactions with forms, buttons, hyperlinks, etc., in the portable local copies of the content file. Through indexing of the touchpoints, the file networking system records each content unit of interaction of the users with the portable local copies of the content file against the title and metadata of the portable local copies of the content file. The file networking system constantly raises the levels of awareness of details of the content file in a machine, for example, a search engine on a server that uses the content file. The increased awareness of the content file results in more meaningful content discovery, for example, content related to topics covered in the content file, content related to popular portions of the content file, etc., through the search engine. In an embodiment, by increasing awareness of the content file in the machine, the file networking system manifests as a relevance maximization engine (RME) based on content. Identifying the touchpoints of readers provides other readers, the authors, the publishers, and analysts of the content file with feedback on the content of the content file from the readers.

The file networking system creates 106 a satellite internet of users of the portable local copies of the content file on the second user devices based on the invite information received from the first user devices and the tracked usage of the portable local copies of the content file. As used herein, "satellite internet of users" refers to a network of users of the portable local copies of the content file formed by the file networking system via a network. Satellite internet is a network in which downloaded, offline hypertext markup language (HTML) files, that is, the portable local copies of the content file, have the potential to be part of a network, for example, the internet. Similar to satellites, the collective of the portable local copies of the content file is sometimes visible and at other times not visible, but functions as a part of a planetary system called the internet. The file networking system creates the satellite internet of users based on same-file usage of the portable local copies of the content file, that is, usage by downloading the portable local copies of the content file or by being invited and then downloading the portable local copies of the content file. In an embodiment, the indexed touchpoints trigger the creation of the satellite internet of users. The file networking system allows users to isolate files with conversations with a density above a certain limit to form a meta-satellite, that is, a satellite of a satellite.

The file networking system links the users of the portable local copies of the content file on the second user devices using the indexed touchpoints, where the indexed touchpoints comprise information of the users of the portable local copies of the content file and the communication between the users. The created satellite internet of users comprises the users of the first user devices and the users of the invitee user devices whose digital addresses are obtained through the invite information. The file networking system establishes 107 communication between the users of the portable local copies of the content file on the second user devices in the created satellite internet of users using one or more of the widgets for the user activities through the injected tracking codes in the portable local copies of the content file and the indexed touchpoints, thereby transforming the content file into a content-centric social network with managed connectivity and indexable touchpoints.

In an embodiment, the file networking system logs user activities in the portable local copies of the content file on the second user devices in the created satellite internet of users using one or more of the widgets for the user activities through the injected tracking codes. As used herein, "logging" refers to recording data on the usage of the portable local copies of the content file from the injected tracking code in the portable local copies of the content file by the file networking system. Users in the created satellite internet of users perform user activities, for example, annotation, highlighting, commenting, etc., in the portable local copies of the content file using the widgets for the user activities through the injected tracking codes. Performance of the user activities on the portable local copies of the content file constitutes the usage of the portable local copies of the content file. The file networking system logs the user activities for establishing the communication between the users of the portable local copies of the content file on the second user devices in the created satellite internet of users. The injected tracking codes in the portable local copies of the content file collect and send data on the usage of the portable local copies of the content file and hence the performed user activities to the file networking system. The file networking system uniquely logs the user activities performed in each portable local copy of the content file. Based on the logged user activities, the file networking system establishes the communication between the users of the portable local copies of the content file on the second user devices. For example, if a user of a portable local copy of the content file highlights and comments on a portion of the portable local copy of the content file, the file networking system logs the highlights and the comments and broadcasts the highlights and the comments to users in the created satellite internet of users who are concurrently accessing the portable local copy of the content file, with an identification of the user who highlighted and commented on the portion of the portable local copy of the content file. The logging and broadcasting of the user activities allow further communication, for example, commenting and exchange of messages between the users of the portable local copies of the content file on the second user devices in the created satellite internet of users.

In an embodiment, the file networking system groups users in the created satellite internet of users automatically. Grouping is a method that allows exclusion and inclusion of users as pertinent to the communication around the content in the content file. Grouping enables the users with similar interests and activities to interact with each other and share content. The file networking system performs grouping automatically based on the access of the content file. Users of the second user devices that download the same content, that is, the uniform resource identifier (URI), automatically belong to a specific content group. The file networking system subsumes the conventional method of grouping by invitation. The file networking system groups the second user devices into one or more groups comprising primary groups and a secondary group. Primary groups comprise users of the first user devices who provide the invite information and users of the invitee user devices invited by the first user devices. The secondary group comprises users who are independent downloaders of the URI, that is, default download users. In an embodiment, the file networking system groups the second user devices into one or more groups comprising the primary groups and the secondary group for configuring the establishment of the communication between the users of the portable local copies of the content file on the second user devices in the created satellite internet of users. In this embodiment, the communication between the users of the portable local copies of the content file in a primary group is not visible to the users of the portable local copies of the content file in other primary groups and the secondary group. The file networking system allows the users of the portable local copies of the content file in the secondary group to discover each other in the created satellite internet of users to form primary groups by inviting each other, for example, through an instant messaging window in the portable local copies of the content file. Furthermore, the file networking system allows the users of the portable local copies of the content file in the secondary group to receive invites from the users of the portable local copies of the content file in the primary groups to become part of the primary groups.

In an embodiment, the file networking system establishes the communication between the users of the portable local copies of the content file on the second user devices in the created satellite internet of users based on user rights management (URM) set up by a publisher of the content file. As used herein, "user rights management" refers to access control protocols and presets used to calibrate usage of content of the content file. The file networking system implements URM, for example, to limit viewing portions of the content file and/or sharing of the data on the usage of the content file, when needed, to restrict sharing of annotated tethered chats, and to allow the users of the portable local copies of the content file to set their own visibility or anonymity, depending on the user roles that the users have declared at the time of downloading the portable copies of the content file. The file networking system utilizes a user name, an internet protocol (IP) address, a client device identification (ID), location, an electronic mail (email) identification (ID), and a grouping of the users to configure different levels of access for the user.

Through the method steps 101, 102, 103, 104, 105, 106, and 107 disclosed above, the file networking system transforms the content file into a content-centric social network with managed connectivity and indexable touchpoints. The method steps 101, 102, 103, 104, 105, 106, and 107 require no less than seven separate computer programs that cannot be easily or manually executed by a person working with a generic computer. The file networking system forms the content-centric social network automatically based on commonality of content files downloaded directly or by invitation. The content-centric social network is then extended based on communication between the file networking system and common, grouped users of the portable local copies of the content file, who induce indexed touchpoints in the portable local copies of the content file by way of annotations on the portable local copies of the content file and initiate discussions over the indexed touchpoints, while tethering the discussions to the annotations. The users may also initiate discussions that are not tethered to an annotation, as pure messages with no anchor in the content of the portable local copies of the content file. In cases where the discussions are not tethered to an annotation, the file networking system falls back on relevance maximizing the untethered touchpoints based on information available at a file level, for example, title and/or metadata of the portable local copies of the content file. Untethered touchpoints yield less relevance compared to tethered touchpoints in subsequent analyses of touchpoints. That is, untethered touchpoints are also tethered touchpoints, except that the untethered touchpoints are tethered to the portable local copies of the content file instead of being tethered to a specific annotation in the portable local copies of the content file. The steps performed by the file networking system disclosed above are tangible, provide useful results, and are not abstract.

In an embodiment, the file networking system compiles usage information associated with the usage of the portable local copies of the content file on the second user devices from the received tracking information and the established communication between the users of the portable local copies of the content file on the second user devices in the created satellite internet of users. The file networking system collects usage information generated by the second user devices at user defined touchpoints, and compiles, analyzes, and dashboards the usage information for users who want to consume the usage information. The file networking system compiles the usage information by statistically analyzing the tracking information comprising the touchpoints received from the portable local copies of the content file on the second user devices using page tags with JavaScript® code, cookies, log files, etc. The usage information that is compiled comprises the engagement metrics. The usage information comprises information, for example, about the hottest content file of the month, week, day, or moment, hottest pages in the content file, the portions of the content file being talked about the most, etc. In an embodiment, the file networking system provides the usage information as raw data, for example, to publishers of the content file, third party developers, etc., for building customized analytics and dashboards with statistical information about the usage of the portable local copies of the content file.

In an embodiment, the file networking system sends the compiled usage information associated with the usage of the portable local copies of the content file on the second user devices of the readers of the content file to a second user device of a publisher of the content file. The file networking system facilitates targeting of advertisements published by the publisher of the content file to the second user devices of the readers of the content file based on the compiled usage information associated with the usage of the portable local copies of the content file on the second user devices of the readers of the content file. In another embodiment, the file networking system renders the compiled usage information associated with the usage of the portable local copies of the content file on the second user devices of the readers of the content file to the second user devices of the authors of the content file for initiating a selective communication with one or more of the readers of the content file by the authors of the content file based on the compiled usage information and allowing monitoring of the usage of the portable local copies of the content file on the second user devices of the readers of the content file by the authors of the content file. The compiled usage information comprises readership information of the content file. As used herein, "readership information" refers to information about the number of readers of the content file and portions of the content file most discussed by the readers of the content file using the widgets for the user activities in the portable local copies of the content file on the second user devices of the readers of the content file. The authors of the content file, according to their preferences, can therefore engage with one or more readers of the content file.

In an embodiment, the file networking system supports downloading of the content file to local storage, that is, a local disk by users for offline consumption of the content. Every time the user is online, a server side uniform resource identifier (URI) proxies the portable local copy of the content file, thereby allowing the users to view the same region in the content file. Annotations performed on the portable local copy of the content file are carried to corresponding positions in the proxied copy of the content file on the file networking system implemented, for example, as a server. In an embodiment, the file networking system provides users, who declare themselves as authors at the time of downloading the content file, an option to toggle their presence as online or offline. The users declared as authors can view and monitor the usage of the portable local copy of the content file of the readers of the content file since the portable local copy of the content file of the readers is proxied on the file networking system. In an embodiment, the option to toggle a presence in a group is provided to all the users in the group, thereby enabling all the users in the group to have equal access rights similar to a chat room where a user can be viewed as offline or online.

In another embodiment, the file networking system sends the compiled usage information associated with the usage of the portable local copies of the content file on the second user devices of the authors of the content file to the second user device of the publisher of the content file. The file networking system establishes a round-trip communication between the authors of the content file and the publisher of the content file for review of the content file prior to publication of the content file and for performing updates to the content file after the publication of the content file based on the compiled usage information. As used herein, "round-trip communication" refers to back and forth communication between the authors of the content file and the publisher of the content file for making and approving edits to the content file prior to the publication of the content file and during an update of the content file after the publication of the content file.

In an embodiment, the file networking system generates usage information comprising, for example, dashboards, charts, etc., with statistics derived from the tracking information received from the portable local copies of the content file by applying statistical analysis. The generated usage information is associated with the usage of the portable local copies of the content file on the second user devices of readers of the content file. The file networking system sends the generated usage information to a publisher of the content file to facilitate, for example, targeted advertising by the publisher of the content file based on the compiled usage information.

In an embodiment, the file networking system injects a tracking code into a flattened data uniform resource identifier (URI) file upon a call to local storage by the second user devices requesting access to the flattened data URI file. By injecting the tracking code, the file networking system transforms the data URI file into an application along with a codeset for tracking local usage of the transformed data URI file in the satellite internet of users of the second user devices, that is, a network of users of the transformed data URI file created by the file networking system. The process of injecting the tracking code does not need human interaction with the file networking system. A codeset that enables network functionality can be served to authorised machine requests in the form of application programming interface (API) calls. The file networking system serves the usage information associated with the transformed data URI files downloaded by the users, directly into servers of a publisher of the data URI file.

The transformed data uniform resource identifier (URI) file downloaded by the users signal an engagement to the file networking system every time the transformed data URI file is opened on each of the user devices. The file networking system, in turn, can signal information, for example, concurrent usage information involving other users concurrently using the transformed data URI files downloaded by them, back to the transformed data URI files that signaled an engagement to the file networking system. The file networking system establishes communication between concurrent users of the transformed data URI files in the created satellite internet of users. In an embodiment, when the users comprise authors, readers, and a publisher of the data URI file, the file networking system allows engagement at multiple levels between the publishers, authors, and the readers of the data URI file based on user rights management (URM) set up by the publisher of the data URI file. For example, the usage information compiled by the file networking system allows the publisher of the data URI file to track and understand the usage of the transformed data URI file. In another example, the usage information compiled by the file networking system allows the authors of the data URI file to view a list of users using the transformed data URI file at a point of time, the frequency and duration of the use of the transformed data URI file, and communication between the users of the transformed data URI file.

The file networking system receives the user roles, digital addresses of the users, the invite information of the users of the invitee user devices, and the usage agreement when the users subscribe to the file networking system via the graphical user interface (GUI) provided by the file networking system. Based on the received user roles, the digital addresses of the users, and the usage agreement, the file networking system constructs threads that transform the data uniform resource identifier (URI) file into an application. For example, the file networking system embeds instant messaging for communication among readers of the data URI file, for communication between an author and readers of the data URI file, and for communication round trips between a publisher, an author, readers, and reviewers. The file networking system provides a common platform for all the users to be engaged concurrently on a specific portion of the transformed data URI file. In another example, the file networking system shows engagement metrics with the usage information compiled by the file networking system in the transformed data URI file. The file networking system also supports focused advertising by the publisher of the data URI file based on the compiled usage information associated with the usage of the transformed data URI files on the second user devices.

The usage information compiled by the file networking system is content-centric and has a semantic potential for mining and relevance matching of businesses to their target customers. An indexing policy implemented by the file networking system is driven by the content of the data uniform resource identifier (URI) file and not by user information. The file networking system does not receive an individual user's private data beyond one of the user's digital addresses, for example, an electronic mail (email) address. The file networking system provides an option to the users to opt for the usage agreement and corresponding transformation of the data URI file into an application. The user can configure the nature of the transformed data URI file using the potential of rich content that hypertext markup language (HTML) can deliver. The user can also configure the delivery of the content to be minimally intrusive.

The portable local copies of the content file are downloaded or cached locally on user devices and become asynchronous relative to the content file on the file networking system, for example, a webpage that may be dynamic and evolving. The file networking system receives updates made to the portable local copies of the content file by users of one or more of the second user devices based on predetermined user rights associated with the users. The user rights are provided, for example, by a publisher of the content file. The file networking system updates the content file based on the received updates. The file networking system then generates and transmits notifications of an availability of the updated content file to users of the second user devices for providing access of the updated content file to the second user devices. In an embodiment, the file networking system allows the users who have made the updates to the portable local copies of the content file on their user devices to notify all other users who have downloaded an earlier version of the content file of an availability of the updated content file for download. The file networking system links back to the earlier version of the content file and allows the users who have the predetermined user rights to synchronize the content file to the more recent local version of the content file on their user devices.

The second user devices comprise computing devices, that is, devices that typically allow explicit local storage, for example, desktops, laptops, servers, etc., and consuming devices, that is, devices that are typically without explicit local storage, for example, tablet devices, electronic reading devices, smart phones, etc. In an embodiment, the file networking system automatically recognizes the category of the second user devices. That is, the file networking system detects the computing devices and the consuming devices from among the second user devices for the establishment of the bidirectional communication between the file networking system and the portable local copies of the content file and the establishment of the communication between the users of the portable local copies of the content file in the created satellite internet of users. In an embodiment, the detection of the computing devices and the consuming devices from among the second user devices allows the file networking system to receive tracking information from the portable local copies of the content file on the second user devices. The file networking system sets up the content file for tracking based on the detection. When the second user device is a computing device, the file networking system injects an inline frame (iframe) and a codeset into a portable copy of the content file provided by the file networking system for download, that keep the downloaded portable local copy of the content file in touch with the file networking system. When the second user device is a consuming device, the file networking system injects a tracking code into the content of the content file, stores the content of the content file with the injected tracking code in a cache of the browser, and provides a portable copy of the content file for download. The downloaded portable copy, that is, the portable local copy of the content file in the consuming device redirects to the content of the content file stored in the cache of the browser when opened by a user on the second user device.

In an embodiment, when second user devices defined in the category of computing devices, for example, desktops, laptops, servers, etc., request access to a data uniform resource identifier (URI) file on the file networking system, the file networking system responds to the request and provides a complete download of the content in the content file as a single flattened hypertext markup language (HTML) file with binary data of images and multimedia components as a Base64 encoded data uniform resource identifier (URI) within the HTML file to these second user devices. As the second user devices download the flattened HTML file, the flattened HTML file is radio collared with scripts that transmit the presence of the flattened HTML file to the file networking system through an HTML inline frame (iframe) element. Bidirectional communication between the file networking system and the downloaded flattened HTML file is set up through web sockets, allowing real time communication, for example, a web chat between readers, and/or authors, and/or a publisher of the flattened HTML file. In an embodiment, the file networking system uses a XAMPP® server with Apache web server software, a hypertext preprocessor (PHP) server side scripting language, and a MySQL® relational database management system (RDBMS) to implement a RESTful web service. The RESTful web service returns a list of users that were or are using the downloaded flattened HTML file based on the transmission of the presence of the downloaded flattened HTML file by the HTML iframe element in the downloaded flattened HTML file. Multi-channel communication is set up between the users through web sockets at the central Apache server. A chat server is implemented with the help of the web sockets.

Second user devices defined in the category of consuming devices, for example, tablet devices, electronic reading devices, smart phones, etc., do not allow standard browsers to access local hypertext markup language (HTML) files. When these second user devices request access to a data uniform resource identifier (URI) file on the file networking system, the file networking system uses an HTML local cache in the browser to store content of the data URI file in the browser along with a tracking code injected into the content of the data URI file by the file networking system. The content of the data URI file is stored as unique hypertext transfer protocol (http) or hypertext transfer protocol secure (https) uniform resource identifiers (URIs) with appended checksums. The file networking system provides a download of a flattened HTML file that is a small file with minimal content by itself. However, the HTML file redirects to the cached http or https URIs that have the content of the data URI file in the browser of the second user device. In an embodiment, the file networking system stores the http or https URIs with the content of the data URI file and appended checksums in an external server as persistent URIs for long term stability or cloud scale stability of the http or https URIs. A generic computer using a generic program cannot set up a download of the portable copies of a content file on a server based on the category of user devices requesting access to the portable copies of the content file, inject a tracking code with widgets for the user activities, receive tracking information comprising touchpoints from the downloaded portable copies of the content file, index the touchpoints, create a satellite internet of users of the downloaded portable local copies of the content file, establish a communication between the users of the portable local copies of the content file, and compile usage information associated with the usage of the downloaded portable local copies of the content file from the received tracking information and the established communication between the users of the portable local copies of the content file on the second user devices in the created satellite internet of users in accordance with the method steps disclosed in the embodiment above.

In the computer implemented method disclosed herein, the design and flow of the steps performed by the file networking system is deliberate, designed, and directed. Every communication and processing step performed by the file networking system steers the computer implemented method disclosed herein towards a finite set of predictable outcomes. The file networking system implements one or more specific computer programs to direct the computer implemented method towards a set of end results. The communications established by the file networking system allow the file networking system to receive the content for a file, the user role, the usage agreement, etc., from users. Through the execution of separate and autonomous computer programs, the file networking system injects a tracking code with widgets for user activities into portable copies of the content file distributed to the users who consent to the usage agreement and receives the tracking information comprising the touchpoints from the portable local copies of the content file with the injected tracking code on the user devices of the users. From this tracking information, the file networking system indexes the touchpoints and creates a satellite internet of users of the portable local copies of the content file.

The computer implemented method disclosed herein effects an improvement to the field of authoring and publishing content by providing relevant engagement with consumers of the authored and published content. The computer implemented method disclosed herein addresses a specific requirement for engaging consumers of content by compiling usage information associated with the usage of the content downloaded by the consumers onto their user devices and establishing communication between the consumers, authors, and publisher of the content. Since conventional methods that attempt engagement with consumers do not assure continued engagement after the consumers obtain the content, publishers and authors are unable to fully utilize the marketing potential of the content by themselves, and instead depend on stores that sell the content.

In some cases, the publishers use a cloud computing environment or a proprietary software for content delivery, which increases cost for the consumers who have to pay for the corresponding consequent network usage or proprietary software. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. The computer implemented method disclosed herein reduces the cost of network usage by minimizing the network usage to merely communicate the tracking information for engagement, and that only if the consumer consents to a corresponding usage agreement. The computer implemented method disclosed herein improves the communication between the authors and the publishers by providing a common platform in the form of a portable file with content to send and receive communication from the users during generation of the content, both prior to and after publishing, as opposed to converting between file formats and generating numerous files for the content in conventional methods. The computer implemented method disclosed herein further establishes communication between the consumers, publishers, and authors of content for greater involvement in consumption of the content within a content-centric social network.

Furthermore, the computer implemented method disclosed herein improves the functioning of the computer, that is, the user device, by integrating with the basic functionality of the user device, through access to underlying hardware resources of the user device. The computer implemented method disclosed herein improves the functioning of the computer and provides an improvement in computer related technology as follows: In the computer implemented method disclosed herein, the file networking system stores portable local copies of a content file on the file networking system locally on the user device for consumption and transmission of the portable local copy of the content file as desired by a user of the user device. Moreover, the file networking system facilitates homing of the portable local copies of the content file by maintaining the connectivity between the portable local copies of the content file and the file networking system that hosts the content file. The file networking system facilitates the homing of the portable local copies of the content file using the respective injected tracking codes for receiving file-level activity, for example, making copies of the file, from the portable local copies of the content file. Through homing, the file networking system prevents unintended use of the portable copies of the content file. Furthermore, the file networking system allows storage of the tracking information of the portable local copies of the content file by the injected tracking code in each of the portable local copies of the content file locally on the user device when there is no connectivity between the user device and the file networking system that hosts the content file. The file networking system receives the stored tracking information on reestablishment of the connectivity, seamlessly establishes communication in the satellite internet of users of the portable local copies of the content file, and compiles usage information associated with the usage of the portable local copies of the content file from the received tracking information and the established communication between the users of the portable local copies of the content file. Hence, the user device is not required to be continuously connected to a network for a user of the user device to consume content of the portable local copy of the content file. Conventional methods for engaging the user utilize a cloud computing environment, which requires continuous connectivity to a network, for example, the internet, or a proprietary software for consumption of the content, which requires installation of the proprietary software, thereby consuming resources of the user device. The computer implemented method disclosed herein improves efficiency of network usage and reduces wear and unnecessary usage of the hardware resources, for example, a power source such as a battery, the network interface, the memory, and the processor of the user device. The software implementation of the file networking system is an improvement in computer related technology.

Furthermore, the computer implemented method and system disclosed herein transform data to effect a solution for transforming a content file into a content-centric social network with managed connectivity and indexable touchpoints. The data input to a computer, that is, the user device, is transformed as follows: The file networking system receives content, user roles, and the usage agreement from users, and automatically detects the user devices of the users as one of a computing device, for example, laptops, desktops, etc., and a consuming device, for example, smartphones, tablet computing devices, etc. The file networking system transforms the content into a portable file that can be saved on the user devices and set up for tracking and communication based on the category of the user devices, the usage agreement, and the user roles. In an embodiment, the file networking system transforms the portable file into an application along with a codeset for tracking local usage in the satellite internet of users and for tracking communication between the users in the satellite internet of users. Furthermore, the file networking system transforms the tracking information received from the portable local copies of the content file on the user devices into usage information for obtaining various engagement metrics, providing focused advertising, and engaging consumers of the content by being aware of their particular interests.

Through the computer implemented method and system disclosed herein, an author of a book can interact with readers of the content file by opening a copy of the book to view concurrent readers and current pages they are involved in to a resolution of the word they are at in a page. The author can also sign copies of the book for the readers in accordance with the computer implemented method disclosed herein. In another example, a teacher can step through a lesson along with students in synchronization in accordance with the computer implemented method disclosed herein. A publisher of a file can obtain usage data of the content file, engagement metrics, and information on users of the content file, and also set user rights management (URM) for the content file and provide the users with periodical updates to the content file in accordance with the computer implemented method disclosed herein. An advertiser can obtain information on the portions of a document most used, most commented, most visited, etc., to know the most relevant placement of advertisements in accordance with the computer implemented method disclosed herein. Users requiring privacy can opt to disallow gathering of tracking information and can opt to get engaged with other users at a later point in time. The computer implemented method and system disclosed herein allows engagement between users of a content file even with local storage of the content file, thereby allowing greater privacy and lesser expenditure by reducing internet usage for the users.

Figure 2:
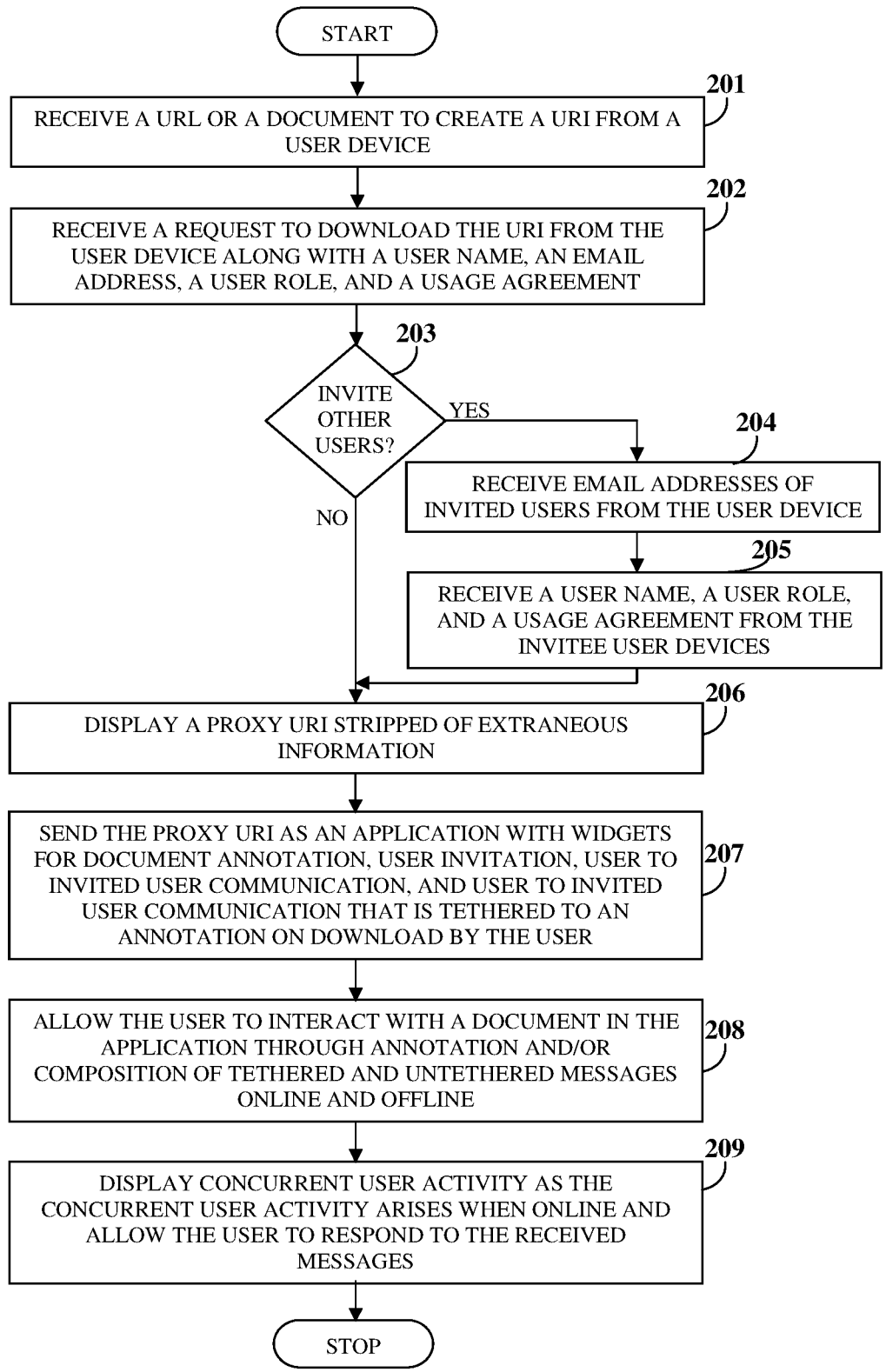
FIG. 2 exemplarily illustrates a flowchart comprising the steps performed by a file networking system for distributing portable copies of a content file to user devices and facilitating networking and engagement of users of the user devices with the distributed portable copies of the content file.

FIG. 2 exemplarily illustrates a flowchart comprising the steps performed by the file networking system for distributing portable copies of a content file to user devices and facilitating networking and engagement of users of the user devices with the distributed portable copies, hereinafter referred to as "portable local copies", of the content file. The file networking system receives 201 a uniform resource locator (URL) or a document to create a uniform resource identifier (URI) from a user device. The file networking system receives content from the user device and generates a URI with the received content. The generated URI is the content file that is stored on the file networking system. The file networking system receives 202 a request to download the generated URI from the user device. Along with the request, the user of the user device provides a user name, an electronic mail (email) address, a user role, and a usage agreement. The file networking system checks 203 whether the user intends to invite other users to view and engage with a portable local copy of the content file. If the user does not intend to invite other users, the file networking system proceeds to display 206 a proxy URI stripped of extraneous information as disclosed in the detailed description of FIG. 1. If the user intends to invite other users, the file networking system receives 204 email addresses of the invited users from the user device. By contacting the invited users using the received email addresses, the file networking system receives 205 user names, user roles, and a usage agreement from invitee user devices of the invited users. The file networking system then displays 206 a proxy URI stripped of extraneous information.

When the user initiates a download of the displayed proxy uniform resource identifier (URI), the file networking system sends 207 the proxy URI as an application with widgets for document annotation and user invitation for the user to invite other users from the downloaded proxy URI, to a user device of the user. Moreover, the proxy URI sent by the file networking system allows communication between the user and the invited users that is independent of, or tethered to, an annotation made on the proxy URI. The file networking system transforms the proxy URI into an application as disclosed in the detailed description of FIG. 1. The application that is sent to the user device is the portable local copy of the content file. Through the above steps performed by the file networking system, the user receives a portable local copy of the content file on the user device. The file networking system performs the following steps to allow engagement between the file networking system and the portable local copy of the content file on the user device and between the users of the portable local copies of the content file through the file networking system. The file networking system allows 208 the user to interact with a document comprising the content in the proxy URI, that is part of the application sent by the file networking system, through annotation and/or composition of messages that are untethered or tethered to an annotation online and offline. In an offline mode, the file networking system allows the user to interact with the document when the application is not connected to the file networking system over a network by storing tracking information related to the interaction in a local storage in the user device as disclosed in the detailed description of FIG. 1. The file networking system displays 209 concurrent user activity of the users connected to the file networking system through the network as the concurrent user activity arises when the user is online, that is, connected to the file networking system over the network, and allows the user to respond to the messages received from other users.

Figure 3:
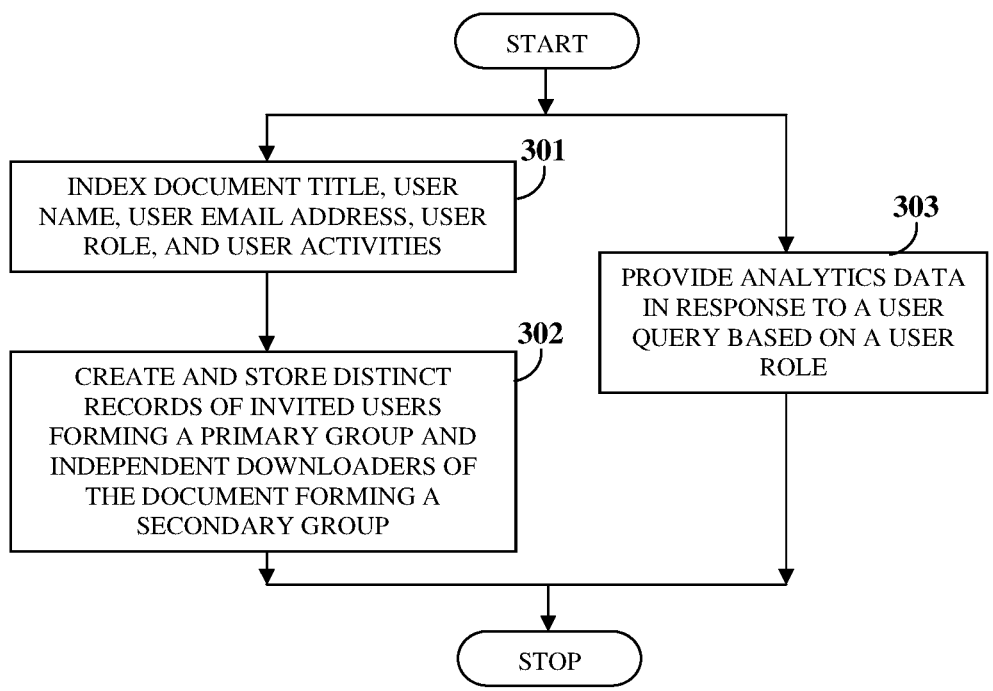
FIG. 3 exemplarily illustrates a flowchart comprising the steps performed by the file networking system for indexing touchpoints of portable local copies of the content file on user devices and providing analytics data of the portable local copies of the content file based on the indexing.

FIG. 3 exemplarily illustrates a flowchart comprising the steps performed by the file networking system for indexing touchpoints of portable local copies of the content file on user devices and providing analytics data comprising the usage information of the portable local copies of the content file based on the indexing. The file networking system indexes 301 a title of a document, that is, the portable local copy of the content file, on the user devices, along with user names, user electronic mail (email) addresses, user roles, and user activities of the users with the portable local copies of the content file on their user devices. The file networking system indexes the user activities through touchpoint indexing. Touchpoint indexing allows user activities performed on a portable local copy of the content file to be harvested, facilitated by the injected tracking code in the portable local copy of the content file. The file networking system creates and stores 302 distinct records of users invited by the user and independent downloaders of the content file. The file networking system forms a primary group comprising the user and the invited users and a secondary group comprising the independent downloaders of the document. Moreover, when the users of the portable local copies of the content file initiate a query for viewing analytics data obtained from tracking information received from the portable local copies of the content file, the file networking system provides 303 the analytics data to the users based on their user roles. The analytics data provided by the file networking system comprise the engagement metrics disclosed in the detailed description of FIG. 1.

Figure 4:
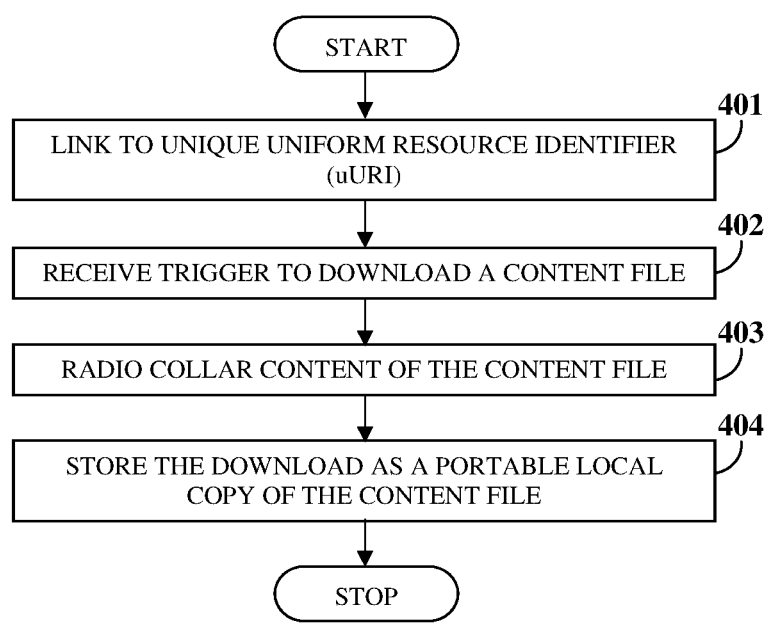
FIG. 4 exemplarily illustrates a flowchart comprising the steps performed by the file networking system on a content file when a user requests access to the content file on the file networking system.

FIG. 4 exemplarily illustrates a flowchart comprising the steps performed by the file networking system on a content file when a user requests access to the content file on the file networking system. When the user requests access to the content file on the file networking system through a browser on a user device used by the user, the file networking system links 401 to a unique uniform resource identifier (uURI). The uURI, generated by the file networking system, points to content of the content file. The file networking system receives 402 a trigger to download the content file. In response, the file networking system caches the uURI in the browser and upon a call to local storage accompanying the trigger to download the content file, the file networking system radio collars 403 the content of the content file. The file networking system radio collars the content of the content file by injecting a tracking code into the content of the content file based on a definition of a user role and a usage agreement received from the user prior to receiving the request to access the content file on the file networking system. The file networking system stores 404 the download, which is the radio collared content of the content file, as a portable local copy of the content file on the user device.

Figure 5:
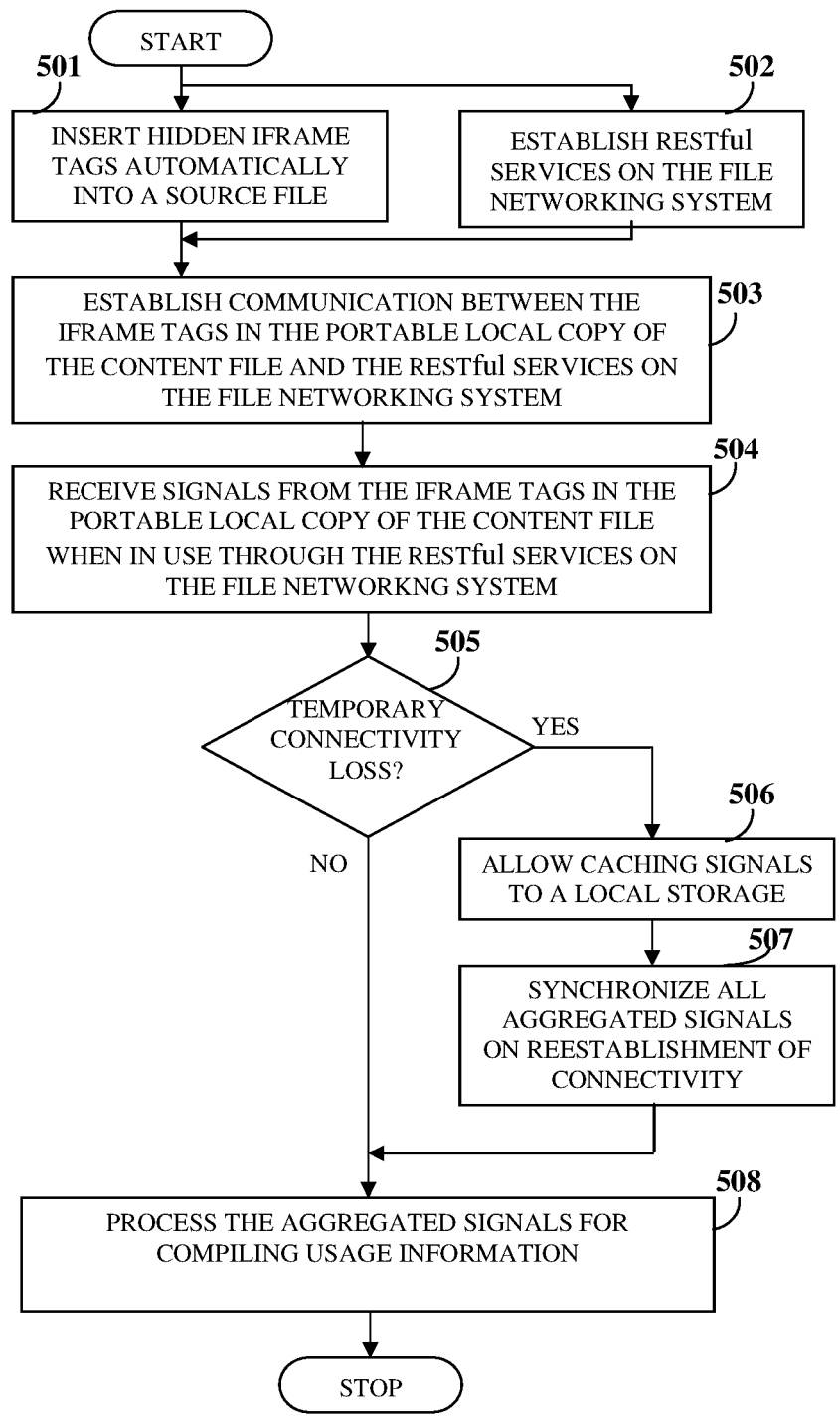
FIG. 5 exemplarily illustrates a flowchart comprising the steps performed by the file networking system for receiving tracking information comprising usage information from a portable local copy of a content file on a user device.

FIG. 5 exemplarily illustrates a flowchart comprising the steps performed by the file networking system for receiving tracking information comprising usage information from a portable local copy of a content file stored on a user device. The file networking system inserts 501 hidden inline frame (iframe) tags automatically into a source file from which a portable local copy of the content file is downloaded to the user device. By inserting the iframe tags into the source file, the file networking system radio collars the portable local copy of the content file for tracking the portable local copy of the content file. The file networking system establishes 502 RESTful services for receiving tracking information from the portable local copy of the content file stored on the user device. The file networking system establishes 503 a communication between the iframe tags in the portable local copy of content file stored on the user device and the RESTful services established on the file networking system. All portable local copies of the content file with the iframe tags communicate with the file networking system concurrently. When the portable local copy of the content file is in use, the file networking system receives 504 signals from the iframe tags in the portable local copy of the content file through the RESTful services established on the file networking system. The received signals comprise the tracking information of the portable local copy of the content file on the user device.

The file networking system checks 505 whether there is a temporary loss of connectivity between the user device and the file networking system. If there is no loss of the connectivity, the file networking system processes 508 the aggregated signals for compiling usage information associated with the usage of the portable local copy of the content file. If there is a temporary loss of the connectivity, the file networking system, according to the inline frame (iframe) tags inserted into the source file, allows 506 caching of the signals from the iframe tags in the portable local copy of the content file to a local storage on the user device. On reestablishment of connectivity between the user device and the file networking system, the file networking system synchronizes 507 all the aggregated signals that are stored in the local storage of the user device with the signals received earlier from the iframe tags in the portable local copy of the content file with the user. The file networking system processes 508 the aggregated signals comprising the tracking information received from the iframe tags in the portable local copy of the content file to compile usage information associated with the usage of the portable local copy of the content file.

Figure 6:
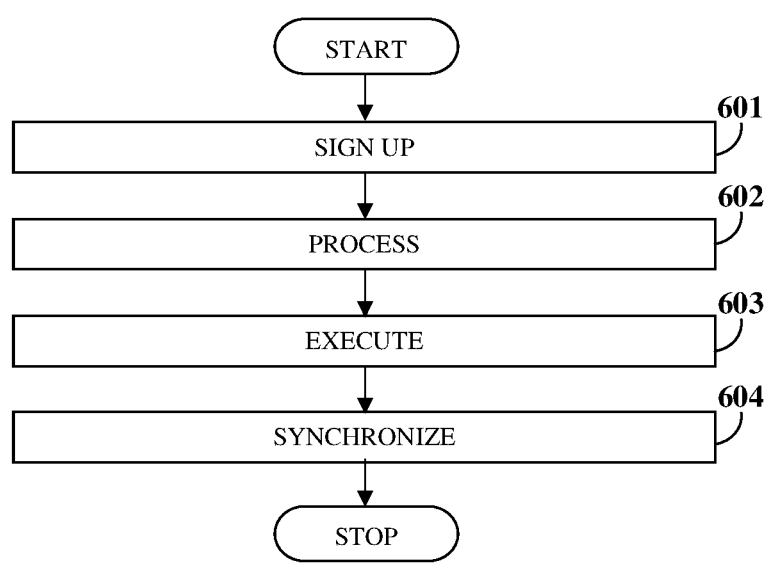
FIG. 6 exemplarily illustrates a high level process flow diagram for an implementation of the file networking system.

FIG. 6 exemplarily illustrates a high level process flow diagram for an implementation of the file networking system. The file networking system provides a graphical user interface (GUI), for example, a web interface hosted on a web platform via the internet, that converts a uniform resource identifier (URI) to a data URI. The file networking system signs up 601 users to this web platform via the GUI. In an embodiment, the users comprise authors, publishers, and readers from whom the file networking system receives content in various forms through the GUI, thereby obtaining a URI of the content. The file networking system processes 602 the content received from the users to create a data URI, and hence a file, and provides the users with portable local copies of the content file for local storage and subsequent transmission of the locally stored portable local copies of the content file as desired by the users. As part of a download of the portable local copies of the content file for local storage, the file networking system receives a usage agreement from the users to keep the content file engaged with the file networking system and based on the usage agreement and a user role, the file networking system sets up the portable local copies of the content file for engagement.

The file networking system executes 603 computer program codes for receiving tracking information comprising touchpoints from the portable local copies of the content file via a two-way communication established by the file networking system, indexing the touchpoints, creating a satellite internet of users of the portable local copies of the content file, establishing communication between the users of the portable local copies of the content file, logging user activities in the portable local copies of the content file, and compiling usage information associated with the usage of the portable local copies of the content file as disclosed in the detailed description of FIG. 1. The file networking system also establishes communication between the users of the content file based on user rights management (URM) set up by a publisher of the content file as disclosed in the detailed description of FIG. 1, thereby establishing a satellite internet of users of the portable local copies of the content file. The file networking system synchronizes 604 updates to the portable local copies of the content file by users with predetermined user rights with the content file as disclosed in the detailed description of FIG. 1. The file networking system provides managed synchronization of the portable local copies of the content file with the content file on the file networking system.

Figure 7:
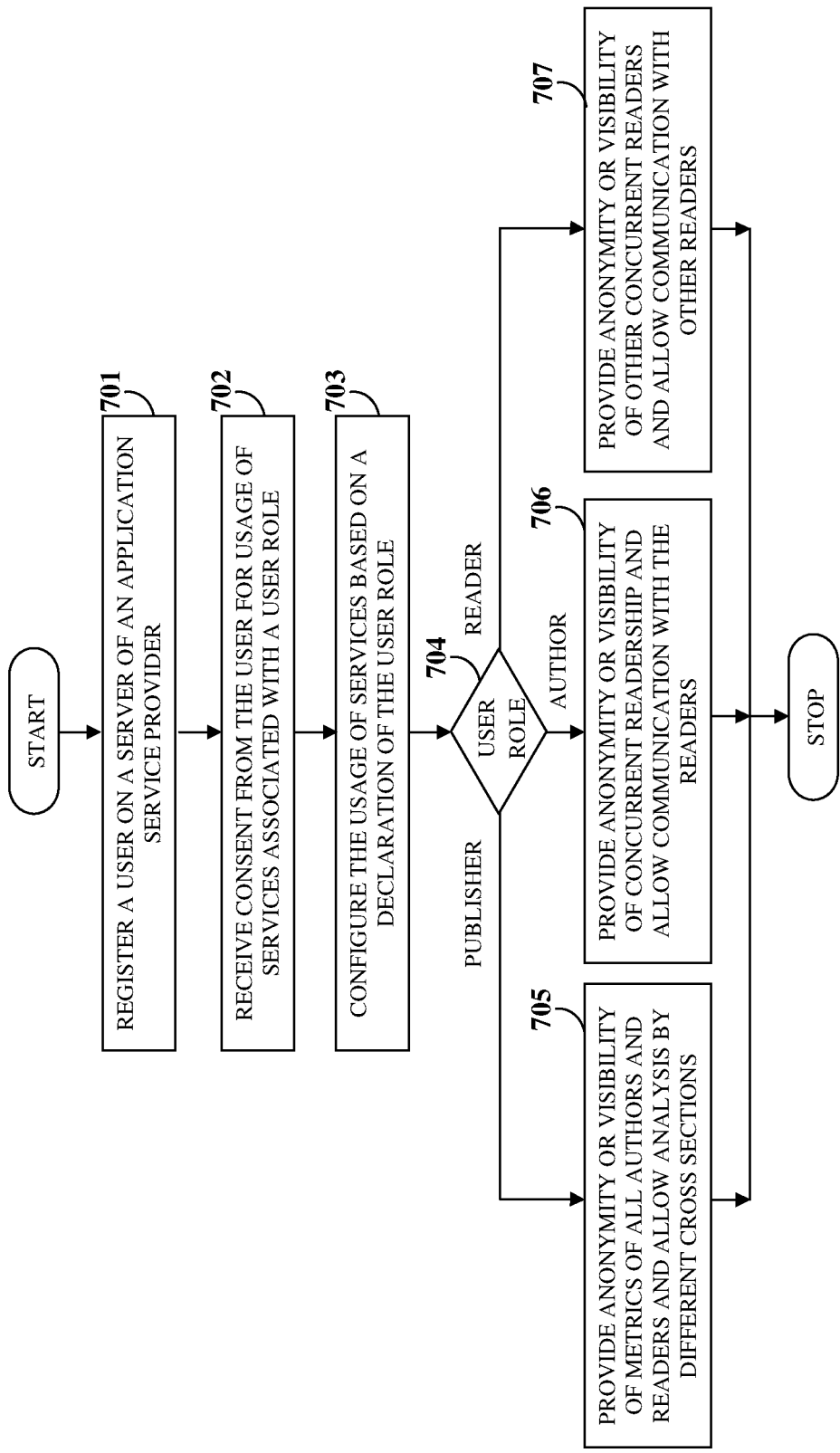
FIG. 7 exemplarily illustrates a flowchart comprising the steps performed by the file networking system for setting up the file networking system for a first time user of the file networking system.

FIG. 7 exemplarily illustrates a flowchart comprising the steps performed by the file networking system for setting up the file networking system for a first time user of the file networking system. The first time user signs up with the file networking system for the first time via the graphical user interface (GUI), for example, a web interface provided by the file networking system. The file networking system registers 701 the user on a server of an application service provider. The application service provider provides the server for the file networking system for executing the GUI to convert a uniform resource identifier (URI) to a data URI. The file networking system receives 702 consent from the user for usage of services associated with a user role, for example, a publisher, an author, or a reader, as a user agreement, and converts a URI linking to content to a data URI.

The file networking system configures 703 the usage of the services provided by the file networking system based on a declaration of the user role from the user. In an embodiment, the file networking system registers the user as more than one of a publisher, an author, and a reader, and configures the usage of the services separately for each user role for the user. The file networking system checks 704 the user role of the user. If the user role is that of a publisher, the file networking system provides 705 anonymity or visibility of metrics of all authors and readers of portable local copies of the content file on the server and allows analysis of usage information associated with the usage of the portable local copies of the content file by different cross sections. The file networking system provides the portable local copies of the content file to the users as disclosed in the detailed descriptions of FIG. 1 and FIG. 4. The metrics of the authors and the readers of the portable local copies of the content file comprise the engagement metrics disclosed in the detailed description of FIG. 1.

If the user role is that of an author, the file networking system provides 706 anonymity or visibility of concurrent readership of the portable local copies of the content file and allows the user to communicate with the readers. The file networking system provides visibility of concurrent usage by compiling usage information from the tracking information received by the file networking system from the portable local copies of the content file. The file networking system allows an author to communicate with the readers of the portable local copies of the content file, for example, by providing the author with an invisibility status that when activated does not provide visibility of the author's presence to the readers. This allows the author to view live metrics and usage of the portable local copies of the content file by the readers without actively engaging with the readers. If the user role is that of a reader, the file networking system provides 707 anonymity or visibility of other concurrent readers to the user and allows the user to communicate with the other readers.

Figure 8:
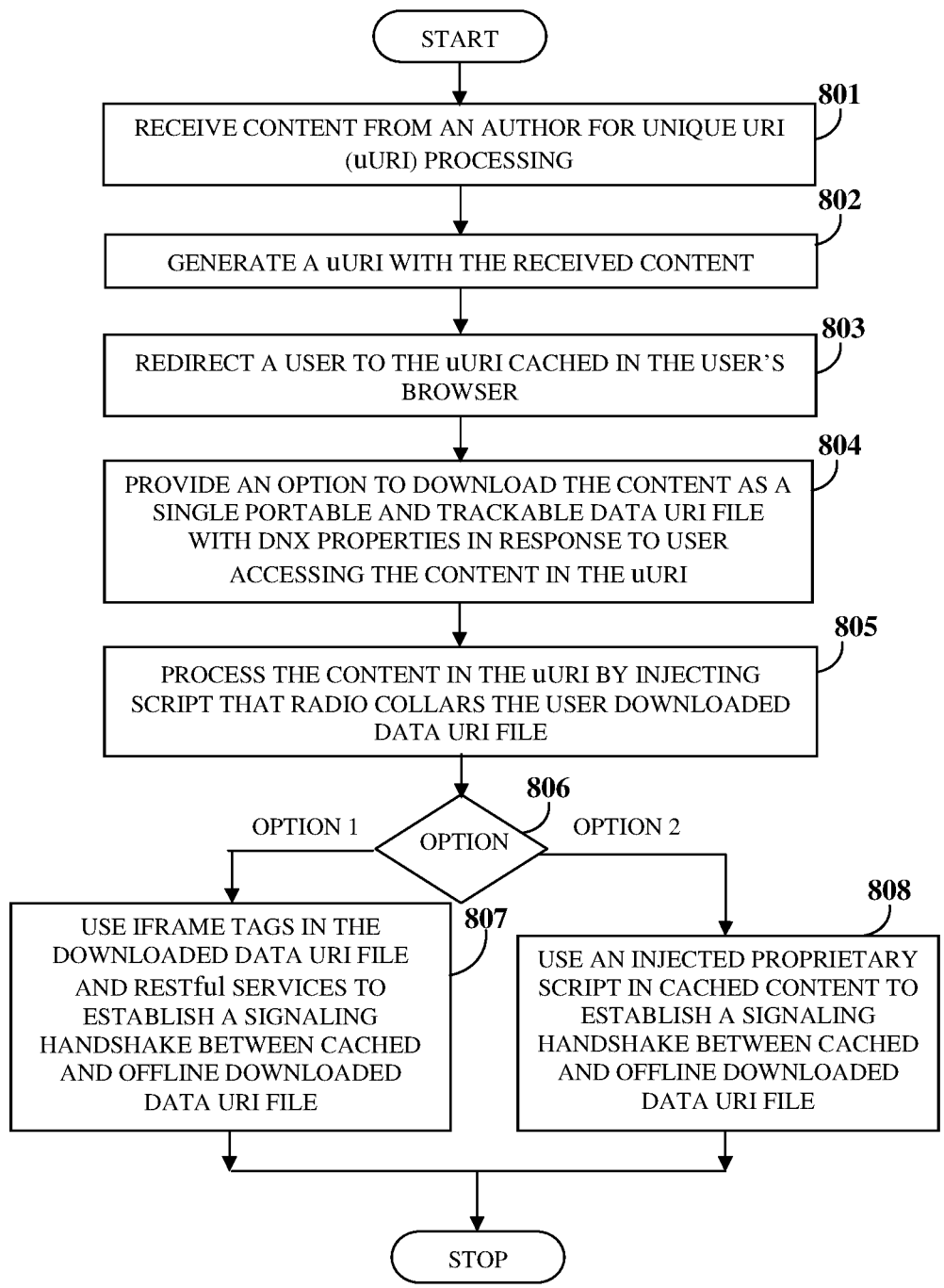
FIG. 8 exemplarily illustrates a flowchart comprising the steps performed by the file networking system for generating a content file and setting up a portable local copy of the content file on a user device for networking and engagement.

FIG. 8 exemplarily illustrates a flowchart comprising the steps performed by the file networking system for generating a content file and setting up a portable local copy of the content file on a user device for networking and engagement. The file networking system receives 801 content from an author for subsequent processing of the content into a unique uniform resource identifier (uURI) file. The file networking system generates 802 a uURI with the content received from the author. The file networking system redirects 803 a user accessing the graphical user interface (GUI) provided by the file networking system through a browser on the user device to the uURI generated by the file networking system and cached in the browser. When the user requests access to the content in the uURI, the file networking system provides 804 an option to the user to download the content as a single portable and trackable data uniform resource identifier (URI) file.

On a call to local storage of the content in the unique uniform resource identifier (uURI) by the user through the browser on the user device, the file networking system processes 805 the content in the uURI by injecting a script that radio collars the data uniform resource identifier (URI) file that is provided to the user for download and local storage. The data URI file comprises the content in the uURI and the script injected by the file networking system that allows the file networking system to receive tracking information from the data URI file to compile usage information associated with the usage of the data URI file. The data URI file is the downloaded portable local copy of the content file with extended document network (DNX) properties, where the DNX properties comprise the injected script and widgets. Using the injected script and the widgets, the file networking system sets up the portable local copy of the content file for networking and engagement, thereby forming a content-centric social network, also referred to as the "extended document network (DNX)". The file networking system selects 806 an option for setting up the downloaded file, that is, the data URI file for tracking. The file networking system selects option 1 if the user device that requests access to the content is a computing device, for example, a desktop or a laptop, and selects option 2 if the user device that requests access to the content is a consuming device, for example, a tablet computing device or a smartphone.

Under option 1, the file networking system uses 807 inline frame (iframe) tags in the downloaded data uniform resource identifier (URI) file and RESTful services on the file networking system to establish a signaling handshake between the content cached in the browser of the user device and the user downloaded content that is offline in the downloaded data URI file. As used herein, "offline" refers to a status of the content where the content is available for consumption by the user on the user device even without a connection to the server through a network. Under option 2, the file networking system uses 808 an injected proprietary script in the content that is cached in the browser of the user device to establish a signaling handshake between the content cached in the browser of the user device and the user downloaded content that is offline in the downloaded data URI file.

Figure 9:
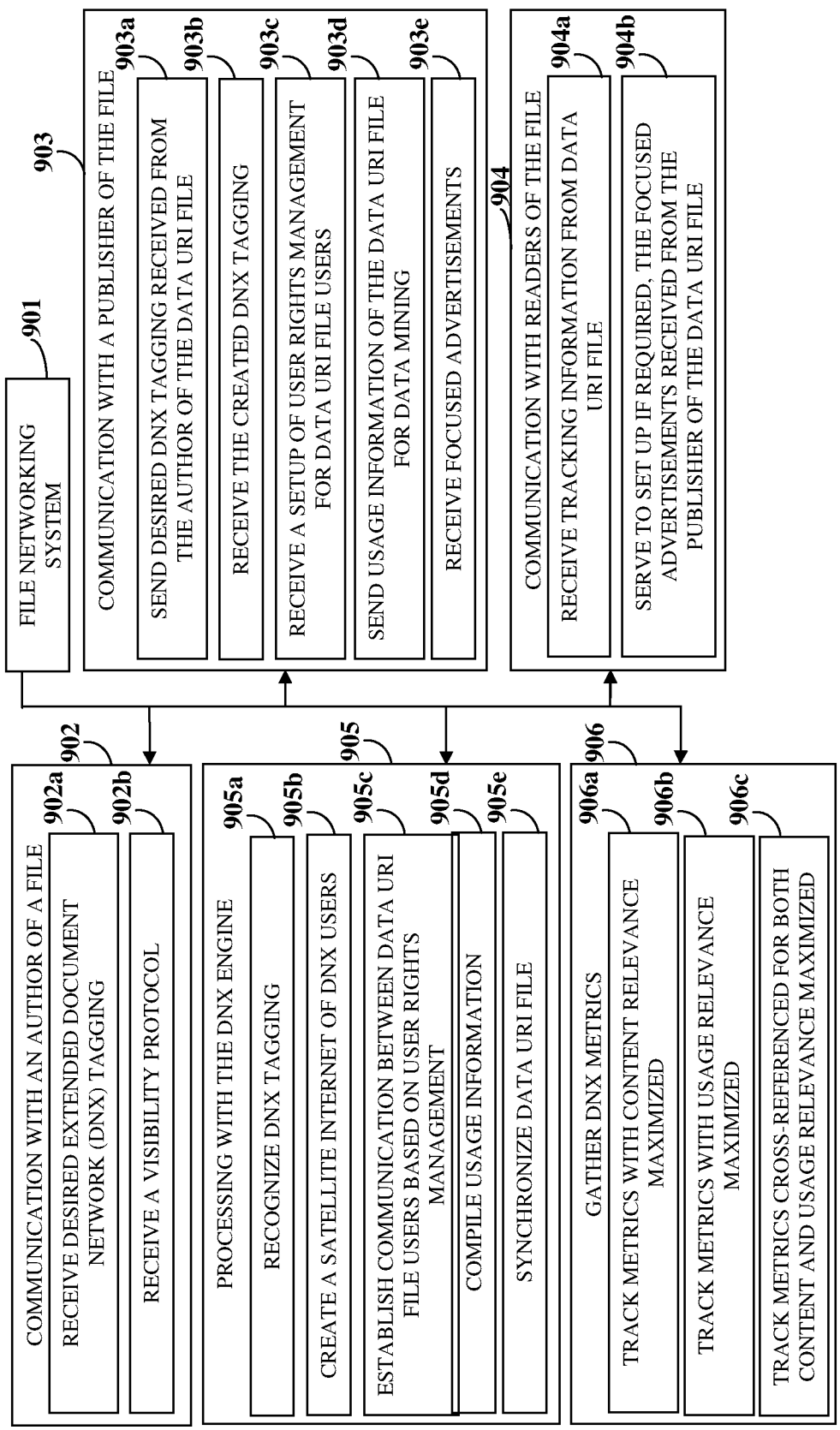
FIG. 9 exemplarily illustrates the steps performed by the file networking system for establishing communication between users of portable local copies of a content file on user devices and compiling usage information associated with usage of the portable local copies of the content file on the user devices.

FIG. 9 exemplarily illustrates the steps performed by the file networking system 901 for establishing communication between users of portable local copies of a content file on user devices and compiling usage information associated with usage of the portable local copies of the content file on the user devices. The file networking system 901 communicates with authors, publishers, and readers to receive and send information about a data uniform resource identifier (URI) file with extended document network (DNX) properties and processes the information using a DNX engine. The portable copies of the data URI file on the file networking system 901 implemented, for example, as a server are the data URI files stored locally on user devices of the authors, publishers, and readers. The file networking system 901 receives the content for the data URI file from a user device of an author of the data URI file for DNX processing. The file networking system 901 communicates 902 with the user device of the author of the data URI file as follows: The file networking system 901 receives 902*a* desired DNX tagging from the user device of the author. The DNX tagging dictates the structure and presentation of content provided by the author in the data URI file. The file networking system 901 also receives 902*b* a visibility protocol from the user device of the author. The visibility protocol allows the author to view the data URI file of the readers without alerting the readers of the data URI file, thereby allowing concurrent readership of the data URI file.

The file networking system 901 communicates 903 with a user device of a publisher of the data uniform resource identifier (URI) file as follows: The file networking system 901 sends 903*a* the desired extended document network (DNX) tagging received from the user device of the author of the data URI file to the user device of the publisher, receives 903*b* the DNX tagging created by the publisher based on the desired DNX tagging from the user device of the publisher, and receives 903*c* a setup of user rights management (URM) for data URI file users created by the publisher of the data URI file from the user device of the publisher. Furthermore, the file networking system 901 sends 903*d* usage information of the data URI file that the file networking system 901 aggregates based on the tracking information received from the user devices of the data URI file users, to the user device of the publisher for data mining. Data mining is a computational process involving interdisciplinary fields of computer science for extracting information from a data set for further use. The file networking system 901 receives 903*e* focused advertisements from the user device of the publisher to be served to the users of the data URI file. The publisher provides advertisements that are focused on the intended audience, that is, the users of the data URI file, through the data mining performed on the usage information sent by the file networking system 901 to the user device of the publisher.

The file networking system 901 communicates 904 with the readers of the data uniform resource identifier (URI) file as follows: The file networking system 901 receives 904*a* tracking information from the data URI files on the user devices of the readers. The file networking system 901 also serves 904*b* to set up if required, the focused advertisements received from the user device of the publisher of the data URI file to the data URI files on the user devices of the readers of the data URI file. The file networking system 901 performs processing 905 with the extended document network (DNX) engine as follows: The file networking system 901 recognizes 905a the created DNX tagging received from the user device of the publisher of the data URI file to create the data URI file from the content received from the user device of the author of the data URI file. The file networking system 901 then creates 905b a satellite internet of DNX users based on the tracked usage of the data URI files on the user devices of the readers of the data URI file. Furthermore, the file networking system 901 establishes 905c a communication between the users of the data URI file based on the setup of the user rights management (URM) received from the user device of the publisher of the data URI file. Furthermore, the file networking system 901 compiles 905d usage information from the tracking information received from the data URI files of the readers of the data URI file. Furthermore, the file networking system 901 synchronizes 905e the data URI file on the file networking system 901 with the data URI files on the user devices of the readers in the created satellite internet of data URI file users as disclosed in the detailed description of FIG. 1. Furthermore, the file networking system 901 gathers 906 DNX metrics, that is, the engagement metrics from the data URI file users as follows: The file networking system 901 tracks 906a metrics with content relevance maximized. Furthermore, the file networking system 901 tracks 906b metrics with usage relevance maximized. Furthermore, the file networking system 901 tracks 906c metrics that are cross-referenced for relevance maximization of both content and usage.

Figure 10:
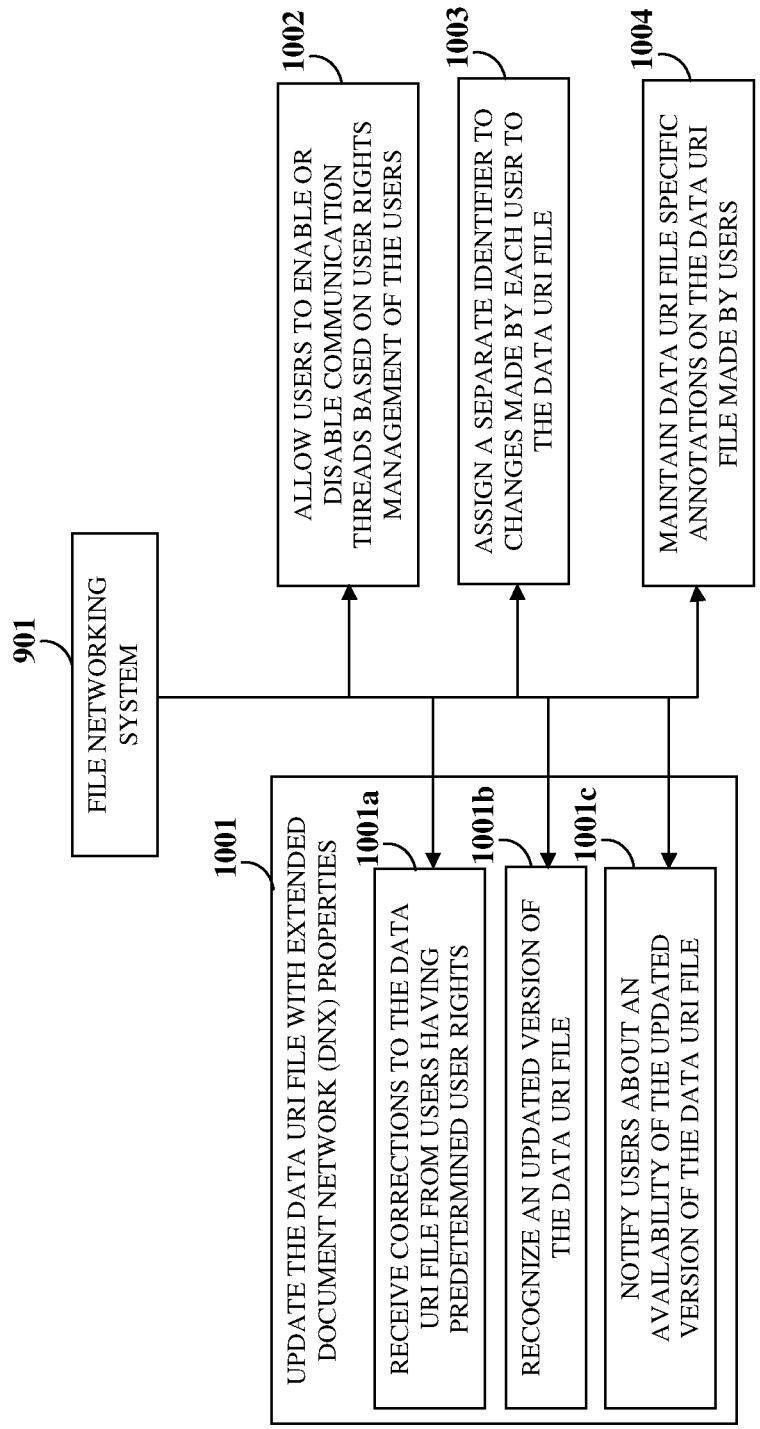
FIG. 10 exemplarily illustrates the steps performed by the file networking system for synchronizing portable local copies of a content file that are modified by users with predetermined user rights.

FIG. 10 exemplarily illustrates the steps performed by the file networking system 901 for synchronizing portable local copies of a content file that are modified by users with predetermined user rights. The content file on the file networking system 901 implemented, for example, as a server is a data uniform resource identifier (URI) file with extended document network (DNX) properties as disclosed in the detailed description of FIG. 8. The portable local copies of the content file are data URI files stored locally on user devices of users of the content file. The file networking system 901 updates 1001 the data URI file with the DNX properties on the file networking system 901 by receiving 1001a corrections to the data URI file from users having predetermined user rights as disclosed in the detailed description of FIG. 1. The file networking system 901 recognizes 1001b an updated version of the data URI file and notifies 1001c the users of the data URI file about an availability of the updated version of the data URI file for download.

Furthermore, the file networking system 901 allows 1002 users to enable or disable communication threads for receiving notifications from the file networking system 901 regarding the availability of the updated version based on user rights management (URM) of the users. The URM is set up by a publisher of the data uniform resource identifier (URI) file. Furthermore, the file networking system 901 assigns 1003 a separate identifier to changes made by each user having predetermined user rights to the data URI file. The file networking system 901 maintains user-wise deltas comprising the changes made by the users to the data URI file along with the data URI file. As used herein, "deltas" refer to incremental information associated with the data URI file, comprising changes made by the users to the data URI file. Through the user-wise deltas, the file networking system 901 allows the users of the data URI file to view different tracks of the data URI file. Each track of the data URI file shows the changes made to the data-URI file in one of the user-wise deltas incorporated into the data URI file. The file networking system 901 assigns the same identifier to all changes made to the data URI file by a particular user. Through the user-wise deltas, the file networking system 901 maintains 1004 data URI file specific annotations on the data URI file made by users of the data URI file, thereby allowing, for example, owners of a webpage to harvest annotations made by readers of the webpage anywhere the data URI file exists as a unique uniform resource identifier (uURI) and to harvest communication between the readers of the webpage.

Figure 11:
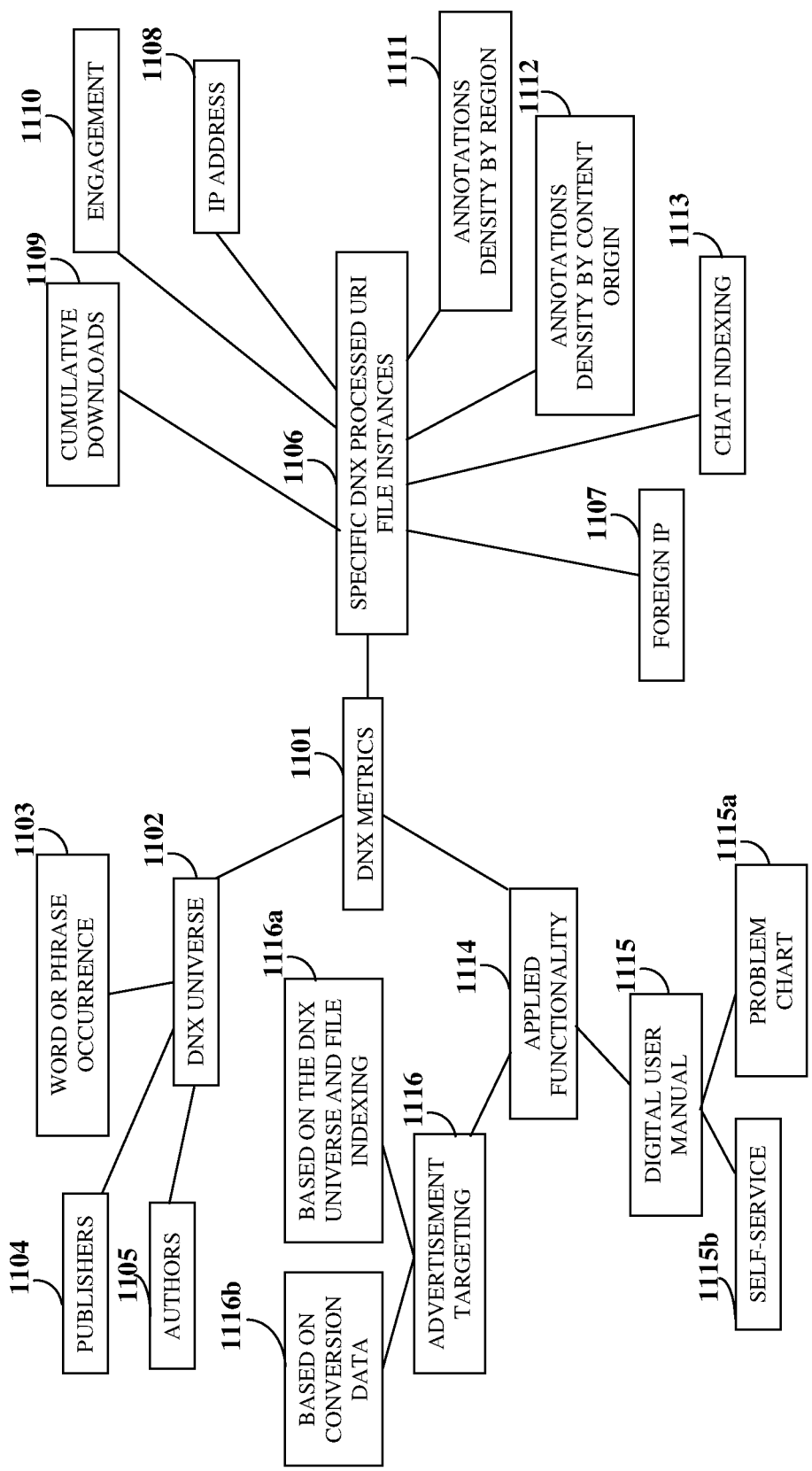
FIG. 11 exemplarily illustrates an implementation of a content-centric social network created by the file networking system.

FIG. 11 exemplarily illustrates an implementation of a content-centric social network, also referred to as the "extended document network (DNX)" created by the file networking system 901 exemplarily illustrated in FIGS. 9-10. The tracking information received from the portable local copies of the content file comprises metrics 1101 gathered from data uniform resource identifier (URI) file users as disclosed in the detailed description of FIG. 9, where the data URI file has extended document network (DNX) properties as disclosed in the detailed description of FIG. 8. The DNX metrics 1101 are grouped as applicable to a DNX universe 1102 comprising the data URI file users, to specific DNX processed URI file instances 1106, and to applied functionality 1114 that can be realized as a consequence of gathering the DNX metrics 1101. The representation of the DNX metrics 1101 in FIG. 11, is illustrative and not exhaustive. The DNX metrics 1101 applicable to the DNX universe 1102 comprise word or phrase occurrence 1103 measured as a number of occurrences in the DNX universe 1102, and analyzed using a ranking by occurrence. The DNX metrics 1101 applicable to the DNX universe 1102 also comprise publishers 1104 measured as a number of file downloads of data URI files published by each of the publishers 1104, and analyzed, for example, using a pie chart, and authors 1105 measured as a number of file downloads of data URI files authored by each of the authors 1105, and analyzed, for example, using a pie chart.

The extended document network (DNX) metrics 1101 applicable to the specific DNX processed uniform resource identifier (URI) file instances 1106 comprise foreign internet protocol (IP) addresses 1107 of foreign users measured as percentages of total data URI file users and analyzed, for example, using a pie chart. The DNX metrics 1101 applicable to the specific DNX processed URI file instances 1106 further comprise internet protocol (IP) addresses 1108 of the data URI file users measured using a number of portable copies of the content file used in a region, a country, and a city, and analyzed using, for example, a pie chart with drill down options for displaying details. The DNX metrics 1101 applicable to the specific DNX processed URI file instances 1106 further comprise cumulative downloads 1109 of the data URI file over time measured as a number of instances of downloads, and analyzed using, for example, a line graph, and engagement 1110 measured as time spent on the data URI file in days, and analyzed using, for example, a line graph. The DNX metrics 1101 applicable to the specific DNX processed URI file instances 1106 further comprise annotations density by region 1111 and annotations density by content origin 1112 measured using byte counts of regions of the data URI file, for example, paragraphs, equations, floats, citations, etc. In an embodiment, the annotations density by region 1111 is analyzed using a histogram, for example, by order of occurrence for the region of the data URI file, for example, using a table of contents. The annotations density by content origin 1112 is analyzed by using, for example, a pie chart of annotations in a data URI file user's own work and in other data URI files users' work for each data URI file user. The DNX metrics 1101 applicable to the specific DNX processed URI file instances 1106 further comprise chat indexing 1113 measured as a number of favorable and unfavorable comments by data URI file users, and analyzed by using, for example, a pie chart.

The extended document network (DNX) metrics 1101 applicable to the applied functionality 1114 of the DNX comprise, for example, a digital user manual 1115 used by the data URI file users. The digital user manual 1115 metric comprises a problem chart 1115a metric measured using a number of clicks in a region of problem, and analyzed, for example, using a pareto chart. The digital user manual 1115 metric further comprises a self-service 1115b metric measured as a solution probability index using responses, for example, helpful or not helpful indicators, from the data URI file users, and analyzed using, for example, a pie chart. The extended document network (DNX) metrics 1101 applicable to the applied functionality 1114 further comprise advertisement targeting metrics 1116 based on the DNX universe and file indexing 1116a measured using a number of cumulative references to one or more keywords in the DNX universe 1102, and analyzed using a ranking of uniform resource identifiers (URIs) from being the most likely to be accessed to being the least likely to be accessed by the data URI file users. The DNX metrics 1101 are available to harvest their applied functionality 1114. For example, the DNX metrics 1101 comprise advertisement targeting metrics 1116 based on conversion data 1116b measured as a number of trending URIs, and analyzed using a ranking of URIs from being most likely to be accessed to being least likely to be accessed by the data URI file users.

The extended document network (DNX) metrics 1101 can be used to generate a dashboard characterized by their units of measurement, and their analyses for consumption by users of the data uniform resource identifier (URI) file. Tabulated below are the DNX metrics 1101 based on inclusion into the DNX universe 1102, the DNX metrics 1101 of the specific DNX processed URI files 1106, and a sampling of the applied functionality 1114 possible using the DNX metrics 1101.

| Context | Data Element | Unit of Measurement | Analysis |
|---|---|---|---|
| DNX Universe | Word or Phrase occurrence | Number of occurrences in the entire Universe | Ranking by occurrence |
|  | Publishers | Number of file downloads | Pie chart |
|  | Authors | Number of file downloads | Pie chart |
| Specific DNX processed URI file | IP Address | Number of portable copies (Region, Country, city) | Pie with drill down |
|  | Foreign IP | Percent | Pie chart |
|  | Cumulative downloads over time | Number of highest instances file-wise | Line graph |
|  | Engagement (Time period of usage) | Time spent over days | Line graph |
|  | Annotations Density by Region | Byte Count (Regions: Paragraph, Float, Equation, Citation, etc.) | Histogram by order of occurrence for the document region (e.g. Table of contents) |
|  | Annotations Density by Content Origin | Byte Count (Regions: Paragraph, Float, Equation, Citation, etc.) | Comparative pie chart of annotations in own primary group work and secondary other's work |
|  | Annotations/Chat Indexing | Number of neutral, negative, positive or constructive comments | Pie chart |
| Applied functionality | Digital User Manual: Problem Chart | Number of clicks in region of problem | Pareto chart |
|  | Digital User Manual: Self-service | Solution Probability (Helpful/Not Helpful) index | Pie chart |
|  | Advertisement targeting based on the DNX Universe and File Indexing | Number of references to "key word(s)" cumulatively in the DNX universe | URLs ranked by most likely to least likely |
|  | Advertisement targeting based on conversion data | Number of trending URLs | URLs ranked by most likely to least likely |

Figure 12:
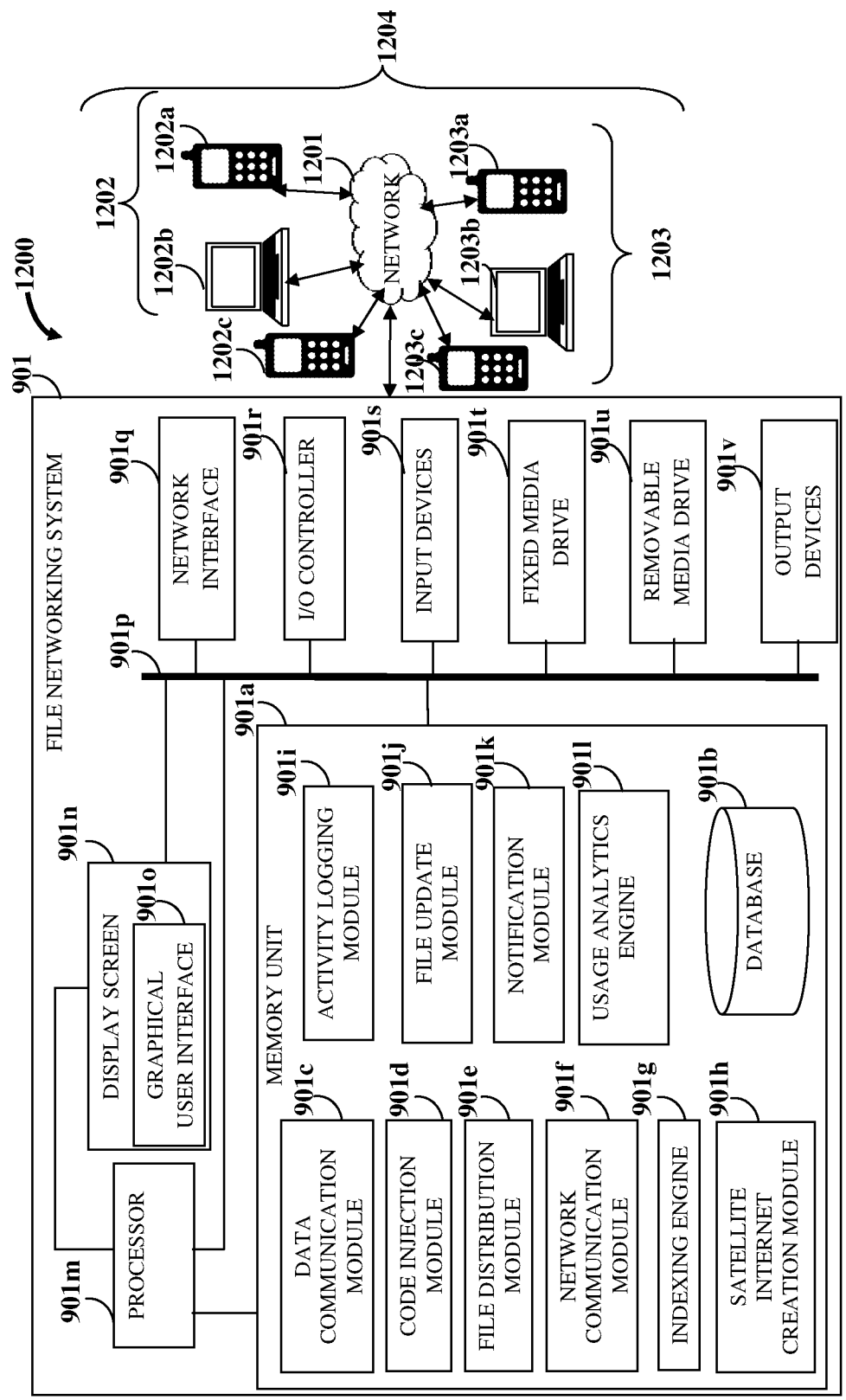
FIG. 12 exemplarily illustrates a computer implemented system comprising the file networking system for transforming a content file into a content-centric social network with managed connectivity and indexable touchpoints.

FIG. 12 exemplarily illustrates a computer implemented system 1200 comprising the file networking system 901 for transforming a content file into a content-centric social network with managed connectivity and indexable touchpoints. The file networking system 901 is a computer system that is programmable using a high level computer programming language. In an embodiment, the file networking system 901 uses programmed and purposeful hardware. The file networking system 901 is implemented on a computing device, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc. In another embodiment, the computing equipment, for example, one or more servers are associated with one or more online services. In an embodiment, the file networking system 901 is configured as a web based platform, for example, a website hosted on a server or a network of servers.

The file networking system 901 communicates with user devices 1202 and 1203 via the network 1201, for example, a short range network or a long range network. The user devices 1202 comprising 1202a, 1202b, and 1202c, and 1203 comprising 1203a, 1203b, and 1203c, are electronic devices, for example, personal computers, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, client devices, portable electronic devices, network enabled computing devices, interactive network enabled communication devices, any other suitable computing equipment, combinations of multiple pieces of computing equipment, etc. In an embodiment, the user devices 1202 and 1203 are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities. For purposes of illustration, the user device 1202c is the user device of an author of the content file, and the user device 1203c is the user device of a publisher of the content file. The user devices 1202a, 1202b, 1203a, and 1203b are user devices of the readers of the content file. The user devices 1202a, 1202b, and 1202c constitute the first user devices 1202. The user devices 1203a, 1203b, and 1203c constitute the invitee user devices 1203. The users of the second user devices 1204 comprising the first user devices 1202a, 1202b, and 1202c, and the invitee user devices 1203a, 1203b, and 1203c form a satellite internet of users.

The network 1201 is, for example, the internet, an intranet, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the file networking system 901 is accessible to the satellite internet of users, for example, through a broad spectrum of technologies and devices such as cellular phones, tablet computing devices, etc., with access to the internet.

As exemplarily illustrated in FIG. 12, the file networking system 901 comprises a non-transitory computer readable storage medium, for example, a memory unit 901a for storing programs and data, and at least one processor 901m communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 901m. The non-transitory computer readable storage medium is configured to store computer program instructions defined by modules, for example, 901c, 901d, 901e, 901f, 901g, 901h, 901i, 901j, 901k, 901l, etc., of the file networking system 901. The modules, for example, 901c, 901d, 901e, 901f, 901g, 901h, 901i, 901j, 901k, 901l, etc., constitute the extended document network (DNX) engine disclosed in the detailed description of FIG. 9. The modules 901b, 901c, 901d, 901e, 901f, 901g, 901h, 901i, 901j, 901k, and 901l are installed and stored in the memory unit 901a of the file networking system 901. The memory unit 901a is used for storing program instructions, applications, and data. The memory unit 901a is, for example, a random access memory (RAM) or another type of dynamic storage device that stores information and instructions for execution by the processor 901m. The memory unit 901a also stores temporary variables and other intermediate information used during execution of the instructions by the processor 901m. The file networking system 901 further comprises a read only memory (ROM) or another type of static storage device that stores static information and instructions for the processor 901m.

The processor 901m is configured to execute the computer program instructions defined by the modules, for example, 901c, 901d, 901e, 901f, 901g, 901h, 901i, 901j, 901k, 901l, etc., of the file networking system 901. The processor 901m refers to any of one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 901m is implemented as a processor set comprising, for example, a programmed microprocessor and a math or graphics co-processor. The processor 901m is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The file networking system 901 disclosed herein is not limited to employing a processor 901*m*. In an embodiment, the file networking system 901 employs a controller or a microcontroller.

As exemplarily illustrated in FIG. 12, the file networking system 901 further comprises a data bus 901*p*, a network interface 901*q*, an input/output (I/O) controller 901*r*, input devices 901*s*, a fixed media drive 901*t* such as a hard drive, a removable media drive 901*u* for receiving removable media, output devices 901*v*, etc. The data bus 901*p* permits communications between the modules, for example, 901*a*, 901*m*, 901*n*, 901*q*, 901*r*, 901*s*, 901*t*, 901*u*, 901*v*, etc., of the file networking system 901. The network interface 901*q* enables connection of the file networking system 901 to the network 1201. In an embodiment, the network interface 901*q* is provided as an interface card also referred to as a line card. The network interface 901*q* comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, radio frequency (RF) technology, near field communication, etc. The I/O controller 901*r* controls input actions and output actions performed by the file networking system 901.

The display screen 901*n*, via the graphical user interface (GUI) 901*o*, displays content of the content file, display interfaces, user interface elements such as chat windows, etc. The display screen 901*n* is, for example, a video display, a liquid crystal display, a plasma display, an organic light emitting diode (OLED) based display, etc. The file networking system 901 provides the GUI 901*o* on the display screen 901*n*. The GUI 901*o* is, for example, an online web interface, a web based downloadable application interface, a mobile based downloadable application interface, etc. The display screen 901*n* displays the GUI 901*o*. The input devices 901*s* are used for inputting data into the file networking system 901 for routine maintenance of the file networking system 901. The input devices 901*s* are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 901*v* output the results of operations performed by the file networking system 901.

The modules of the file networking system 901 comprise a data communication module 901*c*, a code injection module 901*d*, a file distribution module 901*e*, a network communication module 901*f*, an indexing engine 901*g*, a satellite internet creation module 901*h*, an activity logging module 901*i*, a file update module 901*j*, a notification module 901*k*, and a usage analytics engine 901*l* stored in the memory unit 901*a* of the file networking system 901. The code injection module 901*d* injects a tracking code with widgets for user activities into each of one or more portable copies of the content file on the file networking system 901 based on preconfigured criteria in response to a request to access the content file from one or more of the first user devices 1202, for example, 1202*a* and 1202*b* as disclosed in the detailed description of FIG. 1. An example of a code snippet of the code injection module 901*d* executed by the processor 901*m* of the file networking system 901 for injecting the tracking code and creating the widgets for the user activities in each portable copy of the content file based on preconfigured criteria in response to a request to access the content file from the user devices 1202*a*, 1202*b*, 1202*c*, 1203*a*, 1203*b*, and 1203*c*, is provided below:

```
<style type="text/css">
<!--
body {
    width: 100%;
}
.ph5-content
{
    width: 70%;
    margin-left: 2%;
    padding-right: 10pt;
    overflow: scroll;
}
p
{
    text-align: justify;
}
.buttons {
    display: none;
}
    #com {
        float:right;
    }
    #idiv {
        width: 20%;
        height:100%;
    }
    #i_frame {
        display: block;
        border: 0;
        overflow: auto;
    }
.chat_wrapper {
```

```
            width: 300px;
            margin-right: auto;
            margin-left: auto;
            background: #CCCCCC;
            border: 1px solid #999999;
            padding: 10px;
            font-size: 12px;
            font-family: tahoma,verdana,arial,sans-serif;
    }
    .chat_wrapper .message_box {
            background: #FFFFFF;
            height: 150px;
            overflow: auto;
            padding: 10px;
            border: 1px solid #999999;
    }
    .chat_wrapper .panel input{
            padding: 2px 2px 2px 5px;
    }
    .system_msg{color: #BDBDBD;font-style: italic;}
    .user_name{font-weight:bold;}
    .user_message{color: #88B6E0;}
    -->
    </style>
    <script language="javascript" type="text/javascript">
    $(document).ready(function($){
        var title = document.getElementsByTagNamectitleIntextContent;
            var stl = title.replace(/[^a-z0-9]+/gi, "-").substring(0,40);
        if(stl == "") { stl = "Unknown-title"; }
        $("#name").val(userName);
        $(window).on("beforeunload", function(ev) {
            loadIframe("http://localhost/ph5/users.php/" + userName + "/" + userRole
+ "/2/" + stl);
            refreshAllClients( );
            return "bye!";
        });
        rangy.init( );
        var highlighter = rangy.createHighlighter( );
        highlighter.addClassApplier(rangy.createClassApplier("highlight", {
            ignoreWhiteSpace: true,
            tagNames: ["span", "a"]
        }));
        function highlightSelectedText( ) {
            highlighter.highlightSelection("highlight");
        }
        function refreshAllClients( ) {
            var msg = {
                message: "!.!",
                name: userName,
                title: stl
            };
            //convert and send data to server
            websocket.send(JSON.stringify(msg));
        }
        //create a new WebSocket object.
        var wsUri = "ws://localhost:9000/ph5/chat-server.php";
        websocket = new WebSocket(wsUri);
        websocket.onopen = function(ev) { // connection is open
            $('#message_box').append("<div
class=\"system_msg\">Connected!</div>"); //notify user
                //prepare json data
    refreshAllClients( );
        }
            $('#send-btn').click(function( ){//use clicks message send button
                var mymessage = $('#message').val( ); //get message text
                var myname = $('#name').val( ); //get user name
                var hText = $(".highlight").first( ).text( );
                if(myname == ""){ //empty name?
                  alert("Enter your Name please!");
                  return;
                }
                if(mymessage == ""){ //empty message?
                  alert("Enter Some message Please!");
                  return;
                }
                //prepare json data
                var msg = {
                message: mymessage,
                name: myname,
```

```
            title: stl,
          hit: hText
          };
        //convert and send data to server
        websocket.send(JSON.stringify(msg));
        $('#message').val(''); //reset text
    });
    $('#message').mousedown(function( ){ //user clicks on message input box
    removeHighlightClass( );
    highlightSelectedText( );
      });
    //#### Message received from server?
      websocket.onmessage = function(ev) {
        var msg = JSON.parse(ev.data); //PHP sends Json data
        var type = msg.type; //message type
        var umsg = msg.message; //message text
        var uname = msg.name; //user name
        var mtl = msg.title; //doc title
var htxt = msg.hlt; //highlighted text
        var ucolor = msg.color; //color
          if((umsg == null && uname == null) umsg == "!.!")
          {
            if(uname != userName && uname != null)
    {
            loadIframe("http://localhost/ph5/users.php/" + uname +
"/reader/0/" + stl);
          }
          }
          else if(type == 'usermsg' && mt1== stl)
          {
            $('#message_box').append("<div title=\"" + htxt + "\"
onClick=\"highlightTitle(this);\"><span class=\"user_name\"
style=\"color:#"+ucolor+"\">"+uname+"</span> : <span
class=\"user_message\">"+umsg+"</span></div>");
            removeHighlightClass( );
            $(".ph5-content").highlight(htxt);
          }
          else if(type == 'system')
          {
            $('#message_box').append("<div
class=\"system_msg\">"+umsg+"</div>");
          }
      };
      websocket.onerror = function(ev){$('#message_box').append("<div
class=\"system_error\">Error Occurred - "+ev.data+"</div>");};
      websocket.onclose = function(ev){$('#message_box').append("<div
class=\"system_msg\">Connection Closed</div>");};
    });
    </script>
    <div id="com">
    <div id="invite">
    To invite friends add their emails here: <br />
    <input type="text" name= "email-invites" id= "email-invites"
placeholder="Separate emails by comma" maxlength="70" style="width:60%" />
     <button id="invite-btn">Invite</button>
    </div>
    <div id="idiv"></div>
    <div class="chat_wrapper">
    <div class="message_box" id="message_box"></div>
    <div class="panel" name="panel" id="paner>
    From: <input type= "text" name="name" id="name" placeholder="Your Name"
maxlength="10" style="width:20%" readonly/> To: <input type= "text" name="sname"
id="sname" value="All" maxlength="10" style="width:20%" /><br />
    <input type="text" name="message" id="message" placeholder="Type message
here" maxlength="130" style="width:90%" /><br />
    <button id="send-btn">Send</button>
    </div>
    </div>
    </div>
    </div>
```

An example of a code snippet executed by the processor 901m of the file networking system 901 for creating a chat server and establishing communication between the users of the portable copies of the content file using the chat server is provided below:

```
<?php
use Ratchet\Server\IoServer;
use Ratchet\Http\HttpServer;
use Ratchet\WebSocket\WsServer;
use Ph5\Chat;
require 'vendor/autoload.php';
require 'chat/Chat.php';
$server = IoServer::factory(
    new HttpServer(new WsServer(new Chat( ))),
    9000
);
$server->run( );
```

```
function inviteColleagues(emails, link) {
    var emailArray = split(",", emails);
    var len =email_array.length;
    for(var i=0; i<len; i++) {
        sendEmail(email_array[i], link);
    }
}
```

By receiving the invite information, the file networking system 901 allows the first user devices 1202 to invite other user devices, that is, the invitee user devices 1203 addressed in the invite information, to access the content file. An example of another code snippet of the file distribution module 901e executed by the processor 901m of the file networking system 901 for distributing the portable copies of the content file with the respective injected tracking codes to one or more of the second user devices 1204 based on the invite information received by the data communication module 901c of the file networking system 901 is provided below. The code snippet below allows the first user devices 1202 to invite other user devices, that is, the invitee user devices 1203 using a pre-populated invite form.

```
$app->gen('/email-invitation', function ( ) use ($app) {
    $name = $app->request->get('user');
    $email = $app->request->get('email');
    $emails = $app->request->get('emails');
    $url = $app->request->get('url');
    $title = $app->request->get('title');
    $subject = "ReadSpiral invitation";
    $ems = split(",", $emails);
    for($i=0; $i<$ems.length; $i++) {
        $download_url = "http://localhost/ph5/ph5.php/download?url=" . $url . "&email=" . $ems[$i];
        $click = "<a href=\"" . $download_url . "\">click here</a>";
        $invite = "Hi,<br><br>
            You have been invited to be part of a group that is discussing: " . $title .".
            Please " . $click . ", then add your name and download ReadSpiral content<br>
            <br>
            Thanks
            <br><br>
            ". $name;
        $mail = new PHPMailer;
        send_email($email, $ems[$i], $subject, $invite);
    }
});
function send_email($from_email, $to_email, $subject, $body) {
    $mail->setFrom($from_email, 'Mailer');
    $mail->addAddress($to_email);
    $mail->isHTML(true);                    // Set email format to HTML
    $mail->Subject = $subject;
    $mail->Body = $body;
    if(!$mail->send( )) {
        echo 'Message could not be sent.';
        echo 'Mailer Error: ' . $mail->ErrorInfo;
    } else {
        echo 'Message has been sent';
    }
}
```

The file distribution module 901e distributes the portable copies of the content file with the respective injected tracking codes to one or more of the second user devices 1204, for example, 1202a, 1202b, 1202c, 1203a, 1203b, and 1203c through the network 1201 based on invite information received by the data communication module 901c of the file networking system 901 with the request to access the content file as disclosed in the detailed description of FIG. 1.

An example of a code snippet of the file distribution module 901e executed by the processor 901m of the file networking system 901 for allowing the first user devices 1202 to invite other user devices 1203 is provided below:

The network communication module 901f establishes a bidirectional communication between the file networking system 901 and the distributed portable copies, hereinafter referred to as "portable local copies" of the content file on the second user devices 1204, for example, 1202a 1202b, 1202c, 1203a, 1203b, and 1203c through the network 1201 as disclosed in the detailed description of FIG. 1. An example of a code snippet of the network communication module 901f executed by the processor 901m of the file networking system 901 for establishing a bidirectional communication between the file networking system 901 and the portable local copies of the content file on the second user devices 1204 through the network 1201 is provided below:

```
        //create a new WebSocket object.
        var wsUri = "ws://www.readchilli.com:9000/ph5/chat-server.php";
        websocket = new WebSocket(wsUri);
        websocket.onopen = function(ev) { // connection is open
        $('#message_box').append("<div class=\"system_msg\">Connected!</div>");
//notify user
        //prepare json data
                refreshAllClients( );
            }
//---------------------------------------------------------
//---------------------------------------------------------
        $webserver = IoServer::factory(
           new HttpServer(new WsServer(new Chat( ))),9000);
```

The data communication module 901c receives tracking information comprising touchpoints based on usage of the portable local copies of the content file via the established bidirectional communication while managing to cover for loss of connectivity over the network 1201 as disclosed in the detailed description of FIG. 1. The code snippet of the data communication module 901c executed by the processor 901m of the file networking system 901 for receiving tracking information comprising the touchpoints based on the usage of the portable local copies of the content file via the established bidirectional communication while managing to cover for loss of connectivity over the network 1201 is provided below:

```
$('#send-btn').click(function( ){ //use clicks message send button
var mymessage = $('#message').val( ); //get message text
var name = $('#name').val( ); //get user name
var xuid = "";
//get chat xuid
if($("input[name=chat_uid"]This(":checked")) {
    xuid = $("input[name=chat_uid]:checked").val( );
      }
var hlt = $(".temp-highlight").first( ).text( );
var ihlt = getHighlightInstance( );
var date = new Date( );
var uid = "annot_" + name + "_" + date.getTime( );
if(name == ""){ //empty name?
                alert("Enter your Name please!");
                return;
         }
         if(mymessage == ""){ //empty message?
```

-continued

```
                alert("Enter Some message Please!");
                   return;
         }
console.log("xuid-in:" + xuid);
//prepare json data
var msg = {
             message: mymessage,
             type: "usermsg",
                name: name,
                title: stl,
             hlt: hlt,
             ihlt: ihlt,
             uid: uid,
             xuid: xuid
                };
//convert and send data to server
websocket.send(JSON.stringify(msg));
//reset message and radio
$('#message').val(""); //reset text
$("input[name=chat_uid]:checked").prop('checked', false);
$(".temp-highlight").removeClass("temp-highlight");
          });
```

The indexing engine 901g indexes the touchpoints in the received tracking information for tracking the usage of the portable local copies of the content file as disclosed in the detailed description of FIG. 1. An example of a code snippet of the indexing engine 901g executed by the processor 901m of the file networking system 901 for indexing the touchpoints in the received tracking information for tracking the usage of the portable local copies of the content file is provided below:

```
      public function onMessage(ConnectionInterface $from, $msg) {
            $numRecv = count($this->clients) - 1;
            echo sprintf('Connection %d sending message "%s" to %d other
connection%s'. "\n"
              , $from->resourceId, $msg, $numRecv, $numRecv == 1 ? "": 's');
            foreach ($this->clients as $client) {
              // restrict messages to users with the same document title/url
              $ip = $client->remoteAddress;
              $data = json_decode($msg, true);
              $title = $data['title'];
              $name = $data['name'];
              $sql_check = "SELECT * FROM user_list
                          WHERE name = '$name'
                          AND ip = '$ip'
                          AND title = '$title'";
              $user = "root";
                $pass = "rt45uk1";
                $db = "mysql";
                $rconn = new \mysqli("localhost", $user, $pass, $db) or die("unable to
connect");
                $nr = $rconn->query($sql_check)->num_rows;
            echo "\n msg from: client-" . $from->resourceId . ", with ip:" . $ip . "and nr:".
$nr ."\n";
              //temporary patch required if msg dies reach
              //$nr = 1;
              if ($from != "" and $nr > 0) {
```

```
            // The sender is not the receiver, send to each client connected
            $type = $data['type'];
            $message = $data['message'];
            $uid = $data['uid'];
            $xuid = $data['xuid'];
            $flag = 1;
            //if($type == "usermsg") { $flag = 0; }
            if($flag) {
              $hlt = $data['hlf'];
              $ihlt = $data['ihlt'];
                $sql = "INSERT INTO user_chat (name, ip, msg, title, hlt, ihlt, uid, xuid)
                            VALUES ('$name', '$ip', '$message', '$title', '$hlt', '$ihlt', '$uid', '$xuid')";
                $conn = new \mysqli("localhost", $user, $pass, $db) or die("unable to connect");
                if ($conn->query($sql) === TRUE) {
                echo "\n New record created successfully \n";
              }
                else {
                echo "\n Error: ". $sql . "\n". $conn->error;
                }
              }
              $client->send(json_encode($data));
            }
          }
        }
        public function onClose(ConnectionInterface $conn) {
          // The connection is closed, remove it, as we can no longer send it messages
          $this->clients->detach($conn);
          echo "Connection {$conn->resourceId} has disconnected\n";
        }
```

The indexing engine 901g also distinguishes the indexed touchpoints in the portable local copies of the content file into neutral, negative, positive, and double positive as disclosed in the detailed description of FIG. 1. An example of another code snippet of the indexing engine 901g executed by the processor 901m of the file networking system 901 for distinguishing between neutral, negative, positive, and double positive touchpoints in the portable local copies of the content file is provided below:

```
Advanced Search Query:
Text Search possible in following fields:
Name, locale, doc-title, url, msg (chat message), hlt (highlighted text), hlt-type (highlighted type), time
Highlighted type
================
 0 = neutral (see this)
-1 = negative (disagree/hate this)
 1 = positive (love this)
 2 = double positive (i add to this)
Search $txt in highlighted text with positive feedback for one week:
SELECT t1.*
      FROM user_chat t1.hlt
      WHERE t1.hlt.contains($txt)
      AND t1.date =
            (SELECT MAX(t2.date)
                FROM user_list t2
                WHERE t2.name = t2.name
                LIMIT 1)
            AND t1.date > DATE_ADD(CURDATE( ), INTERVAL -1 WEEK)
            AND hlt-type > 0
              "ORDER BY t1.date DESC";
```

The satellite internet creation module 901*h* creates a satellite internet of users of the portable local copies of the content file on the second user devices 1204 based on the invite information and the tracked usage of the portable local copies of the content file. Moreover, the satellite internet creation module 901*h* establishes communication between the users of the portable local copies of the content file on the second user devices 1204 in the created satellite internet of users using one or more of the widgets for the user activities through the injected tracking codes and the indexed touchpoints, thereby transforming the content file into the content-centric social network with the managed connectivity and the indexable touchpoints. An example of a code snippet of the satellite internet creation module 901*h* executed by the processor 901*m* of the file networking system 901 for establishing communication between the users of the portable local copies of the content file on the second user devices 1204 in the created satellite internet of users using one or more of the widgets for the user activities through the injected tracking codes and the indexed touchpoints is provided below:

```
// -------satellite-id is more like family name of login user name which follows
after a colon
    function getGroupName($userName) {
        return $userName.replace(/\p{L}+:/, "");
    }
    function onMessageWithGid(ConnectionInterface $from, $msg, $gid) {
        $data = json_decode($msg, true);
        $groupName = getGroupName($data["name"]);
        if ($groupName == "") {
          onMessage(ConnectionInterface $from, $msg);
        }
        else if($gid == $groupName) {
          onMessage(ConnectionInterface $from, $msg);
        }
        else {
          doNothing( );
        }
    }
```

Furthermore, the satellite internet creation module 901*h* groups the second user devices 1204 comprising the first user devices 1202 and the invitee user devices 1203 into one or more groups automatically based on the access of the content file. Using the grouping, the satellite internet creation module 901*h* configures the establishment of the communication between the users of the portable local copies of the content file on the second user devices 1204 in the created satellite internet of users as disclosed in the detailed description of FIG. 1.

The activity logging module 901*i* logs user activities in the portable local copies of the content file on the second user devices 1204 in the created satellite internet of users using one or more of the widgets for the user activities through the injected tracking codes for establishing the communication between the users of the portable local copies of the content file on the second user devices 1204 in the created satellite internet of users. The injected tracking code in each of the portable local copies of the content file stores the tracking information locally on the second user devices 1204 on the loss of the connectivity between the file networking system 901 and the portable local copies of the content file over the network 1201. The data communication module 901*c* receives the stored tracking information from the portable local copies of the content file on reestablishment of the connectivity between the file networking system 901 and the portable local copies of the content file over the network 1201.

The table below illustrates different scenarios for logging user activities in the portable local copies of the content file on a second user device, for example, 1203*a* in the created satellite internet of users based on the availability of network connectivity and status of the portable local copy of the content file using one or more of the widgets for user activities through the injected tracking code.

| Status of the network connectivity | Status of the portable local copy of the content file on a second user device | Status of logging user activities in the portable local copies of the content file on the second user devices | Remarks |
|---|---|---|---|
| Yes | Open | Accrual of user activities on the portable local copies of the content file | User activities on the portable local copies of the |

-continued

| Status of the network connectivity | Status of the portable local copy of the content file on a second user device | Status of logging user activities in the portable local copies of the content file on the second user devices | Remarks |
|---|---|---|---|
| Yes | Closed | on all the second user devices in the grabbed content file Accrual of the user activities on the portable local copies of the content file on other second user devices in the grabbed content file. | content file are continuously logged. User activities on the portable local copy of the content file are logged when the portable local copy of the content file is opened on the second user device |
| No | Open | Accrual of the user activities on the portable local copy of the content | User activities on the portable local copy of the |

| Status of the network connectivity | Status of the portable local copy of the content file on a second user device | Status of logging user activities in the portable local copies of the content file on the second user devices | Remarks |
|---|---|---|---|
| | | file on the second user device in the grabbed content file | content file are logged on regaining network connectivity, but not logged if the portable local copy of the content file is closed without regaining network connectivity |
| No | Closed | No accrual of the user activities on the portable local copy of the content file on the second user device | |

Consider an example where a portable local copy of the content file is open on the second user device 1203*a* and the network connectivity between the second user device 1203*a* and the file networking system 901 is available. In this example, the file networking system 901 accrues user activities on the portable local copies of the content file on all second user devices 1204 including the second user device 1203*a* in the grabbed content file, that is, the content file on the file networking system 901. Thus, the user activities on the portable local copies of the content file on all the second user devices 1204 are continuously logged. Consider another example where a portable local copy of the content file is closed on the second user device 1203*a* and the network connectivity between the second user device 1203*a* and the file networking system 901 is available. In this example, the file networking system 901 accrues user activities on the portable local copies of the content file on other second user devices, for example, 1202*b*, 1203*b*, etc., except second user device 1203*a* in the grabbed content file, that is, the content file on the file networking system 901. The user activities on the portable local copy of the content file on the second user device 1203*a* are logged with the content file on the file networking system 901 when the portable local copy of the content file is opened on the second user device 1203*a*.

Consider another example where a portable local copy of the content file is open on the second user device 1203*a* and the network connectivity between the second user device 1203*a* and the file networking system 901 is unavailable, that is, there is a loss of the network connectivity. In this example, the file networking system 901 accrues user activities on the portable local copy of the content file on the second user device 1203*a* in the grabbed content file, that is, the content file on the file networking system 901. The file networking system 901 logs the user activities on the portable local copy of the content file on the second user device 1203*a* only when the network connectivity is regained. The user activities on the portable local copy of the content file on the second user device 1203*a* are lost if the portable local copy on the second user device 1203*a* is closed before regaining the network connectivity. Consider another example where the portable local copy of the content file is closed on the second user device 1203*a* and the network connectivity between the second user device 1203*a* and the file networking system 901 is unavailable. In this example, the file networking system 901 does not log the user activities on the portable local copy of the content file on the second user device 1203*a* in the grabbed content file, that is, the content file on the file networking system 901.

The data communication module 901*c* detects computing devices and consuming devices from among the second user devices 1204 for the establishment of the bidirectional communication between the file networking system 901 and the portable local copies of the content file based on the detection as disclosed in the detailed description of FIG. 1. Furthermore, the detection by the data communication module 901*c* is used for the establishment of the communication between the users of the portable local copies of the content file in the created satellite internet of users as disclosed in the detailed description of FIG. 1. In an embodiment, the data communication module 901*c* receives updates made to the portable local copies of the content file by users of one or more of the second user devices, for example, 1203*a* based on predetermined user rights associated with the users as disclosed in the detailed description of FIG. 1. The file update module 901*j* updates the content file based on the received updates. The notification module 901*k* generates and transmits notifications of an availability of the updated content file to users of the second user devices 1204 for providing access of the updated content file to the second user devices 1204. An example of a code snippet executed by the processor 901*m* of the file networking system 901 for generating and transmitting notifications of an availability of the updated content file to users of the second user devices 1204 for providing access of the updated content file to the second user devices 1204 is provided below:

```
function sendUserData( ) {
    if(internetConnection == true) {
        loadIframe("http://www.readchilli.com/ph5/users.php/user-data?name=" +
userName + "&role=" + userRole + "&flag=1&fitle=" + stl + "&email=" + email +
"&url=" + encodeURIComponent(url));
    }
    else {
        var userdata = {
            name : userName,
            role: userRole,
            flag: 1,
            title: stl,
            email: email,
            url: url
```

```
        }
        localStorage.setItem(userdata, t);
    }
};
```

The usage analytics engine 901l compiles usage information associated with the usage of the portable local copies of the content file on the second user devices 1204 from the received tracking information and the established communication between the users of the portable local copies of the content file on the second user devices 1204 in the created satellite internet of users. In an embodiment, the usage analytics engine 901l generates usage information from the tracking information received from the portable local copies of the content file on the second user devices 1204 as disclosed in the detailed description of FIG. 1. Examples of code snippets executed by the processor 901m of the file networking system 901 for compiling usage information associated with the usage of the portable local copies of the content file on the second user devices 1204 from the received tracking information and the established communication between the users of the portable local copies of the content file on the second user devices 1204 in the created satellite internet of users are provided below. A code snippet executed by the processor 901m of the file networking system 901 for determining the number of user devices connected to the file networking system 901 at a particular point of time is provided below:

```
$sql_week = "SELECT t1.*
    FROM user_list t1
        WHERE t1.date =
            (SELECT MAX(t2.date)
                FROM user_list t2
                WHERE t2.name = t1.name
                LIMIT 1)
        AND t1.date > DATE_ADD(CURDATE( ),
INTERVAL-1 WEEK)
        AND t1.title = '" . $title . "'" .
        "ORDER BY t1.date DESC";
$sql_current = "SELECT t1.*
    FROM user_list t1
        WHERE t1.date =
            (SELECT MAX(t2.date)
                FROM user_list t2
                WHERE t2.name = t1.name
                LIMIT 1)
        AND t1.flag != 2
        AND t1.title = '" . $title . "'" .
        "AND t1.date > DATE_ADD(CURDATE( ),
INTERVAL-1 WEEK)
        ORDER BY t1.date DESC";
```

A code snippet executed by the processor 901m of the file networking system 901 for determining the number of user devices that connected to the file networking system 901 over a week is provided below:

```
$sql_week = "SELECT t1.*
    FROM user_list t1
        WHERE t1.date =
            (SELECT MAX(t2.date)
                FROM user_list t2
                WHERE t2.name = t1.name
                LIMIT 1)
        AND t1.date > DATE_ADD(CURDATE( ),
INTERVAL-1 WEEK)
        AND t1.title = '" . $title . "'" .
        "ORDER BY t1.date DESC";
```

The data communication module 901c sends the compiled usage information associated with the usage of the portable local copies of the content file on the second user devices, for example, 1202a, 1202b, 1203a, and 1203b, of readers of the content file to a second user device 1203c of a publisher of the content file. The usage analytics engine 901l facilitates targeting of advertisements published by the publisher of the content file to the second user devices, for example, 1202a, 1202b, 1203a, and 1203b, of the readers of the content file based on the compiled usage information. An example of a code snippet executed by the processor 901m of the file networking system 901 for facilitating publishing of target advertisements by the publisher of the content file to the second user devices 1202a, 1202b, 1203a, and 1203b of the readers of the content file based on the compiled usage information is provided below:

```
// -------Extracts keywords from title and annotations------------------
function getKeywords($title, $highlights) {
    $WAT = getWordArray(removeStopWords($title));
    $WAH = $highlights;
    return getIndexedKeywords($WAT, $WAH);
}
function fetchAds( ) {
    $data = json_decode($msg, true);
    $title = data["title"];
    $highlights = data["hlt"];
    $keywords = getKeywords($title, $highlights);
    $ads = fetchAdsForKeywords($keywords);
    $msg = createAdsAsMessages($ads);
    sendMessagesToClient($msg);
}
```

Furthermore, the usage analytics engine 901l renders the compiled usage information associated with the usage of the portable local copies of the content file on the second user devices, for example, 1202a, 1202b, 1203a, and 1203b, of the readers of the content file to the second user device 1202c of the author of the content file. The authors of the content file can initiate a selective communication with the readers of the content file based on the compiled usage information and monitor the usage of the portable local copies of the content file on the second user devices 1202a, 1202b, 1203a, and 1203b of the readers of the content file. Furthermore, the data communication module 901c sends the compiled usage information associated with the usage of the portable local copies of the content file on the second user device 1202c of the author of the content file to the second user device 1203c of the publisher of the content file. Furthermore, the data communication module 901c establishes a round-trip communication between the authors of the content file and the publisher of the content file for review of the content file prior to publication of the content file and for performing updates to the content file after the publication of the content file based on the compiled usage information as disclosed in the detailed description of FIG. 1.

In an embodiment, the file networking system 901 stores the user roles, the usage agreement, the tracking information received from the portable local copies of the content file, etc., in the database 901b of the file networking system 901. The database 901b of the file networking system 901 can be any storage area or medium that can be used for storing data and files. In an embodiment, the file networking system 901 stores the tracking information in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the database 901b can be a location on a file system. In another embodiment, the database 901b can be remotely accessed by the file networking system 901 via the network 1201. In another embodiment, the database 901b is configured as a cloud based database implemented in a cloud computing environment, where computing resources are delivered as a service over the network 1201.

Computer applications and programs are used for operating the modules of the file networking system 901. The programs are loaded onto the fixed media drive 901t and into the memory unit 901a of the file networking system 901 via the removable media drive 901u. In an embodiment, the computer applications and programs are loaded directly on the file networking system 901 via the network 1201. The processor 901m executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The file networking system 901 employs the operating system for performing multiple tasks. The operating system is responsible for management and coordination of activities and sharing of resources of the file networking system 901. The operating system further manages security of the file networking system 901, peripheral devices connected to the file networking system 901, and network connections. The operating system employed on the file networking system 901 recognizes, for example, inputs provided by a user of the file networking system 901 using one of the input devices 901s, the output devices 901v, files, and directories stored locally on the fixed media drive 901t. The operating system on the file networking system 901 executes different programs using the processor 901m. The processor 901m and the operating system together define a computer platform for which application programs in high level programming languages are written.

The processor 901m of the file networking system 901 retrieves instructions defined by the data communication module 901c, the code injection module 901d, the file distribution module 901e, the network communication module 901f, the indexing engine 901g, the satellite internet creation module 901h, the activity logging module 901i, the file update module 901j, the notification module 901k, and the usage analytics engine 901l for performing respective functions disclosed above. The processor 901m retrieves instructions for executing the modules, for example, 901c, 901d, 901e, 901f, 901g, 901h, 901i, 901j, 901k, 901l, etc., of the file networking system 901 from the memory unit 901a. A program counter determines the location of the instructions in the memory unit 901a. The program counter stores a number that identifies the current position in the program of each of the modules, for example, 901c, 901d, 901e, 901f, 901g, 901h, 901i, 901j, 901k, 901l, etc., of the file networking system 901. The instructions fetched by the processor 901m from the memory unit 901a after being processed are decoded. The instructions are stored in an instruction register in the processor 901m. After processing and decoding, the processor 901m executes the instructions, thereby performing one or more processes defined by those instructions.

At the time of execution, the instructions stored in the instruction register are examined to determine the operations to be performed. The processor 901m then performs the specified operations. The operations comprise arithmetic operations and logic operations. The operating system performs multiple routines for performing a number of tasks required to assign the input devices 901s, the output devices 901v, and the memory unit 901a for execution of the modules, for example, 901c, 901d, 901e, 901f, 901g, 901h, 901i, 901j, 901k, 901l, etc., of the file networking system 901. The tasks performed by the operating system comprise, for example, assigning memory to the modules, for example, 901c, 901d, 901e, 901f, 901g, 901h, 901i, 901j, 901k, 901l, etc., of the file networking system 901 and to data used by the file networking system 901, moving data between the memory unit 901a and disk units, and handling input/output operations. The operating system performs the tasks on request by the operations and after performing the tasks, the operating system transfers the execution control back to the processor 901m. The processor 901m continues the execution to obtain one or more outputs. The outputs of the execution of the modules, for example, 901c, 901d, 901e, 901f, 901g, 901h, 901i, 901j, 901k, 901l, etc., of the file networking system 901 are displayed to a user of the file networking system 901 on the output device 901v. In an embodiment, one or more portions of the file networking system 901 are distributed across one or more computer systems (not shown) coupled to the network 1201.

The non-transitory computer readable storage medium disclosed herein stores computer program codes comprising instructions executable by at least one processor 901m for transforming a content file into a content-centric social network with managed connectivity and indexable touchpoints. The computer program codes comprise a first computer program code for injecting a tracking code with widgets for user activities into each of one or more portable local copies of the content file based on the preconfigured criteria in response to a request to access the content file from the first user devices 1202; a second computer program code for distributing the portable copies of the content file with the respective injected tracking codes to the second user devices 1204 through a network 1201 based on the invite information received with the request to access the content file; a third computer program code for establishing a bidirectional communication between the file networking system 901 and the distributed portable copies, hereinafter referred to as "portable local copies", of the content file on the second user devices 1204 through the network 1201; a fourth computer program code for receiving tracking information comprising touchpoints based on usage of the portable local copies of the content file via the established bidirectional communication while managing to cover for loss of connectivity over the network 1201; a fifth computer program code for indexing the touchpoints in the received tracking information for tracking the usage of the portable local copies of the content file; a sixth computer program code for creating a satellite internet of users of the portable local copies of the content file on the second user devices 1204 based on the received invite information and the tracked usage of the portable local copies of the content file; and a seventh computer program code for establishing communication between the users of the portable local copies of the content file on the second user devices 1204 in the created satellite internet of users using one or more of the widgets for the user activities through the injected tracking codes and the indexed touchpoints, thereby transforming the content file into the content-centric social network with the managed connectivity and the indexable touchpoints.

In an embodiment, the seventh computer program code comprises an eighth computer program code for logging the user activities in the portable local copies of the content file on the second user devices 1204 in the created satellite internet of users using one or more of the widgets for the user activities through the injected tracking codes for the establishment of the communication between the users of the portable local copies of the content file on the second user devices 1204 in the created satellite internet of users. In another embodiment, the computer program codes further comprise a ninth computer program code for compiling usage information associated with the usage of the portable local copies of the content file on the second user devices 1204 from the received tracking information and the established communication between the users of the portable local copies of the content file on the second user devices 1204 in the created satellite internet of users. The computer program codes further comprise one or more additional computer program codes for performing additional steps that may be required and contemplated for transforming a content file into a content-centric social network with managed connectivity and indexable touchpoints. In an embodiment, a single piece of computer program code comprising computer executable instructions performs one or more steps of the computer implemented method disclosed herein for transforming a content file into a content-centric social network with managed connectivity and indexable touchpoints. The computer program codes comprising computer executable instructions are embodied on the non-transitory computer readable storage medium. The processor 901*m* of the file networking system 901 retrieves these computer executable instructions and executes them. When the computer executable instructions are executed by the processor 901*m*, the computer executable instructions cause the processor 901*m* to perform the steps of the computer implemented method for transforming the content file into a content-centric social network with managed connectivity and indexable touchpoints.

Figure 13A:
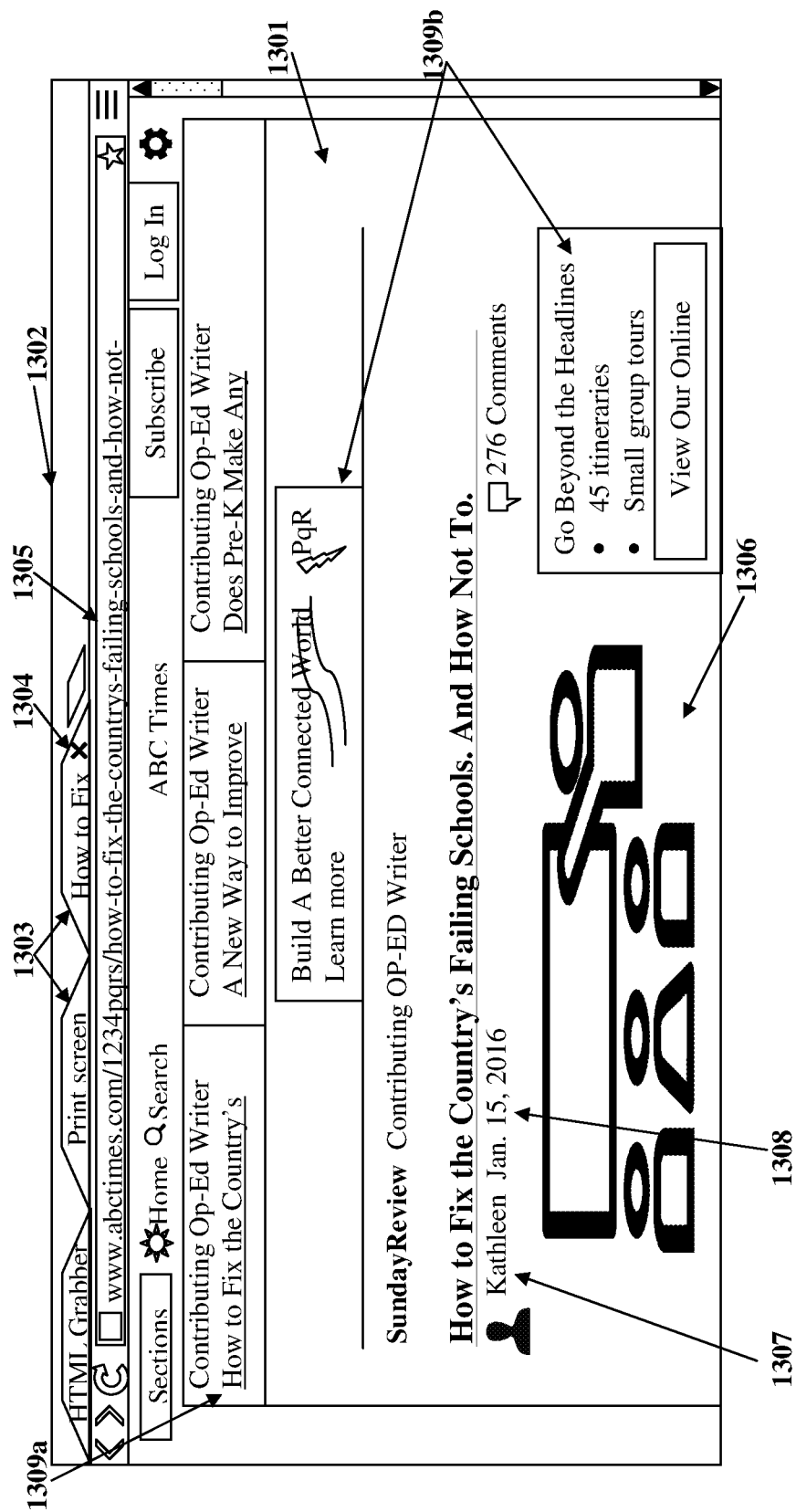
FIGS. 13A-13L exemplarily illustrate screenshots showing an implementation of the file networking system that transforms a content file into a content-centric social network with managed connectivity and indexable touchpoints.

FIGS. 13A-13L exemplarily illustrate screenshots showing an implementation of the file networking system 901 exemplarily illustrated in FIG. 12, that transforms a content file into a content-centric social network with managed connectivity and indexable touchpoints. FIG. 13A exemplarily illustrates a screenshot of a webpage 1301 on a website to be processed by the file networking system 901 for generating portable copies of the webpage 1301 for download by users and subsequent tracking of portable local copies of the webpage 1301. A user views the webpage 1301 using a browser 1302 on a user device, for example, 1202*a* exemplarily illustrated in FIG. 12, where the browser 1302 has a scrolling facility and tabs 1303 at a top section of the browser 1302 indicating webpages that are open in the browser 1302. The tab that displays the webpage 1301 is identified using an "x" mark 1304 on the tab. The user can view the webpages displayed by other tabs 1303 by selecting the other tabs 1303 of the browser 1302. An address bar 1305 on the browser 1302 comprises a uniform resource identifier (URI), for example, a uniform resource locator (URL) of the webpage 1301 being viewed. The webpage 1301 exemplarily illustrated in FIG. 13A, comprises content, that is, an article 1306 with a name 1307 of an author of the article 1306, a date of publication 1308 of the article 1306, and extraneous information such as links to other articles 1309*a* displayed on the website 1301 and advertisements 1309*b*.

Figure 13B:
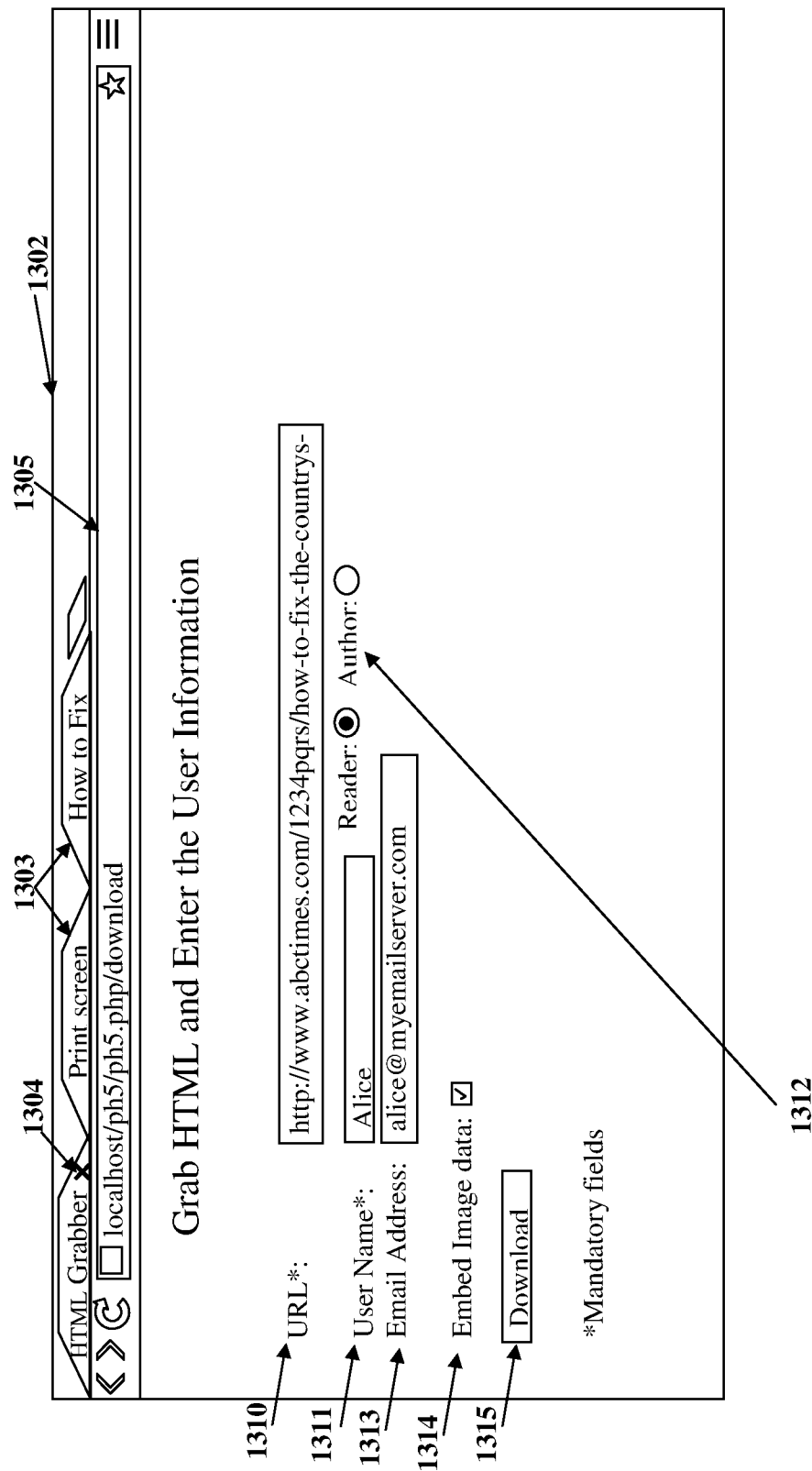

FIG. 13B exemplarily illustrates a screenshot of a hypertext markup language (HTML) grabber displayed on the browser 1302 of a user device 1202*a* exemplarily illustrated in FIG. 12. The HTML grabber receives the uniform resource locator (URL) of the webpage 1301 exemplarily illustrated in FIG. 13A, that is to be processed by the file networking system 901 exemplarily illustrated in FIG. 12, and details of a first user who intends to download a portable copy of the webpage 1301 to a local storage of the user device 1202*a*. The article 1306 in the webpage 1301 exemplarily illustrated in FIG. 13A, is the content that the file networking system 901 receives from the first user. The URL of the webpage 1301 is a format in which the article 1306 can be received by the file networking system 901. The links to other articles 1309*a* displayed on the webpage 1301 and the advertisements 1309*b* exemplarily illustrated in FIG. 13A, form the extraneous information that the file networking system 901 removes to generate the content file comprising the content, that is, the article 1306. The first user, who intends to download the portable copy of the webpage 1301, provides the URL 1310 of the webpage 1301 and a user name 1311, for example, Alice. The first user, Alice, declares a user role 1312 to be, for example, that of a reader by selecting a reader radio button instead of an author radio button displayed on the HTML grabber. Furthermore, Alice provides an electronic mail (email) address 1313, for example, as "alice@myemailserver.com", for identification. The HTML grabber provides an option for embedding image data 1314 of the webpage 1301 in the portable copy of the webpage 1301. Asterisks at the end of input field names indicate mandatory fields. The first user, Alice, is required to enter details in the mandatory fields to proceed with the download of the portable copy of the webpage 1301. When Alice selects a download button 1315 rendered by the HTML grabber, the webpage 1301 is loaded in the file networking system 901 in the browser 1302 on the user device 1202*a* as exemplarily illustrated in FIG. 13C.

Figure 13C:
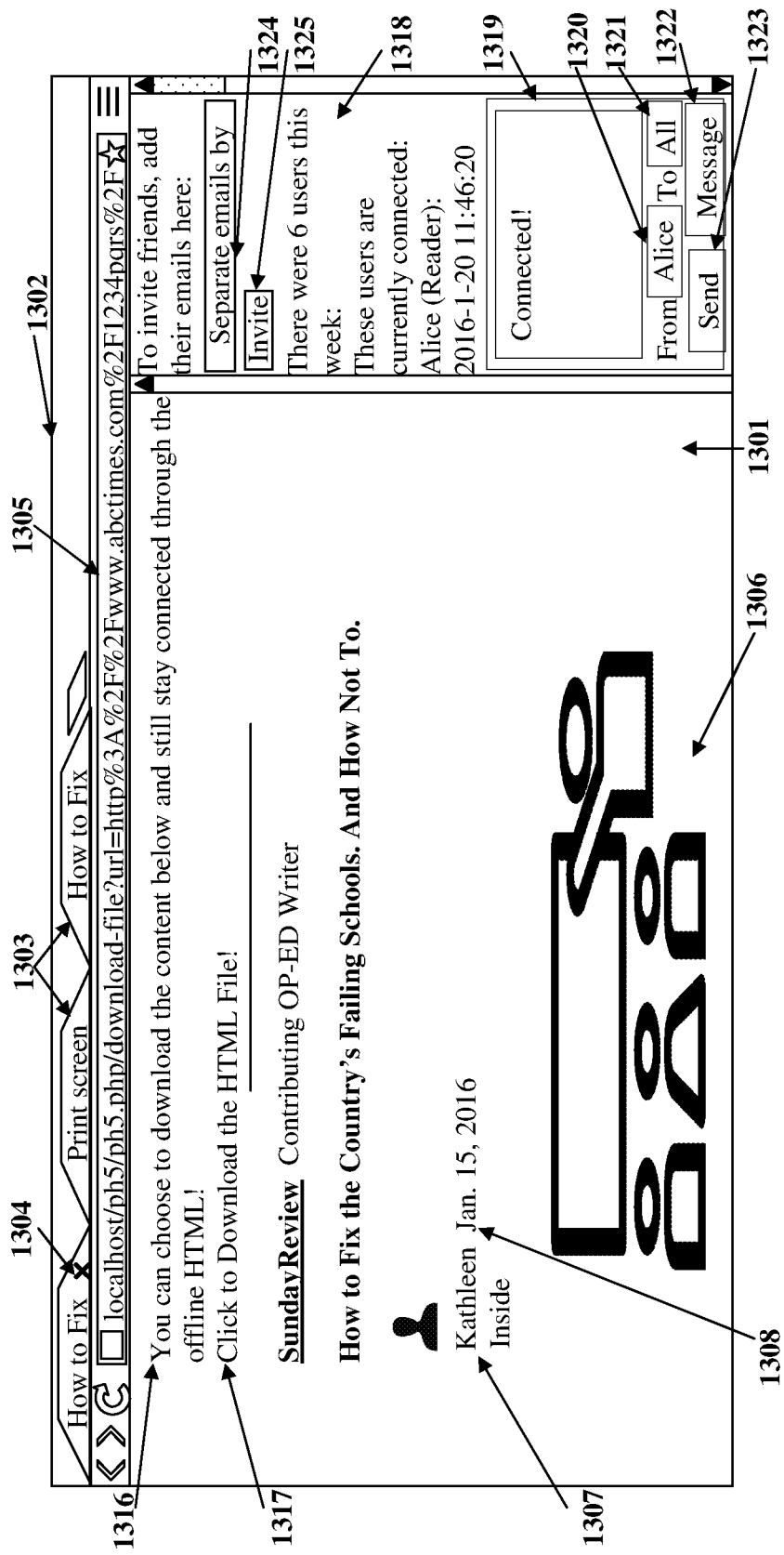

As exemplarily illustrated in FIG. 13C, the webpage 1301 loaded in the browser 1302 on the user device 1202*a* displays a usage agreement 1316 and a download link 1317. The usage agreement 1316 informs the first user, Alice, that the file networking system 901 allows her to stay connected even when offline, that is, when not connected to the network 1201 exemplarily illustrated in FIG. 12, for example, the internet, from where the webpage 1301 has been accessed. The displayed usage agreement 1316 and the user role 1312 of the reader provided by the first user as disclosed in the detailed description of FIG. 13B, constitute the preconfigured criteria based on which the file networking system 901 injects a tracking code with widgets for user activities in the portable copy of the webpage 1301. The download link 1317 allows Alice to download the portable copy of the webpage 1301 for local storage on the user device 1202*a*. The file networking system 901 injects the tracking code into the portable copy of the webpage 1301 when Alice clicks on the download link 1317.

The file networking system 901 opens a right pane 1318 for interaction between users of portable local copies of the webpage 1301. The right pane 1318 provides Alice an option to perform a user activity, for example, invite friends to use the file networking system 901 for discussion about content in the webpage 1301 by providing invite information, for example, by adding electronic mail (email) addresses of her friends separated by commas in an input field 1324. If Alice selects an invite button 1325, the file networking system 901 transmits invitation emails to the email addresses provided by Alice in the input field 1324. On the invitation of friends by Alice and a subsequent receipt of the usage agreement and the user roles from the invited friends, the file networking system 901 groups Alice and the invited friends in a primary group as disclosed in the detailed description of FIG. 1. As exemplarily illustrated in FIG. 13C, the right pane 1318 indicates that there were six users who downloaded the portable copy of the webpage 1301 in the week that Alice visited the webpage 1301 through the file networking system 901. The file networking system 901 creates a satellite internet of users with the six users, Alice, and the invited friends who download the portable local copy of the webpage 1301 as disclosed in the detailed description of FIG. 1.

The right pane 1318 also displays users who are connected to the same webpage 1301 through the file networking system 901, which, in this example, is Alice. The right pane 1318 also indicates usage information, for example, the most recent date and time at which users have accessed the same webpage 1301. For example, the right pane 1318 displays "2016-1-20" and "11:46:20" as the date and time that Alice last accessed the webpage 1301. The access of the webpage 1301 by the users is an example of a touchpoint. The file networking system 901 receives the tracking information comprising the touchpoints via a bidirectional communication between the webpage 1301 and the file networking system 901 as disclosed in the detailed description of FIG. 1. The file networking system 901 indexes the touchpoints in the received tracking information and compiles the usage information associated with the usage of the portable local copies of the webpage 1301 as disclosed in the detailed description of FIG. 1.

As exemplarily illustrated in FIG. 13C, the right pane 1318 also renders a chat window 1319 indicating that Alice is connected to the file networking system 901, and displays the user name as Alice in a "from" field 1320 and the audience of a message entered by Alice to be "All" connected users in a "to" field 1321. The chat window 1319 further comprises an input field 1322 for entering the message, and a send button 1323 for sending the entered message to other users who are connected to the same webpage 1301 by the file networking system 901. The invite button 1325, the chat window 1319, the input field 1322, and the send button 1323 are examples of the widgets for user activities. The file networking system 901 strips the webpage 1301 exemplarily illustrated in FIG. 13A, of the extraneous information, that is, the links to other articles 1309*a* displayed on the webpage 1301, and the advertisements 1309*b* that were present in the webpage 1301, and renders only content pertaining to the article 1306.

Figure 13D:
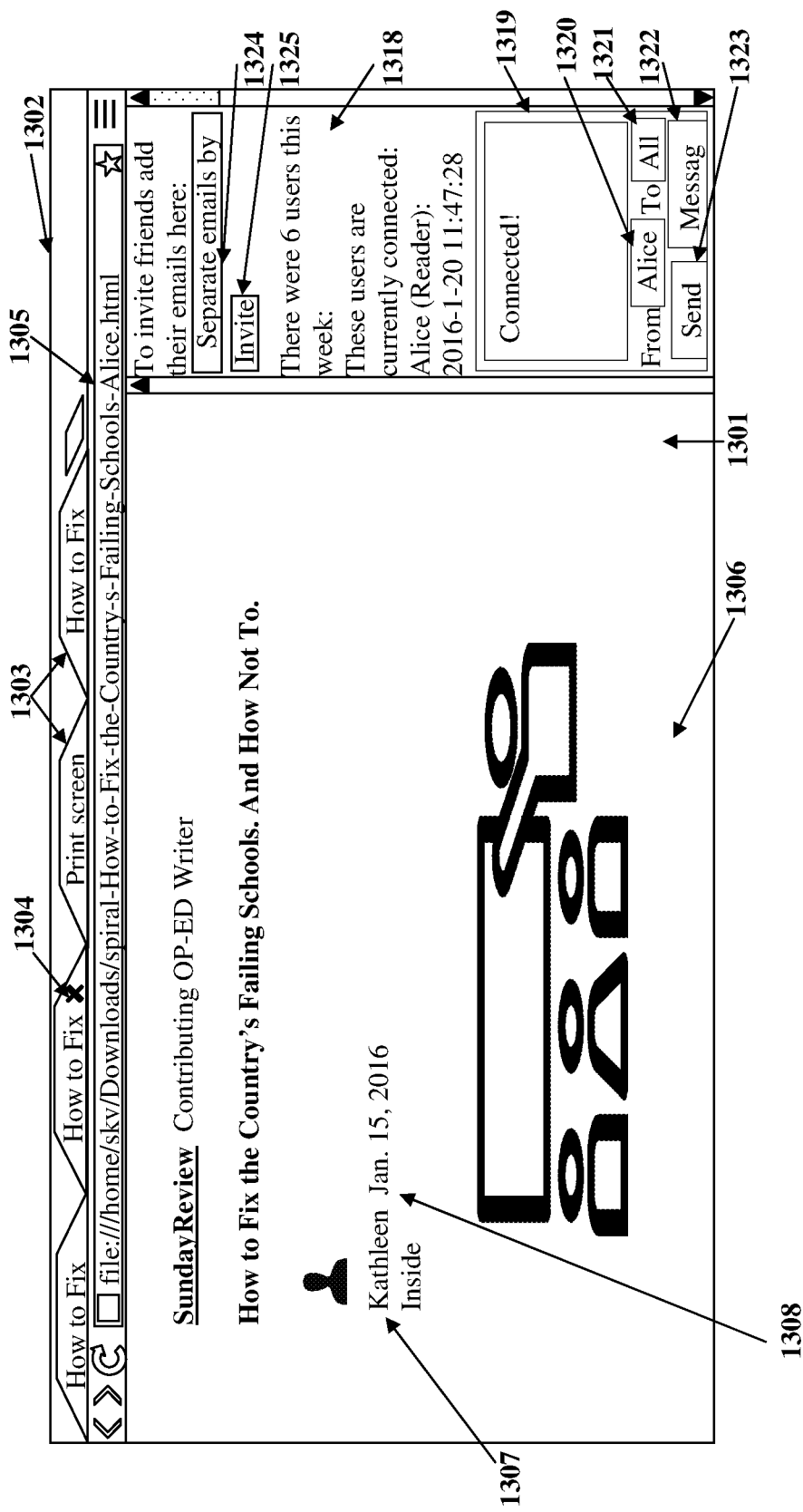

FIG. 13D exemplarily illustrates a screenshot of the portable local copy of the webpage 1301 that is stored in the local storage of the user device 1202*a* and opened through the file networking system 901. The usage agreement 1316 and the download link 1317 exemplarily illustrated in FIG. 13C, are removed from the webpage 1301 as exemplarily illustrated in FIG. 13D. A uniform resource identifier (URI), for example, a uniform resource locator (URL) displayed in the address bar 1305 of the browser 1302, starts with "file" instead of "www" indicating the world wide web that is displayed in the address bar 1305 of the browser 1302 exemplarily illustrated in FIG. 13A. The URL indicates that the webpage 1301 that is displayed by the browser 1302 originates from the local storage of the user device 1202*a* instead of a server on the network 1201. Moreover, the file networking system 901 appends a tag comprising the user name as an identification of the first user, Alice, to a base URL of the webpage 1301 in the address bar 1305 of the browser 1302. Usage of the portable local copy of the webpage 1301 corresponds to opening of the locally stored webpage 1301, the invitation of friends by Alice disclosed in the detailed description of FIG. 13C, communication with the invited friends using the chat window 1319, etc.

Figure 13E:
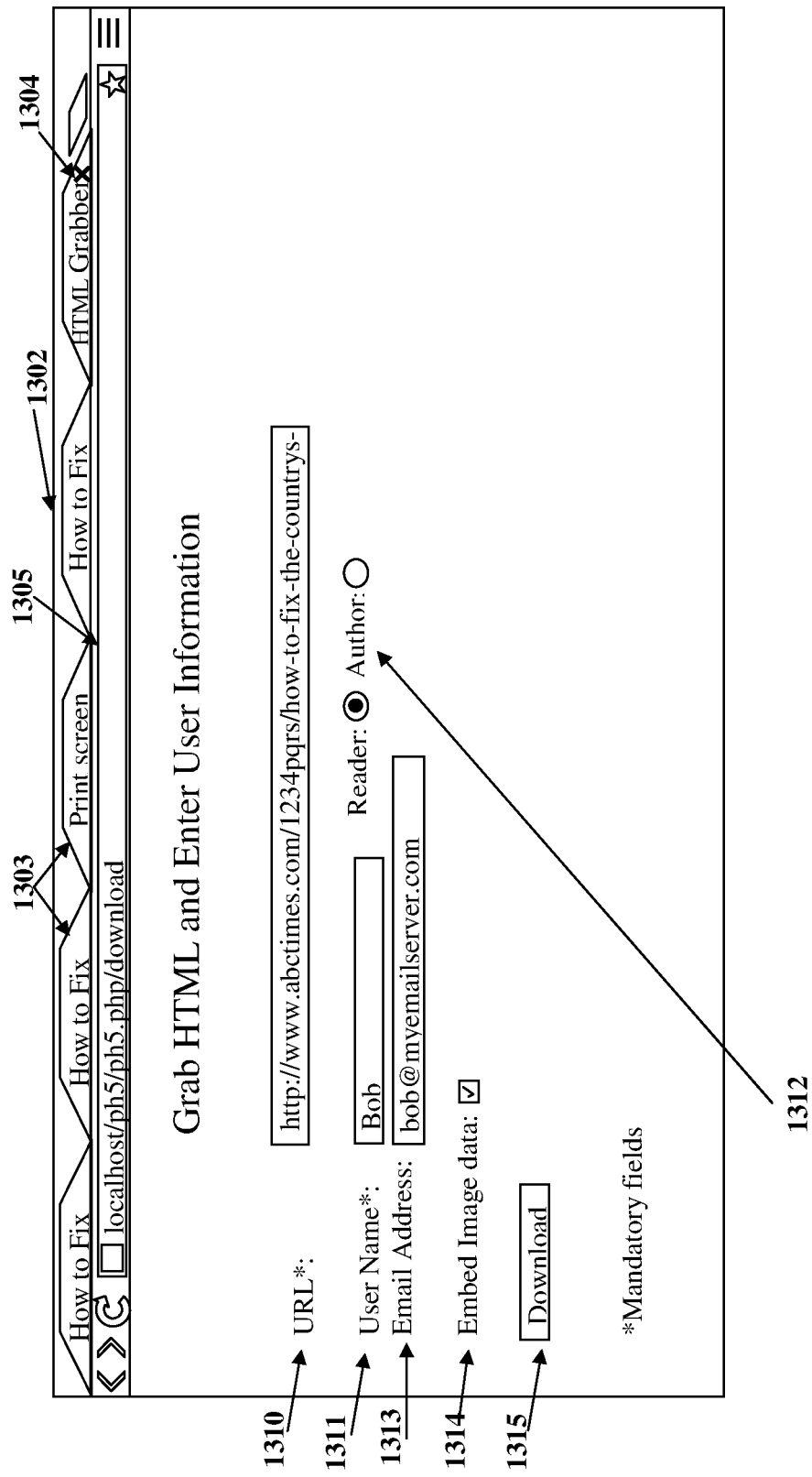

FIG. 13E exemplarily illustrates a screenshot of a hypertext markup language (HTML) grabber displayed on a browser 1302 of a second user's user device 1202*b* exemplarily illustrated in FIG. 12. The HTML grabber receives the uniform resource locator (URL) of the webpage 1301 exemplarily illustrated in FIG. 13A, that is to be processed by the file networking system 901 exemplarily illustrated in FIG. 12, and details of a second user who intends to download a portable copy of the webpage 1301 to a local storage of the user device 1202*b*. The second user provides the URL 1310 of the webpage 1301 and a user name 1311, for example, Bob, and selects a user role 1312 to be, for example, that of a reader. The second user, Bob, provides an electronic mail (email) address 1313 "bob@myemailserver.com", and selects an option for embedding image data 1314 of the webpage 1301 in the portable copy of the webpage 1301. When Bob selects the download button 1315 exemplarily illustrated in FIG. 13E, the webpage 1301 is loaded in the file networking system 901 in the browser 1302 of the user device 1202*b* as exemplarily illustrated in FIG. 13F.

Figure 13F:
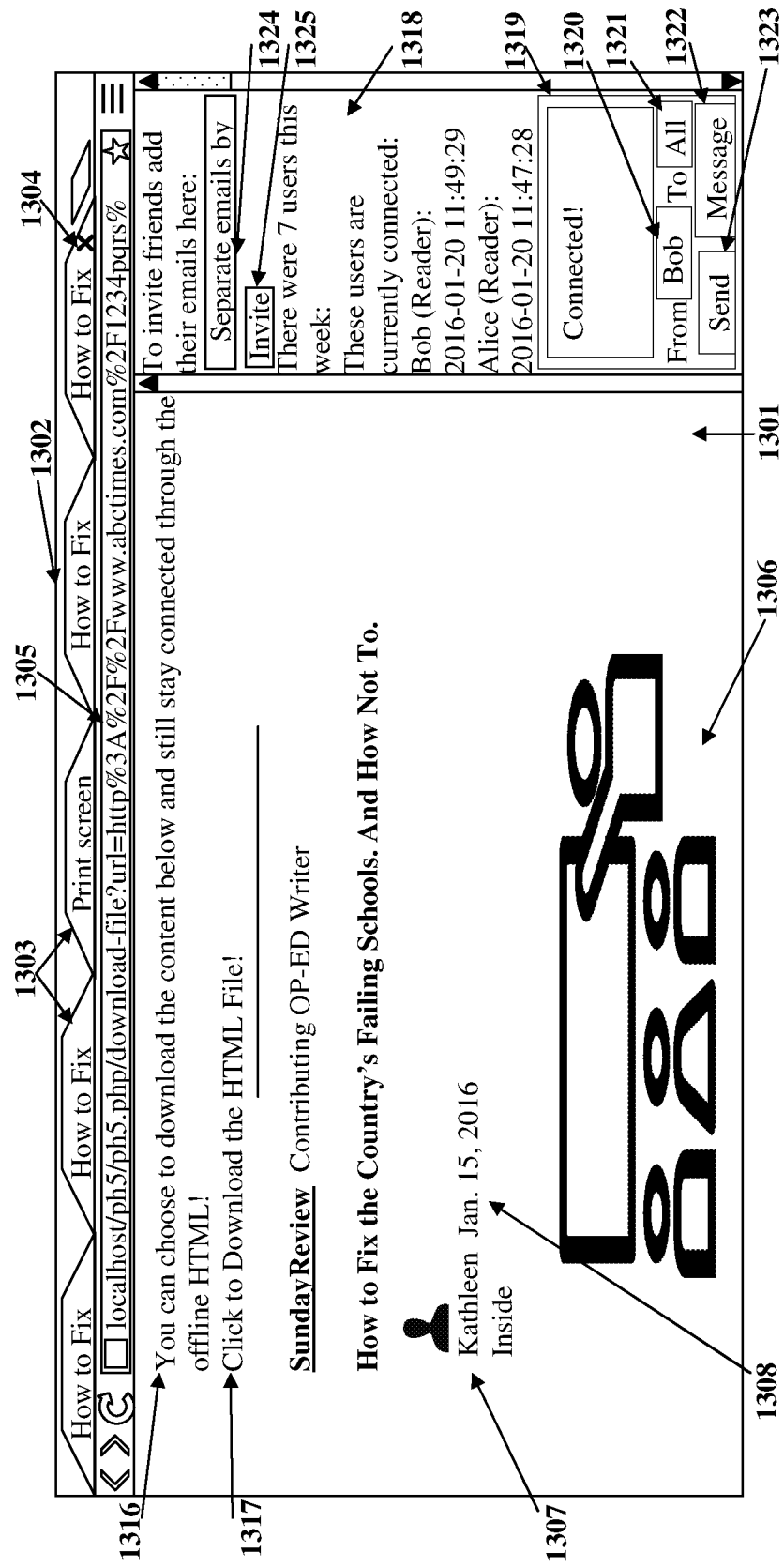

As exemplarily illustrated in FIG. 13F, the webpage 1301 loaded in the browser 1302 of the user device 1202*b* displays the usage agreement 1316, the download link 1317, the right pane 1318, and a stripped version of the webpage 1301 containing the article 1306 as disclosed in the detailed description of FIG. 13C. The right pane 1318 indicates that there were seven users who downloaded the portable copy of the webpage 1301 in the week that Bob visited the webpage 1301 through the file networking system 901. The sixth user was Alice and the seventh user is Bob in the satellite internet of users, that is, the users who are connected to the same webpage 1301 by the file networking system 901. The right pane 1318 also displays users who are connected to the same webpage 1301 through the file networking system 901 and the usage information, for example, the most recent date and time at which the users have accessed the same webpage 1301 as disclosed in the detailed description of FIG. 13C. The right pane 1318 also provides an input field 1324 for Bob to add electronic mail (email) addresses of invitees to the file networking system 901 for discussion about content in the webpage 1301 and an invite button 1325 as disclosed in the detailed description of FIG. 13C. The right pane 1318 also renders a chat window 1319 indicating that Bob is connected to the file networking system 901, and displays the user name as Bob in a "from" field 1320 and an audience of Bob's message as "All" connected users in a "to" field 1321. The chat window 1319 further provides the input field 1322 for entering a message, and the send button 1323 to send the entered message to other users in the satellite internet of users.

Figure 13G:
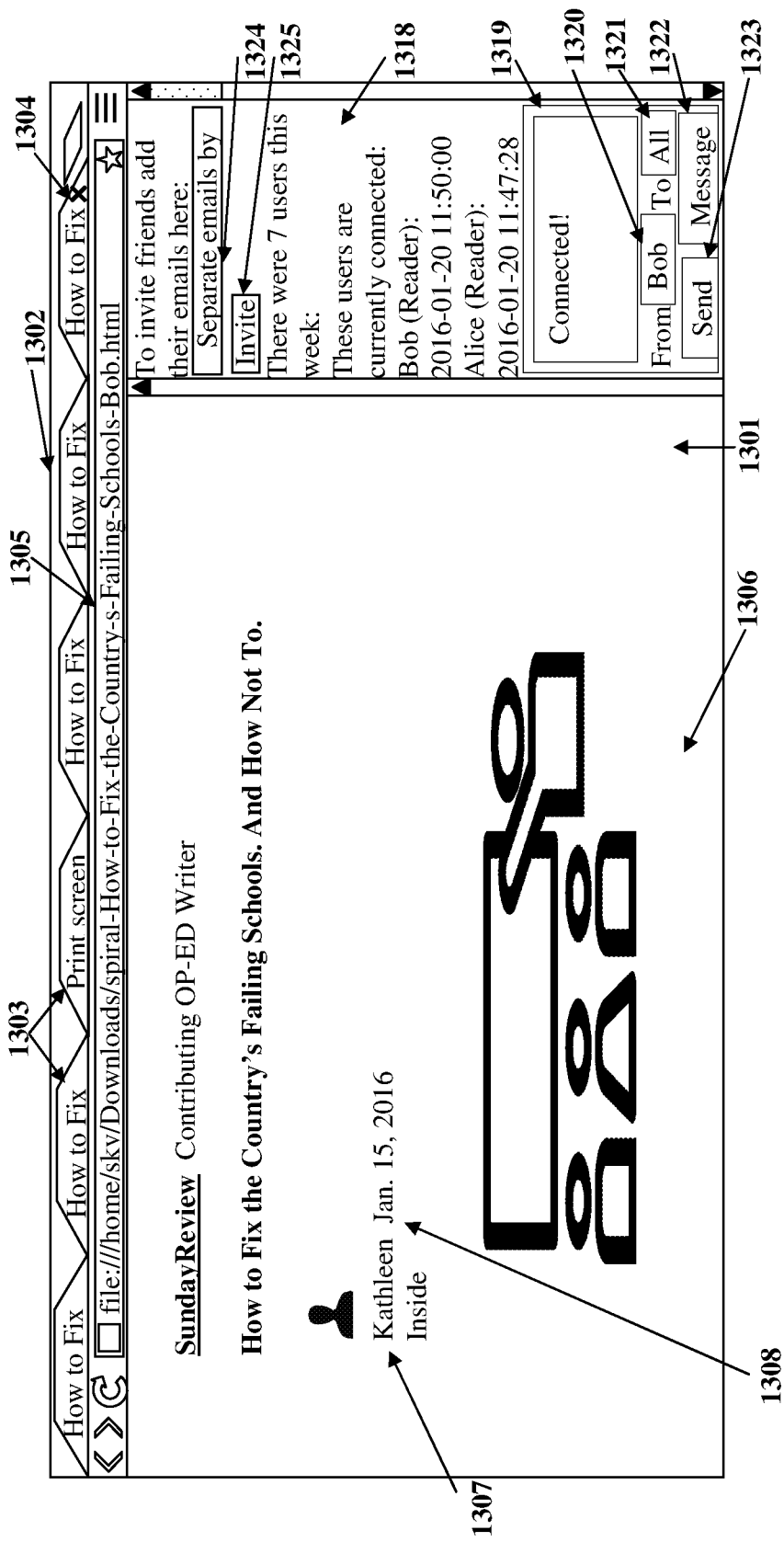

FIG. 13G exemplarily illustrates a screenshot of the portable copy of the webpage 1301 that is stored in the local storage of the user device 1202*b* and opened through the file networking system 901. The usage agreement 1316 and the download link 1317 exemplarily illustrated in FIG. 13F, are removed from the webpage 1301 as exemplarily illustrated in FIG. 13G, and a uniform resource locator (URL) displayed in the address bar 1305 of the browser 1302 is changed from "www" to "file" as disclosed in the detailed description of FIG. 13D. Moreover, the file networking system 901 appends a tag comprising the user name as an identification of the second user, Bob, to a base URL of the webpage 1301 in the address bar 1305 of the browser 1302.

Figure 13H:
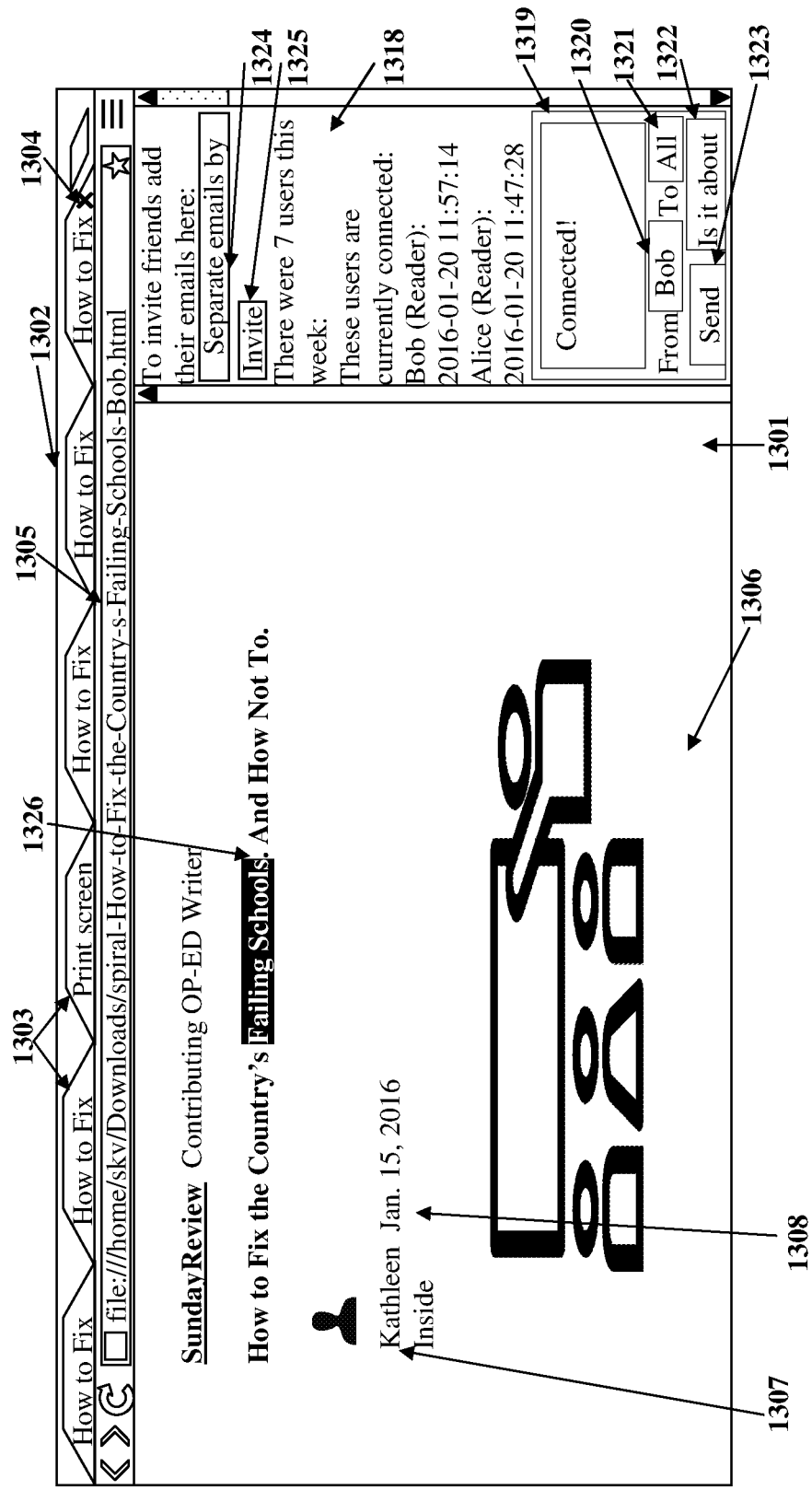

FIG. 13H exemplarily illustrates a screenshot showing the second user, Bob, initiating a communication with other users of the portable local copies of the webpage 1301. Bob enters text, asking a question to other connected users, in the input field 1322 for entering the message. The file networking system 901 allows highlighting of portions of the portable local copy of the webpage 1301 to indicate the region of the webpage 1301 to which the communication between the users in the satellite internet is anchored. Bob highlights a portion 1326 on the webpage 1301 indicating that a chat dialogue between Bob and the audience of Bob's message corresponds to the portion 1326. The highlighting is an annotation made by Bob and is an example of a touchpoint. All the users in the satellite internet of users who are connected to the webpage 1301 by the file networking system 901 can view the highlighting on their portable local copies of the webpage 1301. When Bob selects the send button 1323, the message with the question is sent to all the users in the satellite internet of users as exemplarily illustrated in FIG. 13I. The message appears in the chat windows 1319 of the portable local copies of the webpage 1301 on the user devices 1202a, 1202c, 1203a, 1203b, and 1203c exemplarily illustrated in FIG. 12, of the users who are connected to the webpage 1301 by the file networking system 901 at the time the message is sent.

Bob performs the chat using a highlighting tool to tether the chat to the portion 1326 on the webpage 1301, and the chat window 1319, where the highlighting tool and the chat window 1319 are examples of widgets for user activities. A listing of the connected users who can view the highlighting of the portion 1326 of the webpage 1301 is another example of a touchpoint. The chat performed by Bob using the highlighting tool and the chat window 1319 with the connected users is an example of a communication between users of the satellite internet of users using the widgets and indexed touchpoints. Hence, the first user, Alice, views the message in the chat window 1319 of the webpage 1301 and the highlighting of the portion 1326 of the webpage 1301 on the user device 1202a as exemplarily illustrated in FIG. 13J. The uniform resource locator (URL) in the address bar 1305 of the browser 1302 exemplarily illustrated in FIG. 13J, ends with the user name, Alice, and the chat window 1319 displays the user name Alice. Alice can send a message as a response to the message sent by Bob by entering text in the input field 1322 and selecting the send button 1323 in the chat window 1319 as exemplarily illustrated in FIG. 13K. The response sent by Alice is visible to Bob in the chat window 1319 as exemplarily illustrated in FIG. 13L. In an embodiment, the users in the satellite internet of users have an option to disable communication with other users in the satellite internet of users based on user rights management (URM) set up by a publisher of the webpage 1301.

Consider an example of implementing the file networking system 901 for transforming a content file into a content-centric social network with managed connectivity and indexable touchpoints. As exemplarily illustrated in FIG. 13A, the webpage 1301 comprises content, that is, the article 1306, and extraneous information, that is, the links to other articles 1309a displayed on the webpage 1301, and the advertisements 1309b. As exemplarily illustrated in FIG. 13B, the file networking system 901 receives the article 1306 in a format of a uniform resource identifier (URI), for example, a uniform resource locator (URL) 1310 of the webpage 1301 from a user device 1202a of a first user, for example, Alice. The file networking system 901 receives the article 1306 through a graphical user interface illustrated as the hypertext markup language (HTML) grabber in FIG. 13B and displayed on the browser 1302 of the user device 1202a. The file networking system 901 also receives a user name 1311 of the first user, for example, as "Alice", a user role 1312 of the first user, for example, as "reader", and an electronic mail (email) address 1313 of the first user, for example, as "alice@myemailserver.com" as exemplarily illustrated in FIG. 13B. The file networking system 901 also receives a selection of an option to embed image data 1314 in the content file to be generated, from Alice as exemplarily illustrated in FIG. 13B. The file networking system 901 then removes the links to other articles 1309a displayed on the webpage 1301 and the advertisements 1309b from the webpage 1301 in the format of the URL of the webpage 1301. The file networking system 901 generates the content file in a flattened format since Alice selected the option to embed image data 1314 in the content file to be generated. The generated content file in the flattened format using the received article 1306 free of the links to other articles 1309a displayed on the webpage 1301 and the advertisements 1309b is exemplarily illustrated in FIG. 13C. The generated content file is opened using the browser 1302 on the user device 1202a.

The generated content file, exemplarily illustrated in FIG. 13C, comprises the usage agreement 1316, the input field 1324 in the right pane 1318 for providing invite information, widgets for user activities such as the input field 1324, the invite button 1325, the chat window 1319, the send button 1323, etc., and the download link 1317 as disclosed in the detailed description of FIG. 13C. If Alice invites other users by providing the invite information comprising electronic mail (email) addresses of users of invitee user devices 1203 exemplarily illustrated in FIG. 12, the file networking system 901 creates a primary group comprising Alice and the users of the invitee user devices 1203. Since Alice does not provide any invite information in the example illustrated in FIG. 13C, the file networking system 901 forms a secondary group with only Alice who operates the user device 1202a.

When Alice selects the download link 1317, the file networking system 901 injects a tracking code with the widgets for user activities into a portable copy of the generated content file based on preconfigured criteria comprising the usage agreement 1316 exemplarily illustrated in FIG. 13C, and a definition of the user role 1312 received as that of a reader from Alice as exemplarily illustrated in FIG. 13B. The file networking system 901 distributes the portable copy of the content file with the injected tracking code to the user device 1202a through the network 1201 exemplarily illustrated in FIG. 12, for example, the internet.

The file networking system 901 establishes a bidirectional communication between the file networking system 901 and the portable local copy of the content file on the user device 1202a through the internet. FIG. 13D exemplarily illustrates the portable local copy of the content file opened in the browser 1302 on the user device 1202a. Usage of the portable local copy of the content file comprises, for example, the access of the portable local copy of the content file by Alice by opening the portable local copy of the content file in the browser 1302 on the user device 1202*a*. The injected tracking code in the portable local copy of the content file identifies the access of the portable local copy of the content file as a touchpoint when the portable local copy of the content file is opened by the user device 1202*a*. The file networking system 901 receives tracking information comprising the touchpoint identified by the injected tracking code from the portable local copy of the content file on the user device 1202*a* based on the usage of the portable local copy of the content file.

The file networking system 901 receives the tracking information via the established bidirectional communication between the file networking system 901 and the portable local copy of the content file on the user device 1202*a* while managing to cover for loss of connectivity over the internet. If the user device 1202*a* loses its connectivity to the internet and hence to the file networking system 901, the injected tracking code in the portable local copy of the content file stores the tracking information locally on the user device 1202*a*. When the user device 1202*a* is subsequently connected to the internet, the connectivity between the file networking system 901 and the portable local copy of the content file is reestablished. The injected tracking code transmits the locally stored tracking information on the user device 1202*a* to the file networking system 901.

FIGS. 13E-13G exemplarily illustrate screenshots portraying the steps performed by the file networking system 901 for a second user with a user name Bob for providing a portable local copy of the content file on Bob's user device 1202*b*. The steps performed by the file networking system 901 for Bob for providing the portable local copy of the content file on Bob's user device 1202*b* are similar to the steps performed by the file networking system 901 for Alice as disclosed above. Usage of the portable local copy of the content file on Bob's user device 1202*b* further comprises user interactions, for example, annotations made on the portable local copy of the content file by highlighting portions of the portable local copy of the content file. The file networking system 901 receives the tracking information comprising touchpoints defined by the user interactions with the portable local copy of the content file on Bob's user device 1202*b* and identified by the injected tracking code from the portable local copy of the content file on Bob's user device 1202*b* based on the usage of the portable local copy of the content file.

The file networking system 901 indexes the touchpoints in the received tracking information for tracking the usage of the portable local copies of the content file on the user devices 1202*a* and 1202*b*. The file networking system 901 creates a satellite internet of users comprising Alice and Bob who use the portable local copies of the content file on the user devices 1202*a* and 1202*b* respectively. FIG. 13G exemplarily illustrates the portable local copy of the content file stored locally on Bob's user device 1202*b*. Bob can view himself and Alice as currently connected to the file networking system 901 in the right pane 1318 in the portable local copy of the content file on Bob's user device 1202*b*. The right pane 1318 also displays time stamps of the latest activities on Alice's and Bob's respective portable local copies of the content file next to the displayed user names and corresponding user roles of Alice and Bob. The file networking system 901 displays Alice's user name and the time stamp of Alice's latest activity in the right pane 1318 of the portable local copy of the content file on Bob's user device 1202*b* using the indexed touchpoint corresponding to the access of the portable local copy of the content file on Alice's user device 1202*a*. If Alice invites other users by providing invite information to the file networking system 901, the file networking system 901 creates the satellite internet of users based on the received invite information, for example, by providing an option to reveal only the currently connected users in a same primary group as Alice.

Figure 13I:
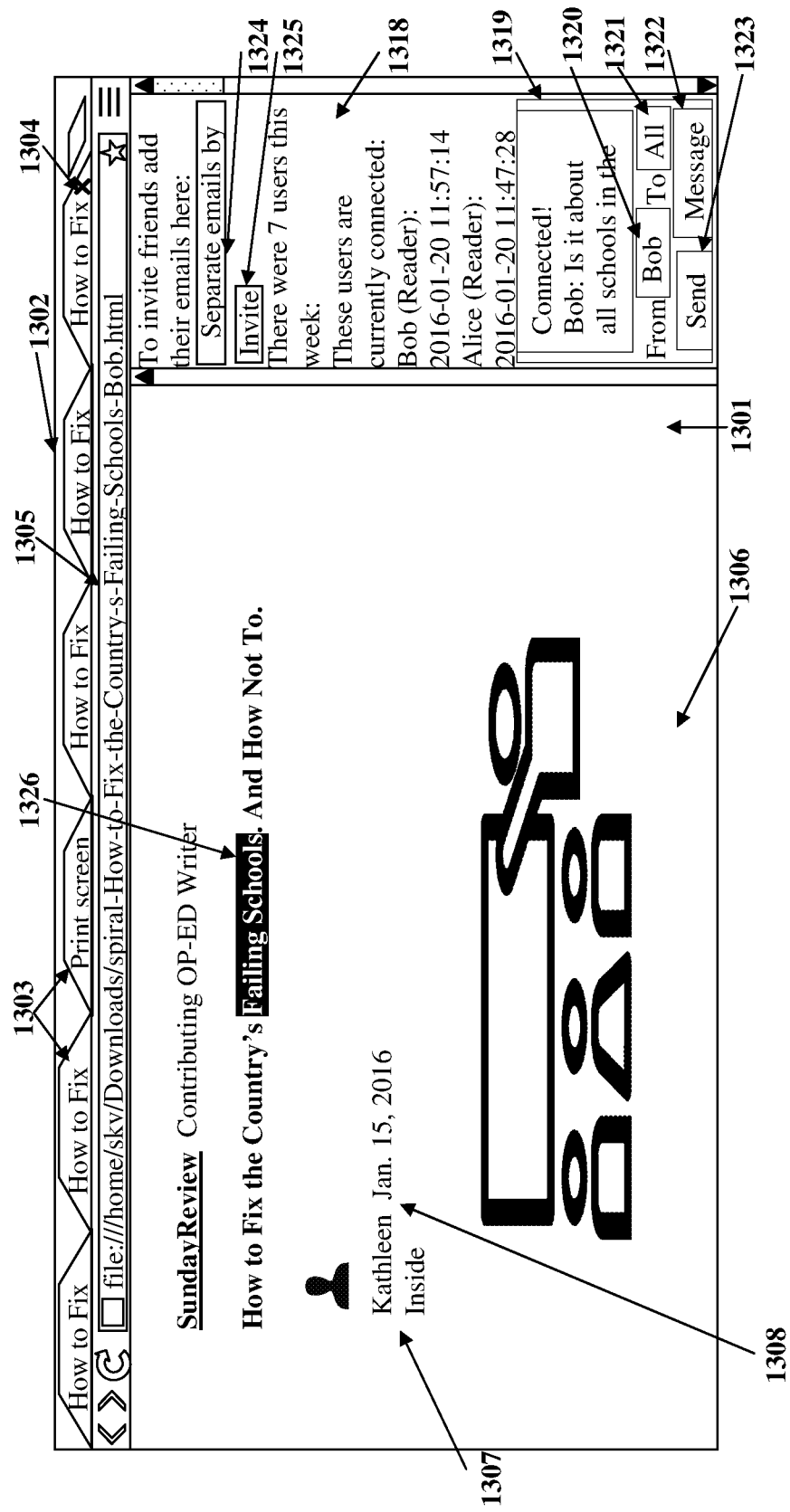
Figure 13J:
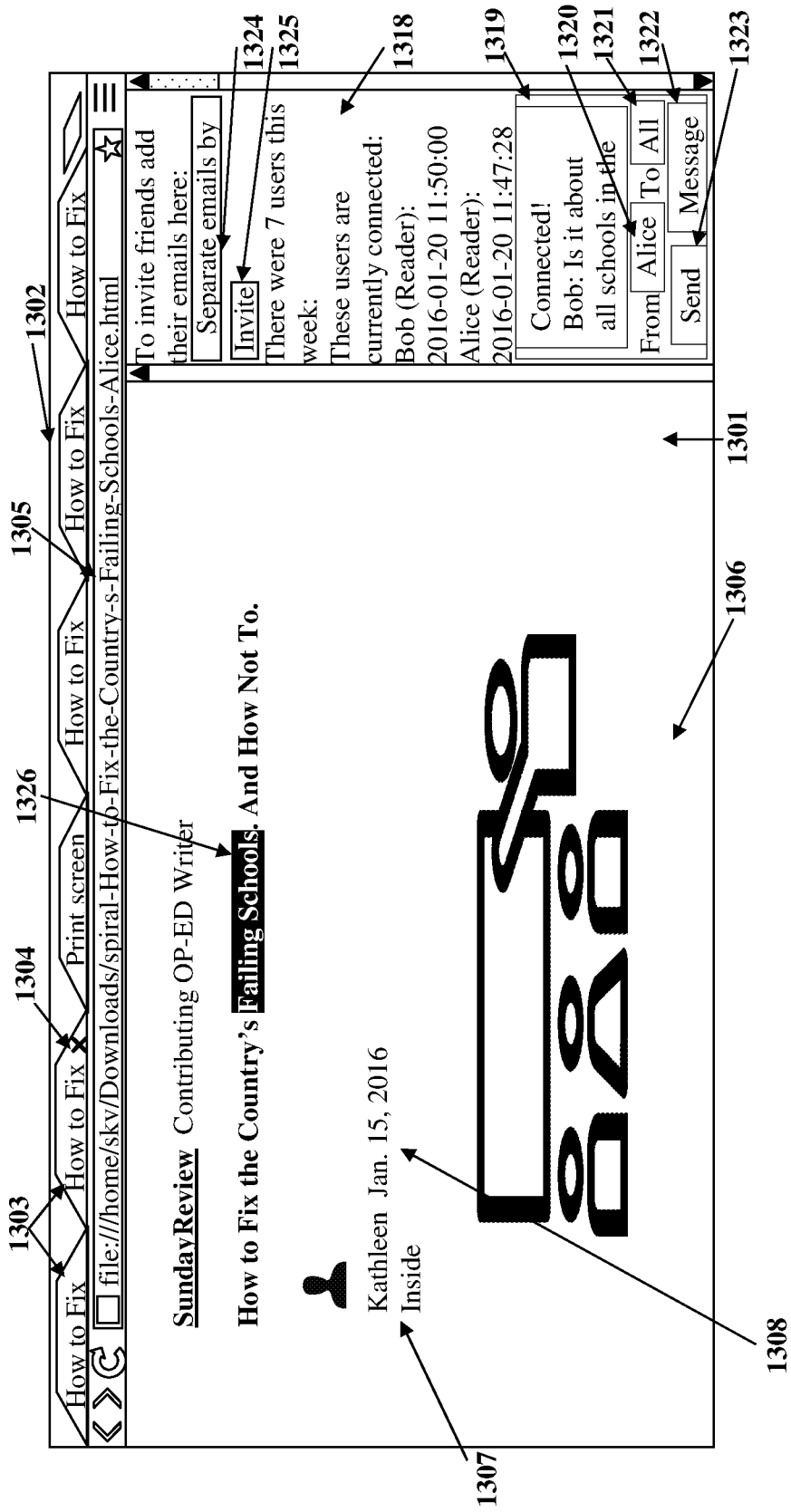
Figure 13K:
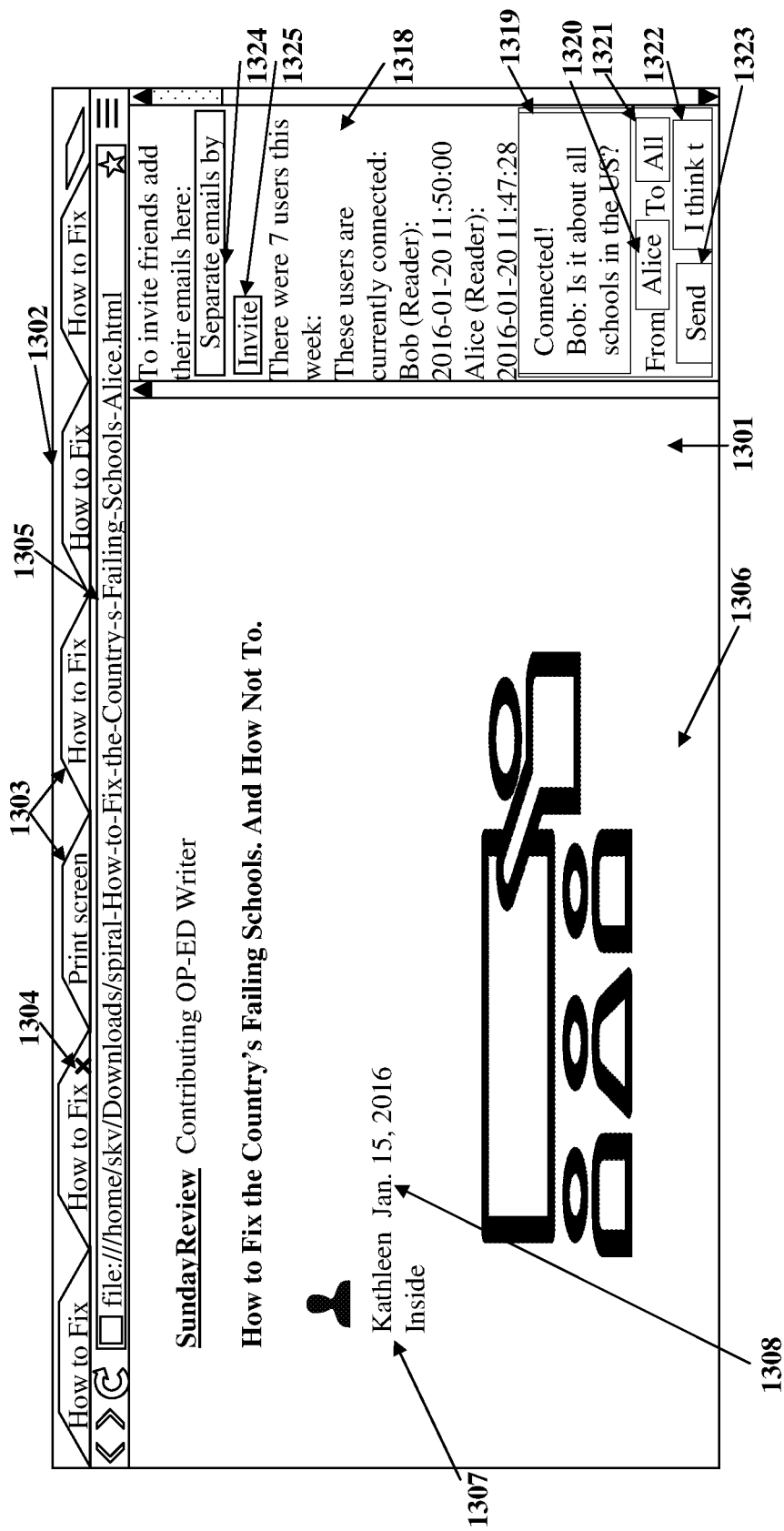
Figure 13L:
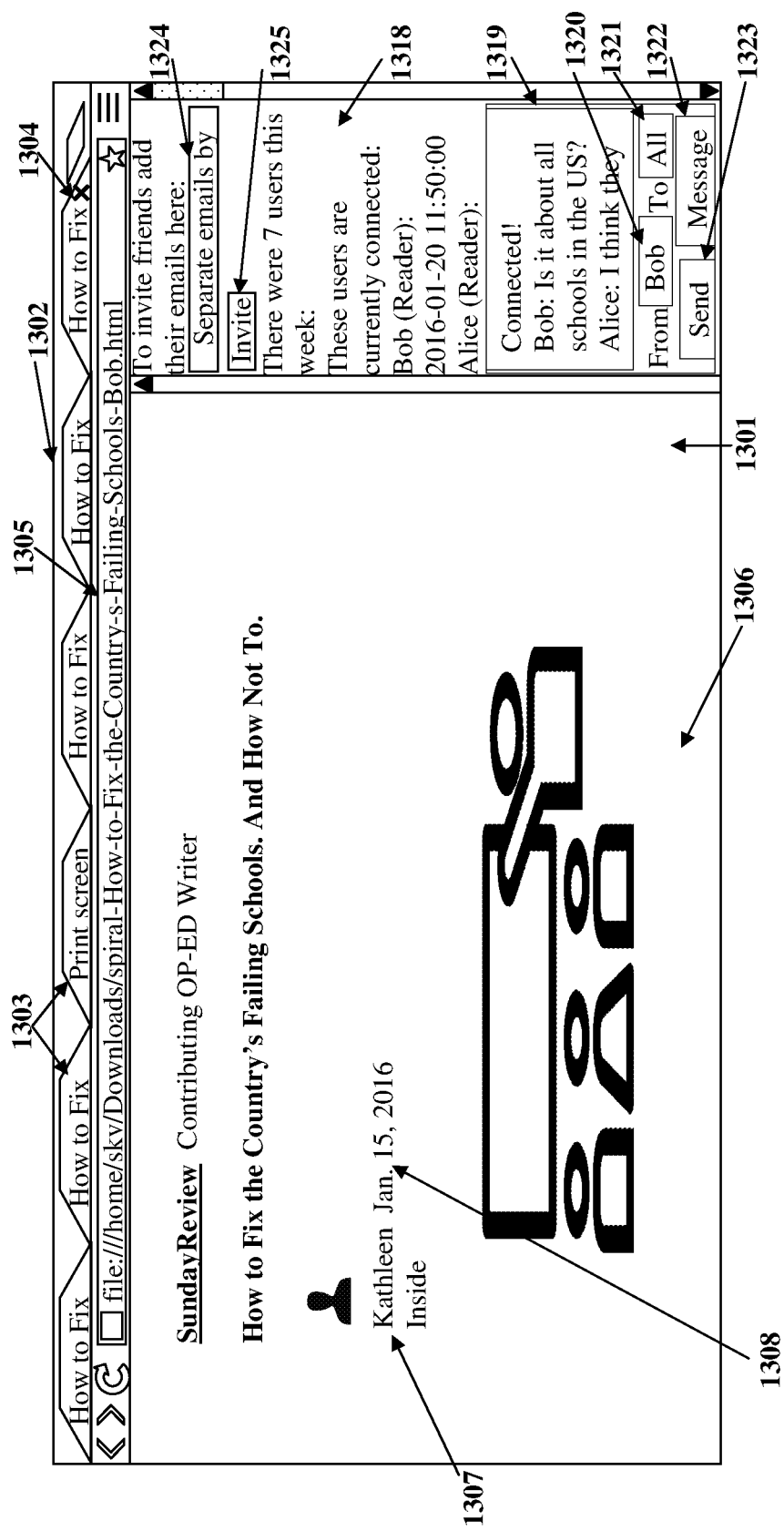

FIG. 13H exemplarily illustrates the portion 1326 on the portable local copy of the content file on Bob's user device 1202*b* as highlighted. The highlighting is an annotation made by Bob on the portable local copy of the content file on Bob's user device 1202*b*. The highlighting done by Bob is another example of a touchpoint created using a widget, for example, a highlighting tool. The file networking system 901 establishes communication between Alice and Bob in the created satellite internet of users using one or more of the widgets for the user activities through the injected tracking codes and the indexed touchpoints. FIG. 13I exemplarily illustrates a message sent by Bob to the satellite internet of users using the widgets for the user activities in the portable local copy of the content file on Bob's user device 1202*b*. The message sent by Bob is tethered to the portion 1326 that is highlighted by Bob on the portable local copy of the content file on Bob's user device 1202*b*. FIG. 13J exemplarily illustrates the portable local copy of the content file on Alice's user device 1202*a*, in which, the highlighting of the portion 1326 done by Bob is displayed. FIGS. 13K-FIG. 13L exemplarily illustrate the communication initiated by Alice on Alice's user device 1202*a* being rendered on Bob's user device 1202*b*.

The file networking system 901 logs the user activities performed by Alice and Bob who use the portable local copies of the content file on the user devices 1202*a* and 1202*b* respectively, for example, via the chat windows 1319 on the portable local copies of the content file on the user devices 1202*a* and 1202*b*. The file networking system 901 uses the logged user activities to establish the communication between Alice and Bob in the created satellite internet of users. Alice and Bob can communicate in a sequential manner. For example, Alice can communicate after receiving a response from Bob to an earlier communication initiated by Alice.

The file networking system 901 compiles usage information associated with the usage of the portable local copies of the content file on the user devices 1202*a* and 1202*b* from the received tracking information and the established communication between Alice and Bob in the created satellite internet of users. Consider the portable local copy of the content file on Bob's user device 1202*b* exemplarily illustrated in FIG. 13G. The number of users who were connected to the file networking system 901 over a period of a week and the most recent date and time at which Alice accessed the portable local copy of the content file that are displayed in the right pane 1318 of Bob's portable local copy of the content file are examples of the compiled usage information. Consider an example where a publisher of the article 1306 and an author of the article 1306 are also users of the file networking system 901 with user devices 1203*c* and 1202*c* respectively. The file networking system 901 sends the compiled usage information comprising, for example, the number of readers reading the article 1306, portions of the article 1306 that are most highlighted by Alice and Bob who use the portable local copy of the content file comprising the article 1306, etc., to the user device 1203*c* of the publisher of the article 1306. An example of a portion that is highlighted is the portion 1326 that is highlighted by Bob on his portable local copy of the content file as exemplarily illustrated in FIG. 13H. The publisher of the article 1306 can publish advertisements that are most suited to Bob based on the compiled usage information. The file networking system 901 then facilitates targeting of advertisements 1309b published by the publisher of the article 1306 to Bob's user device 1202b.

The file networking system 901 also renders the compiled usage information, for example, number of readers reading the article 1306, portions of the article 1306 most highlighted by Alice and Bob who use the portable local copy of the content file on the user devices 1202a and 1202b respectively to a user device 1202c of the author of the article 1306. The author of the article 1306 can initiate a selective communication with, for example, Bob, and monitor the usage of the portable local copies of the content file on the user devices 1202a and 1202b of Alice and Bob respectively, by the communication between Alice and Bob in the chat window 1319 as exemplarily illustrated in FIGS. 13H-13L. Furthermore, the file networking system 901 sends the compiled usage information associated with the usage of the portable local copies of the content file on the user device 1202c of the author of the article 1306 to the user device 1203c of the publisher of the article 1306 in the right pane 1318. The file networking system 901 establishes a round-trip communication between the author of the article 1306 and the publisher of the article 1306 for review of the article 1306 prior to publication of the article 1306 on the webpage 1301 and for performing updates to the article 1306 after the publication based on the compiled usage information.

The file networking system 901 receives updates made to the portable local copy of the content file by the author of the article 1306 on the user device 1202c of the author of the article 1306 based on predetermined user rights set up by the publisher of the webpage 1301 for the author of the article 1306. The file networking system 901 updates the content file comprising the article 1306 based on the received updates. The file networking system 901 generates and transmits notifications of an availability of the updated content file to Alice, Bob, and the author of the article 1306 for providing access to the updated content file on the user devices 1202a, 1202b, and 1202c respectively.

The file networking system 901 detects computing devices and consuming devices from among the user devices 1202a, 1202b, 1202c, 1203a, 1203b and 1203c exemplarily illustrated in FIG. 12, of the readers such as Alice and Bob, the publisher of the article 1306, and the author of the article 1306. For example, if the user devices 1202a and 1202b of Alice and Bob respectively are consuming devices such as smartphones, the file networking system 901 uses injected proprietary script in the article 1306 that is cached in the browsers 1302 of the user devices 1202a and 1202b to establish a signaling handshake between the article 1306 cached in the browsers 1302 of the user devices 1202a and 1202b and the content that is in the portable local copy of the content file. If the user device 1203c of the publisher of the article 1306 is a computing device such as a desktop computer, the file networking system 901 uses inline frame (iframe) tags in the portable local copy of the content file on the user device 1203c of the publisher of the article 1306 and RESTful services on the file networking system 901 to establish the signaling handshake between the portable local copy of the content file and the file networking system 901. The signaling handshake corresponds to the communication between the portable local copies of the content file on the user devices 1202a and 1202b and the file networking system 901. The file networking system 901 similarly establishes the communication between, for example, a smartphone of the author of the article 1306 and the desktop computer of the publisher of the article 1306 based on the detection of a consuming device and a computing device from among the user devices 1202c and 1203c of the author of the article 1306 and the publisher of the article 1306 respectively.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the computer implemented method and the file networking system 901 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer implemented method and the file networking system 901 disclosed herein are implemented as programmed elements, or non-programmed elements, or any suitable combination thereof.

Where databases are described such as the database 901*b*, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the file networking system 901, the databases are integrated to communicate with each other for enabling simultaneous updates of data linked across the databases, when there are any updates to the data in one of the databases.

The computer implemented method and the file networking system 901 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The computer implemented method and the file networking system 901 disclosed herein are not limited to a particular computer system platform, processor, operating system, or network. In an embodiment, one or more aspects of the computer implemented method and the file networking system 901 disclosed herein are distributed among one or more computer systems, for example, servers configured to provide one or more services to one or more client computers, or to perform a complete task in a distributed system. For example, one or more aspects of the computer implemented method and the file networking system 901 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and the file networking system 901 disclosed herein are not limited to be executable on any particular system or group of systems, and are not limited to any particular distributed architecture, network, or communication protocol.

The foregoing examples have been provided merely for the purpose of explanation and are in no way to be construed as limiting of the computer implemented method and the file networking system 901 disclosed herein. While the computer implemented method and the file networking system 901 have been described with reference to various embodiments, it is understood that the words, which have been used herein, are words of description and illustration, rather than words of limitation. Further, although the computer implemented method and the file networking system 901 have been described herein with reference to particular means, materials, and embodiments, the computer implemented method and the file networking system 901 are not intended to be limited to the particulars disclosed herein; rather, the computer implemented method and the file networking system 901 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the computer implemented method and the file networking system 901 disclosed herein in their aspects.

We claim:

1. A computer implemented method for transforming a content file into a content-centric social network with managed connectivity and indexable touchpoints, the method employing a file networking system comprising at least one processor configured to execute computer program instructions for performing the method comprising:

injecting a tracking code with widgets for user activities into each of one or more portable copies of the content file by the file networking system based on preconfigured criteria in response to a request to access the content file from one or more first user devices, wherein the file networking system transforms said each of said one or more portable copies of the content file into one or more homed portable copies of the content file by embedding the tracking code into said each of said one or more portable copies of the content file, and wherein the file networking system radio collars said each of said one or more portable copies of the content file for tracking said each of said one or more portable copies;

distributing the one or more portable copies of the content file with the injected tracking code in the each of the one or more portable copies of the content file to one or more second user devices through a network by the file networking system based on invite information received by the file networking system with the request to access the content file, wherein the one or more second user devices comprise the one or more first user devices and invitee user devices addressed in the invite information;

establishing a bidirectional communication between the file networking system and the distributed one or more portable copies of the content file on the one or more second user devices through the network by the file networking system;

receiving tracking information comprising touchpoints by the file networking system based on usage of the distributed one or more portable copies of the content file via the established bidirectional communication while managing to cover for loss of connectivity over the network, wherein the touchpoints are defined by user interactions with the distributed one or more portable copies of the content file on the one or more second user devices and are identified by the injected tracking code in each of the distributed one or more portable copies of the content file on the one or more second user devices;

indexing the touchpoints in the received tracking information by the file networking system for tracking the usage of the distributed one or more portable copies of the content file;

creating a satellite internet of users of the distributed one or more portable copies of the content file on the one or more second user devices by the file networking system based on the invite information and the tracked usage of the distributed one or more portable copies of the content file; and establishing communication between users of the distributed one or more portable copies of the content file on the one or more second user devices in the created satellite internet of users by the file networking system using one or more of the widgets for the user activities through the injected tracking code in the each of the distributed one or more portable copies of the content file and the indexed touchpoints, thereby transforming the content file into the content-centric social network with the managed connectivity and the index able touchpoints.

2. The computer implemented method of claim 1, wherein the tracking information is stored locally on the one or more second user devices by the injected tracking code in the each of the distributed one or more portable copies of the content file on the loss of the connectivity between the file networking system and the distributed one or more portable copies of the content file over the network, and transmitted to the file networking system from the distributed one or more portable copies of the content file on the one or more second user devices on reestablishment of the connectivity between the file networking system and the distributed one or more portable copies of the content file over the network.

3. The computer implemented method of claim 1, wherein the preconfigured criteria for the injection of the tracking code with the widgets for the user activities into the each of the one or more portable copies of the content file by the file networking system comprise definitions of user roles and a usage agreement.

4. The computer implemented method of claim 3, wherein the user roles comprise a publisher of the content file, an author of the content file, a reader of the content file, and an editor of the content file.

5. The computer implemented method of claim 1, further comprising logging the user activities in the distributed one or more portable copies of the content file on the one or more second user devices in the created satellite internet of users by the file networking system using one or more of the widgets for the user activities through the injected tracking code in the each of the distributed one or more portable copies of the content file for the establishment of the communication between the users of the distributed one or more portable copies of the content file on the one or more second user devices in the created satellite internet of users.

6. The computer implemented method of claim 1, further comprising compiling usage information associated with the usage of the distributed one or more portable copies of the content file on the one or more second user devices from the received tracking information and the established communication between the users of the distributed one or more portable copies of the content file on the one or more second user devices in the created satellite internet of users by the file networking system.

7. The computer implemented method of claim 6, further comprising:
sending the compiled usage information associated with the usage of the distributed one or more portable copies of the content file on the one or more second user devices of one or more readers of the content file to the one or more second user devices of a publisher of the content file by the file networking system; and
facilitating targeting of advertisements published by the publisher of the content file to the one or more second user devices of the one or more readers of the content file by the file networking system based on the compiled usage information.

8. The computer implemented method of claim 6, further comprising rendering the compiled usage information associated with the usage of the distributed one or more portable copies of the content file on the one or more second user devices of one or more readers of the content file to the one or more second user devices of one or more authors of the content file by the file networking system for initiating a selective communication with the one or more readers of the content file by the one or more authors of the content file based on the compiled usage information and allowing monitoring of the usage of the distributed one or more portable copies of the content file on the one or more second user devices of the one or more readers of the content file by the one or more authors of the content file.

9. The computer implemented method of claim 6, further comprising:
sending the compiled usage information associated with the usage of the distributed one or more portable copies of the content file on the one or more second user devices of one or more authors of the content file to the one or more second user devices of a publisher of the content file by the file networking system; and
establishing a round-trip communication between the one or more authors of the content file and the publisher of the content file by the file networking system for review of the content file prior to publication of the content file and for performing updates to the content file after the publication of the content file based on the compiled usage information.

10. The computer implemented method of claim 1, further comprising grouping the one or more second user devices into one or more groups by the file networking system automatically based on the access of the content file.

11. The computer implemented method of claim 1, further comprising:
receiving, by the file networking system, updates made to the distributed one or more portable copies of the content file by users of one or more of the one or more second user devices based on predetermined user rights associated with the users of the one or more of the one or more second user devices;
updating the content file based on the received updates by the file networking system; and
generating and transmitting notifications of an availability of the updated content file by the file networking system to users of the one or more second user devices for providing access of the updated content file to the one or more second user devices.

12. The computer implemented method of claim 1, further comprising detecting computing devices and consuming devices from among the one or more second user devices by the file networking system for the establishment of the bidirectional communication between the file networking system and the distributed one or more portable copies of the content file and the establishment of the communication between the users of the distributed one or more portable copies of the content file in the created satellite internet of users.

13. The computer implemented method of claim 1, wherein the invite information comprises digital addresses of users of the invitee user devices, received from one or more of the one or more first user devices.

14. A file networking system for transforming a content file into a content-centric social network with managed connectivity and indexable touchpoints, the file networking system comprising:
a non-transitory computer readable storage medium configured to store computer program instructions defined by modules of the file networking system; and
at least one processor communicatively coupled to the non-transitory computer readable storage medium, the at least one processor configured to execute the computer program instructions defined by the modules of the file networking system, the modules comprising:
a code injection module configured to inject a tracking code with widgets for user activities into each of one or more portable copies of the content file based on preconfigured criteria in response to a request to access the content file from one or more first user devices, wherein the file networking system transforms said each of said one or more portable copies of the content file into one or more homed portable copies of the content file by embedding the tracking code into said each of said one or more portable copies of the content file, and wherein the file networking system radio collars said each of said one or more portable copies of the content file for tracking said each of said one or more portable copies;
a file distribution module configured to distribute the one or more portable copies of the content file with the injected tracking code in the each of the one or more portable copies of the content file to one or more second user devices through a network based on invite information received by a data communication module of the file networking system with the request to access the content file, wherein the one or more second user devices comprise the one or more first user devices and invitee user devices addressed in the invite information;
a network communication module configured to establish a bidirectional communication between the file networking system and the distributed one or more portable copies of the content file on the one or more second user devices through the network;
the data communication module configured to receive tracking information comprising touchpoints based on usage of the distributed one or more portable copies of the content file via the established bidirectional communication while managing to cover for loss of connectivity over the network, wherein the touchpoints are defined by user interactions with the distributed one or more portable copies of the content file on the one or more second user devices and are identified by the injected tracking code in each of the distributed one or more portable copies of the content file on the one or more second user devices;
an indexing engine configured to index the touchpoints in the received tracking information for tracking the usage of the distributed one or more portable copies of the content file;
a satellite internet creation module configured to create a satellite internet of users of the distributed one or more portable copies of the content file on the one or more second user devices based on the invite information and the tracked usage of the distributed one or more portable copies of the content file; and
the satellite internet creation module further configured to establish communication between users of the distributed one or more portable copies of the content file on the one or more second user devices in the created satellite internet of users using one or more of the widgets for the user activities through the injected tracking code in the each of the distributed one or more portable copies of the content file and the indexed touchpoints, thereby transforming the content file into the content-centric social network with the managed connectivity and the indexable touchpoints.

15. The file networking system of claim 14, wherein the modules further comprise an activity logging module configured to log the user activities in the distributed one or more portable copies of the content file on the one or more second user devices in the created satellite internet of users using one or more of the widgets for the user activities through the injected tracking code in the each of the distributed one or more portable copies of the content file for the establishment of the communication between the users of the distributed one or more portable copies of the content file on the one or more second user devices in the created satellite internet of users.

16. The file networking system of claim 14, wherein the modules further comprise a usage analytics engine configured to compile usage information associated with the usage of the distributed one or more portable copies of the content file on the one or more second user devices from the received tracking information and the established communication between the users of the distributed one or more portable copies of the content file on the one or more second user devices in the created satellite internet of users.

17. The file networking system of claim 14, wherein the satellite internet creation module is further configured to group the one or more second user devices into one or more groups automatically based on the access of the content file.

18. The file networking system of claim 14, wherein the data communication module is further configured to receive updates made to the distributed one or more portable copies of the content file by users of one or more of the one or more second user devices based on predetermined user rights associated with the users of the one or more of the one or more second user devices, and wherein the modules of the file networking system further comprise:
a file update module configured to update the content file based on the received updates; and
a notification module configured to generate and transmit notifications of an availability of the updated content file to users of the one or more second user devices for providing access of the updated content file to the one or more second user devices.

19. The file networking system of claim 14, wherein the data communication module is further configured to detect computing devices and consuming devices from among the one or more second user devices for the establishment of the bidirectional communication between the file networking system and the distributed one or more portable copies of the content file and the establishment of the communication between the users of the distributed one or more portable copies of the content file in the created satellite internet of users.

20. The file networking system of claim 14, wherein the preconfigured criteria for the injection of the tracking code with the widgets for the user activities into the each of the one or more portable copies of the content file by the code injection module comprise definitions of user roles and a usage agreement, and wherein the user roles comprise a publisher of the content file, an author of the content file, a reader of the content file, and an editor of the content file.

21. The file networking system of claim 14, wherein the invite information comprises digital addresses of users of the invitee user devices, received by the data communication module from one or more of the one or more first user devices.

22. A non-transitory computer readable storage medium having embodied thereon, computer program codes comprising instructions executable by at least one processor for transforming a content file into a content-centric social network with managed connectivity and indexable touchpoints, the computer program codes comprising:

a first computer program code for injecting a tracking code with widgets for user activities into each of one or more portable copies of the content file based on preconfigured criteria in response to a request to access the content file from one or more first user devices, wherein the preconfigured criteria comprise definitions of user roles and a usage agreement, wherein the file networking system transforms said each of said one or more portable copies of the content file into one or more homed portable copies of the content file by embedding the tracking code into said each of said one or more portable copies of the content file, and wherein the file networking system radio collars said each of said one or more portable copies of the content file for tracking said each of said one or more portable copies;

a second computer program code for distributing the one or more portable copies of the content file with the injected tracking code in the each of the one or more portable copies of the content file to one or more second user devices through a network based on invite information received with the request to access the content file, wherein the one or more second user devices comprise the one or more first user devices and invitee user devices addressed in the invite information;

a third computer program code for establishing a bidirectional communication between the file networking system and the distributed one or more portable copies of the content file on the one or more second user devices through the network;

a fourth computer program code for receiving tracking information comprising touchpoints based on usage of the distributed one or more portable copies of the content file via the established bidirectional communication while managing to cover for loss of connectivity over the network, wherein the touchpoints are defined by user interactions with the distributed one or more portable copies of the content file on the one or more second user devices and are identified by the injected tracking code in each of the distributed one or more portable copies of the content file on the one or more second user devices;

a fifth computer program code for indexing the touchpoints in the received tracking information for tracking the usage of the distributed one or more portable copies of the content file;

a sixth computer program code for creating a satellite internet of users of the distributed one or more portable copies of the content file on the one or more second user devices, based on the invite information and the tracked usage of the distributed one or more portable copies of the content file; and a seventh computer program code for establishing communication between users of the distributed one or more portable copies of the content file on the one or more second user devices in the created satellite internet of users using one or more of the widgets for the user activities through the injected tracking code in the each of the distributed one or more portable copies of the content file and the indexed touchpoints, thereby transforming the content file into the content-centric social network with the managed connectivity and the indexable touchpoints.

23. The non-transitory computer readable storage medium of claim 22, wherein the seventh computer program code further comprises an eighth computer program code for logging the user activities in the distributed one or more portable copies of the content file on the one or more second user devices in the created satellite internet of users using one or more of the widgets for the user activities through the injected tracking code in the each of the distributed one or more portable copies of the content file for the establishment of the communication between the users of the distributed one or more portable copies of the content file on the one or more second user devices in the created satellite internet of users.

24. The non-transitory computer readable storage medium of claim 22, wherein the computer program codes further comprise a ninth computer program code for compiling usage information associated with the usage of the distributed one or more portable copies of the content file on the one or more second user devices from the received tracking information and the established communication between the users of the distributed one or more portable copies of the content file on the one or more second user devices in the created satellite internet of users.

* * * * *